United States Patent
Shin et al.

(10) Patent No.: US 10,966,187 B2
(45) Date of Patent: Mar. 30, 2021

(54) METHOD FOR TRANSMITTING AND RECEIVING DATA IN WIRELESS COMMUNICATION SYSTEM AND APPARATUS THEREFOR

(71) Applicant: LG Electronics Inc., Seoul (KR)

(72) Inventors: Seokmin Shin, Seoul (KR); Daesung Hwang, Seoul (KR); Joonkui Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/347,519

(22) PCT Filed: Nov. 6, 2017

(86) PCT No.: PCT/KR2017/012484
§ 371 (c)(1),
(2) Date: May 3, 2019

(87) PCT Pub. No.: WO2018/084672
PCT Pub. Date: May 11, 2018

(65) Prior Publication Data
US 2020/0187170 A1 Jun. 11, 2020

Related U.S. Application Data

(60) Provisional application No. 62/454,877, filed on Feb. 5, 2017, provisional application No. 62/417,343, filed on Nov. 4, 2016.

(51) Int. Cl.
*H04W 72/04* (2009.01)
*H04J 11/00* (2006.01)
(Continued)

(52) U.S. Cl.
CPC ....... *H04W 72/042* (2013.01); *H04J 11/0069* (2013.01); *H04L 27/2666* (2013.01);
(Continued)

(58) Field of Classification Search
CPC ....... H04W 4/70; H04W 28/06; H04W 48/12; H04W 74/006; H04W 72/00;
(Continued)

(56) References Cited

U.S. PATENT DOCUMENTS 9,548,845 B2 * 1/2017 Yi .................. H04L 5/0053
9,843,429 B2 * 12/2017 Yi .................. H04L 5/0053
(Continued)

FOREIGN PATENT DOCUMENTS

| EP | 3500035 | 6/2019 |
|---|---|---|
| WO | WO2016064808 | 4/2016 |
| WO | WO2016111580 | 7/2016 |

OTHER PUBLICATIONS

Qualcomm Incorporated, "Support of multicast," R1-1609995, 3GPP TSG RAN WG1 Meeting #86bis, Lisbon, Portugal, dated Oct. 1, 2016, 11 pages.
(Continued)

*Primary Examiner* — Tri H Phan
(74) *Attorney, Agent, or Firm* — Fish & Richardson P.C.

(57) ABSTRACT

Described are a method for transmitting and receiving data in a wireless communication system supporting Machine-Type Communication (MTC) and an apparatus therefor. The method includes: monitoring a first search space configured for an MTC Physical Downlink Control Channel (MPDCCH), in which the first MPDCCH includes first control information for scheduling of a first Physical Downlink shared Channel (PDSCH) for transferring a Single Cell-Multicast Control Channel (SC-MCCH); receiving the first PDSCH based on the first control information; monitoring a second search space configured for a second MPDCCH using a group identifier acquired through the SC-MCCH, in which the second MPDCCH includes second control information for scheduling of a second PDSCH for transferring a Single Cell-Multicast Traffic Channel (SC-
(Continued)

MTCH); and receiving the second PDSCH based on the second control information, in which configuration information for a frequency bandwidth used for the second PDSCH may be transferred through the SC-MCCH.

15 Claims, 17 Drawing Sheets

(51) Int. Cl.
*H04L 27/26* (2006.01)
*H04W 28/06* (2009.01)
*H04W 4/70* (2018.01)
*H04W 48/12* (2009.01)
*H04W 72/12* (2009.01)

(52) U.S. Cl.
CPC ............. *H04W 4/70* (2018.02); *H04W 28/06* (2013.01); *H04W 48/12* (2013.01); *H04W 72/1289* (2013.01)

(58) Field of Classification Search
CPC . H04W 72/005; H04W 72/04; H04W 72/042; H04W 72/12; H04W 72/1263; H04W 72/1273; H04W 72/1278; H04W 72/1289; H04W 74/02; H04L 27/26; H04L 27/2666; H04L 27/32; H04L 27/2601; H04L 27/2613; H04L 27/2655; H04J 11/00; H04J 11/0069; H04J 13/00
See application file for complete search history.

(56) References Cited

U.S. PATENT DOCUMENTS

| | | | |
|---|---|---|---|
| 9,980,254 B2* | 5/2018 | Shi | H04L 1/08 |
| 10,362,570 B2* | 7/2019 | Park | H04W 72/005 |
| 10,582,357 B2* | 3/2020 | Park | H04W 4/06 |
| 10,623,931 B2* | 4/2020 | Park | H04W 4/70 |
| 2010/0325504 A1 | 12/2010 | Lee et al. | |
| 2019/0174510 A1* | 6/2019 | Shin | H04L 5/0044 |
| 2019/0174529 A1* | 6/2019 | Tie | H04W 72/1289 |
| 2019/0223197 A1* | 7/2019 | Shin | H04L 1/0031 |
| 2019/0246254 A1* | 8/2019 | Chatterjee | H04L 5/0053 |
| 2020/0137528 A1* | 4/2020 | Ai | H04W 48/12 |

OTHER PUBLICATIONS

Huawei, "On supporting larger maximum TBS and wider bandwidth for FeMTC," R2-166417, 3GPP TSG-RAN WG2 Meeting #95bis, Kaohsiung, Taiwan, dated Oct. 1, 2016, 5 pages.
Sony, "Resource Allocation in wide bandwidth feMTC," R1-1608937, 3GPP TSG RAN WG1 Meeting #86bis, Lisbon, Portugal, dated Sep. 30, 2016, 5 pages.
Kyocera, "RRC configuration of multicast enhancements for FeMTC and eNB-IoT," R2-166851, 3GPP TSG-RAN WG2 #95bis, Kaohsiung, Taiwan, dated Sep. 30, 2016, 11 pages.
LG Electronics, "Multicast support for FeMTC," R1-1609206, 3GPP TSG RAN WG1 Meeting #86bis, Lisbon, Portugal, dated Oct. 1, 2016, 6 pages.
Ericsson, "L1 configuration for multicast support for MTC," R1-1610393, 3GPP TSG-RAN WG1 #86bis, Lisbon, Portugal, dated Oct. 1, 2016, 7 pages.
Extended European Search Report in European Application No. 17866821.6, dated Apr. 20, 2020, 6 pages.
Intel Corporation, "SC-PTM for FeMTC," R1-1609479, 3GPP TSG RAN WG1 Meeting #86bis, Lisbon, Portugal, dated Oct. 10-14, 2016, 5 pages.
Japanese Office Action in Japanese Application No. 2019-523688, dated Apr. 24, 2020, 9 pages (with English translation).
LG Electronics Inc., "SC-PTM MTCH reception related issues in NB-IOT," 3GPP TSG-RAN WG2 Meeting #95bis, Kaohsiung, Taiwan, dated Oct. 10-Oct. 14, 2016, 3 pages.
Ran1, "LS on SC-MCCH transmission in NB-1oT," R2-167414, 3GPP TSG RAN WG2 Meeting #96, Reno, USA, dated Nov. 14-18, 2016, 2 pages.

* cited by examiner

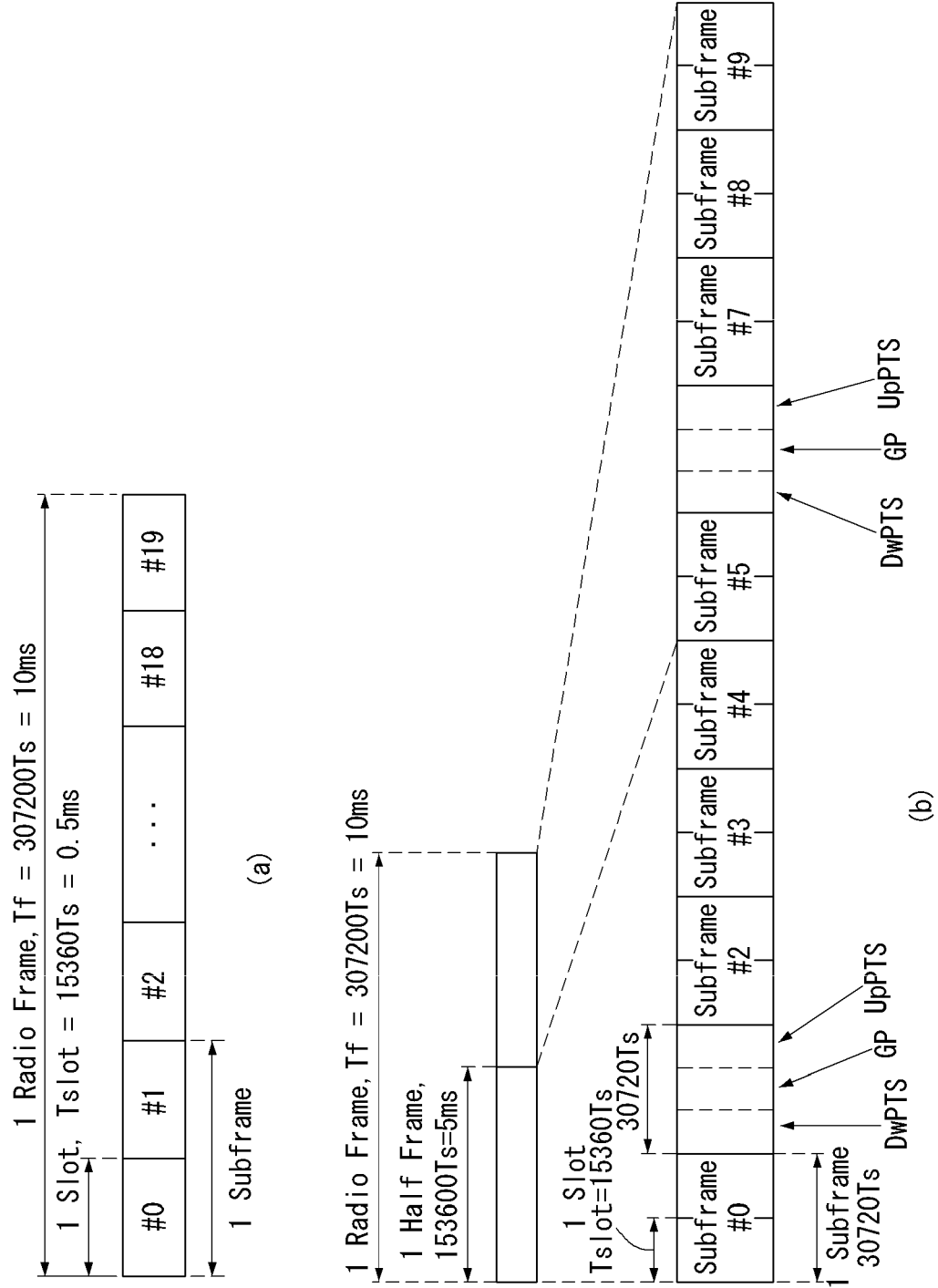

[FIG. 2]
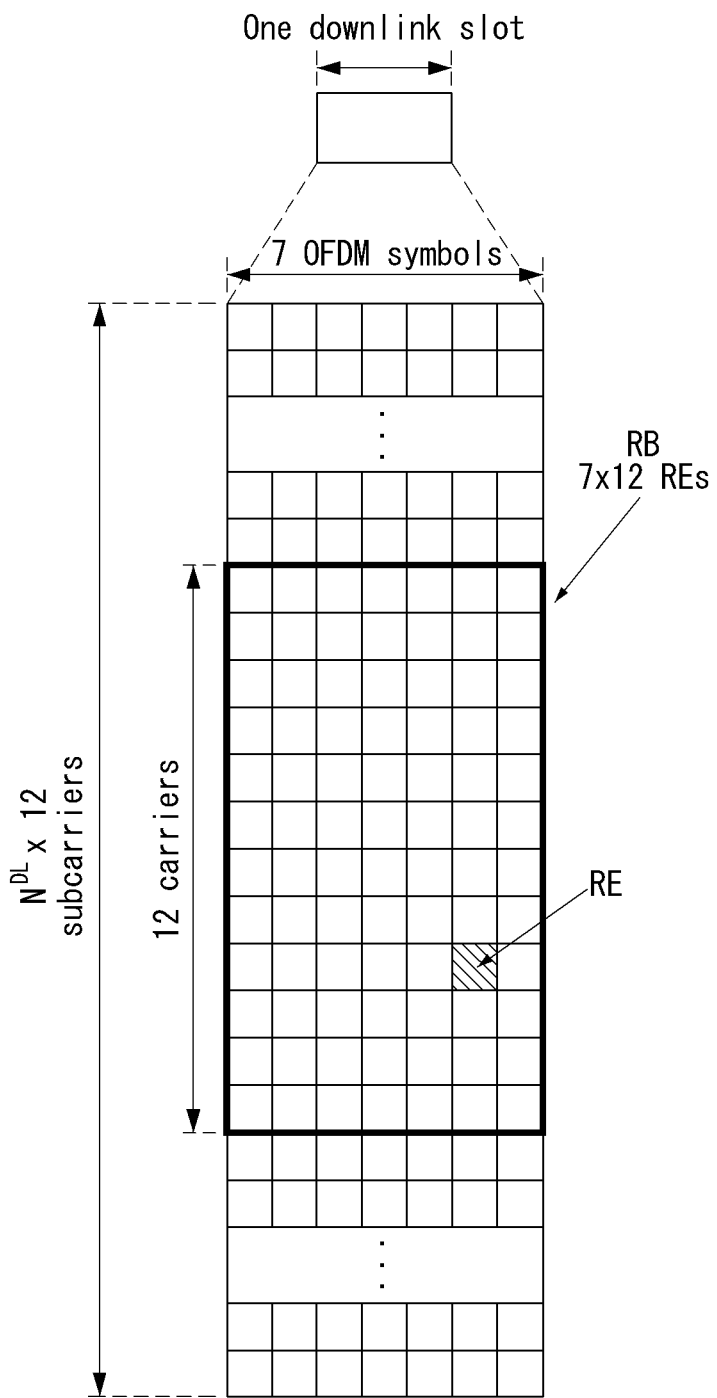

[FIG. 3]
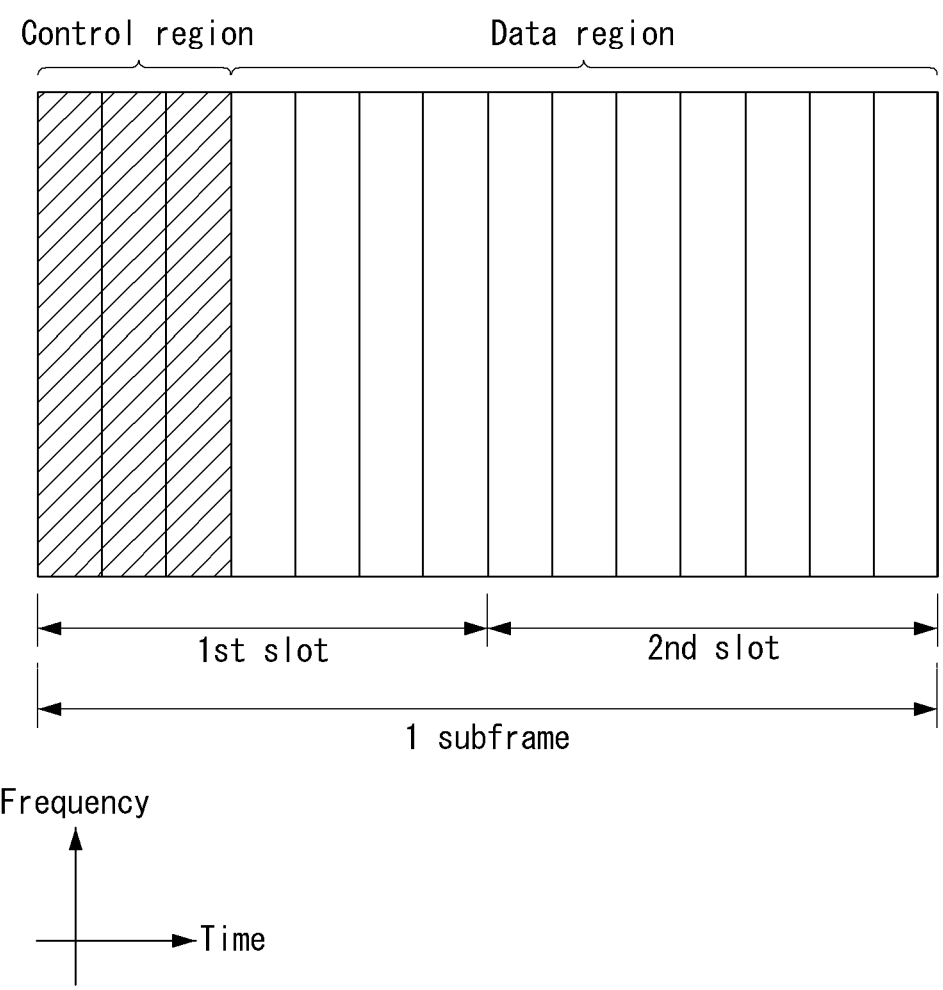

[FIG. 4]
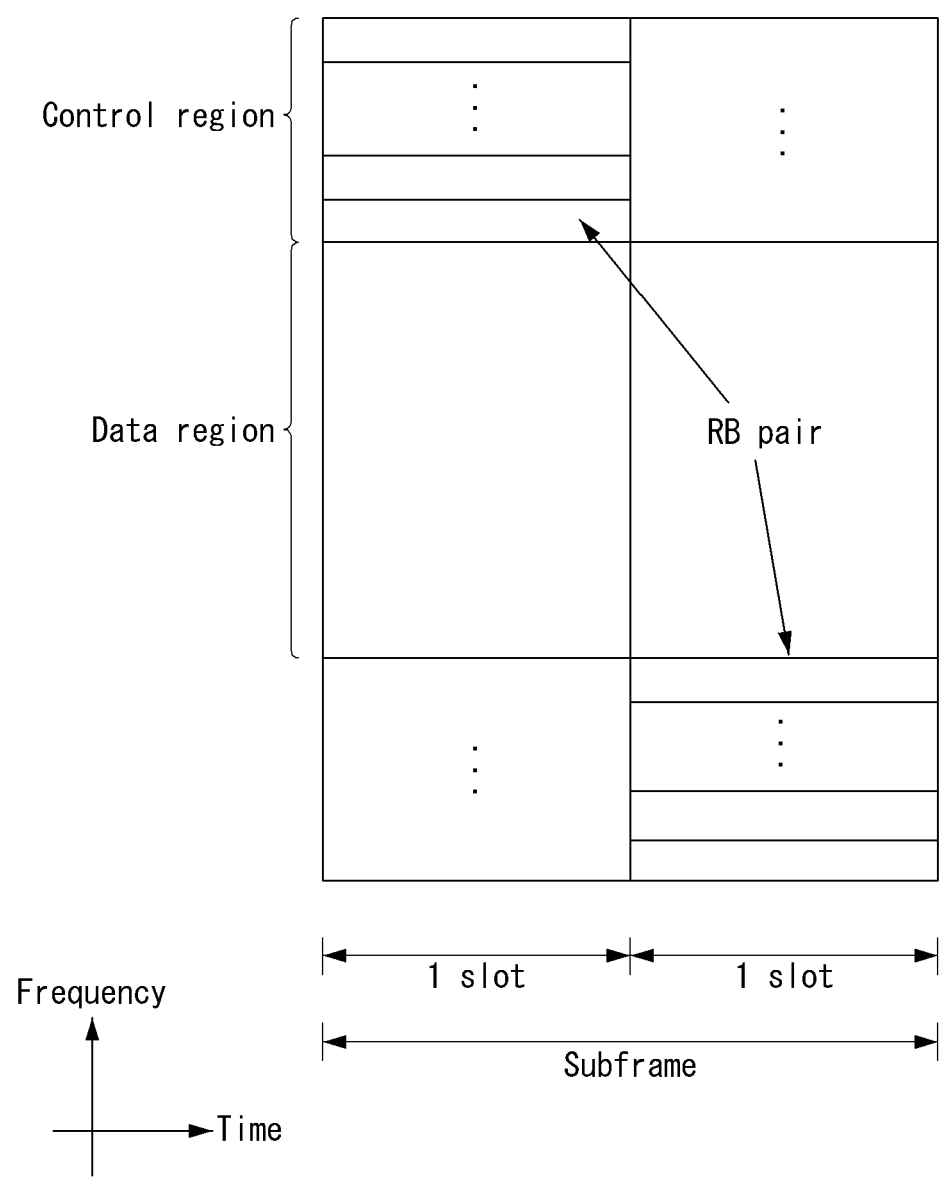

[FIG. 5]
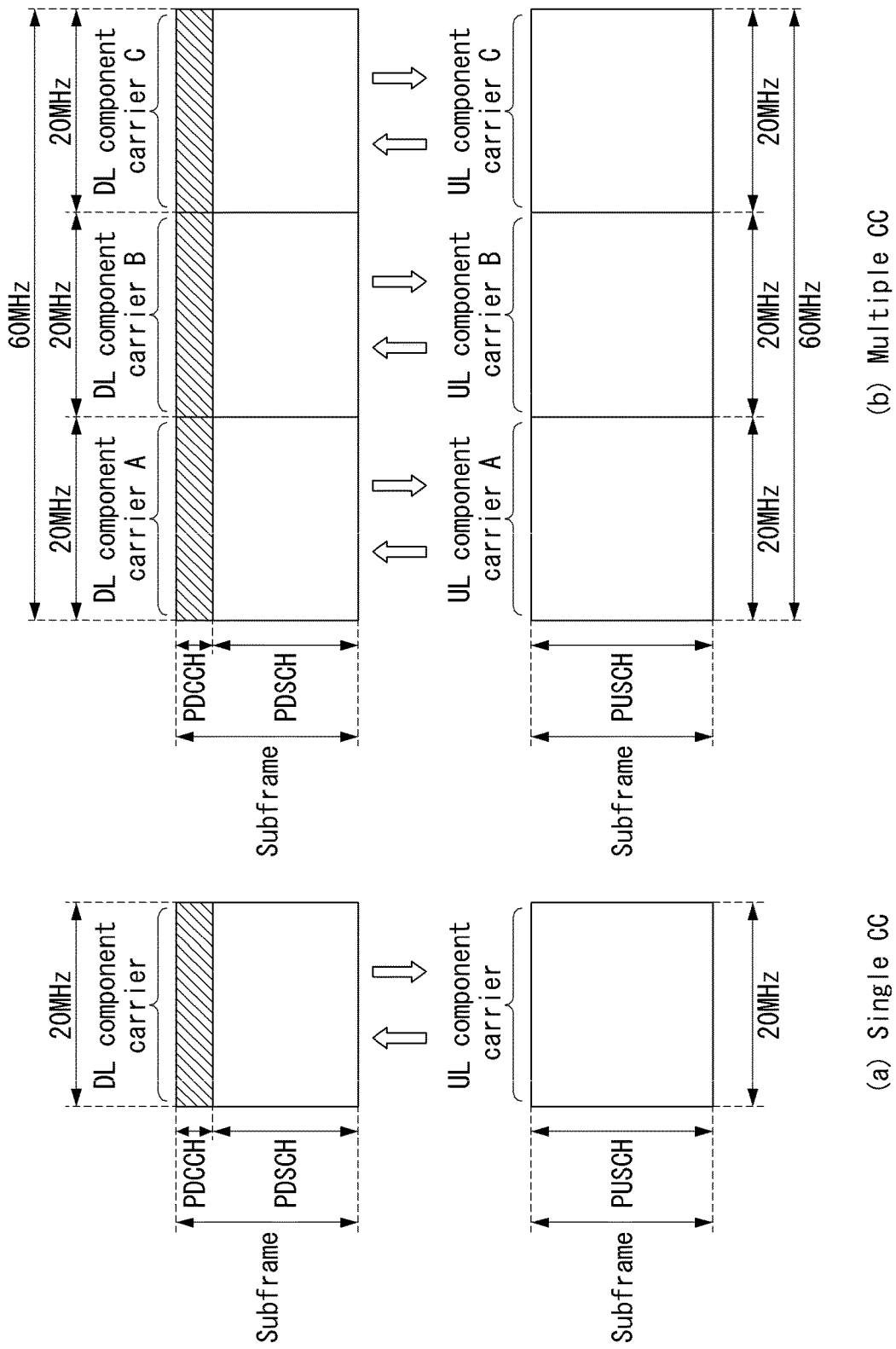

[FIG. 6]
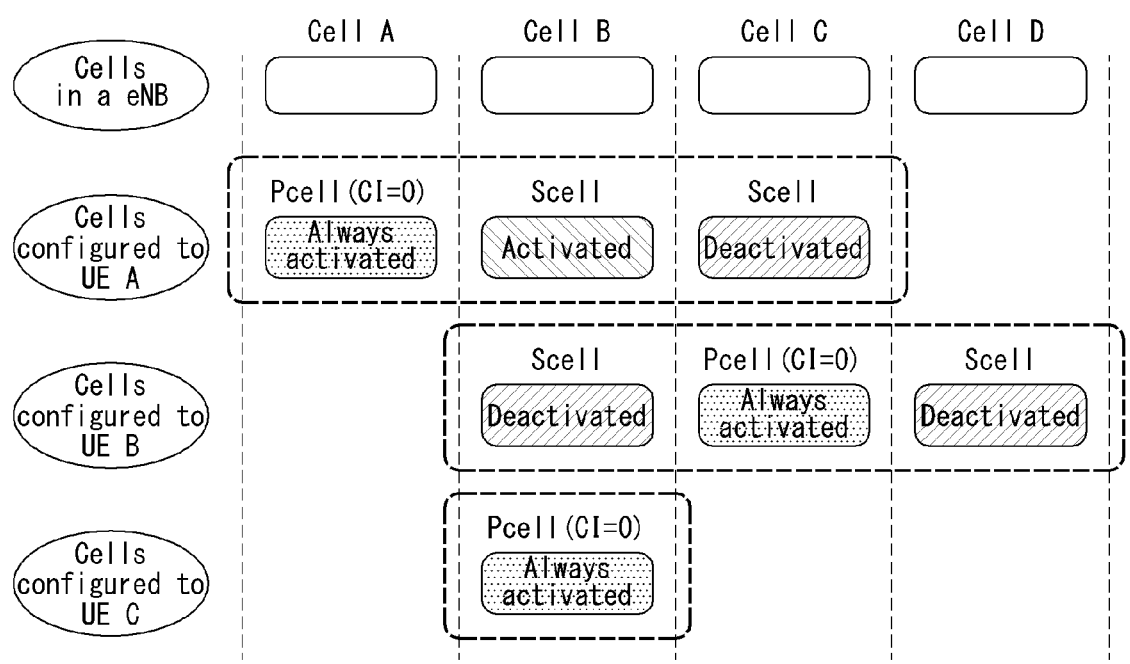

[FIG. 7]
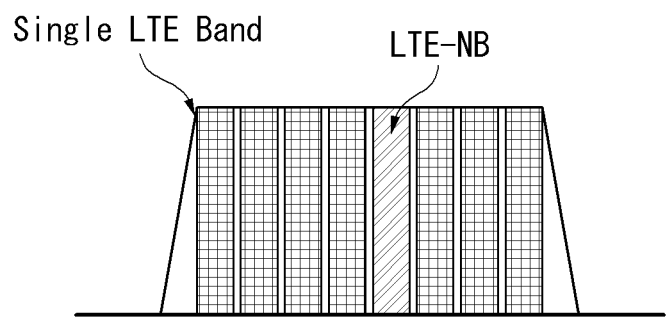
(a) In-band system
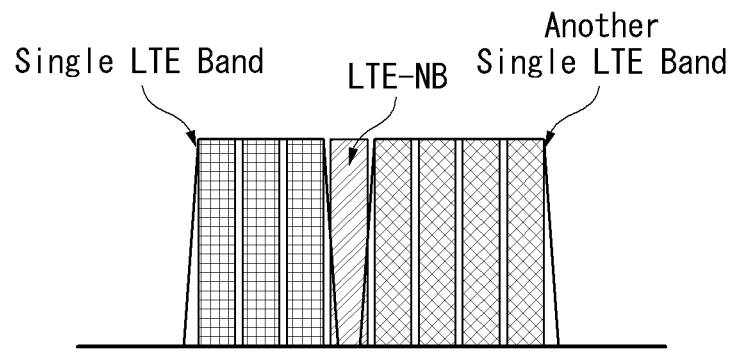
(b) Guard-band system
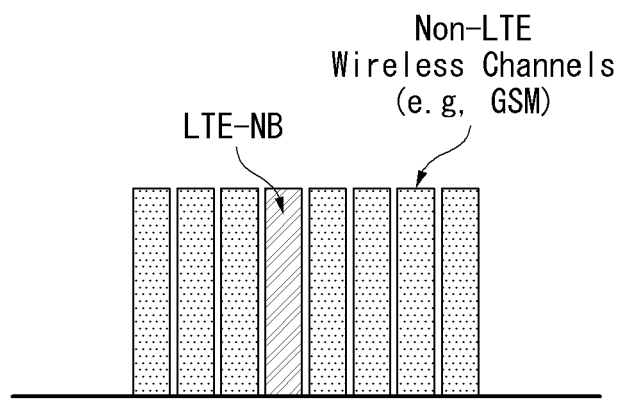
(c) Stand-alone system

[FIG. 8]
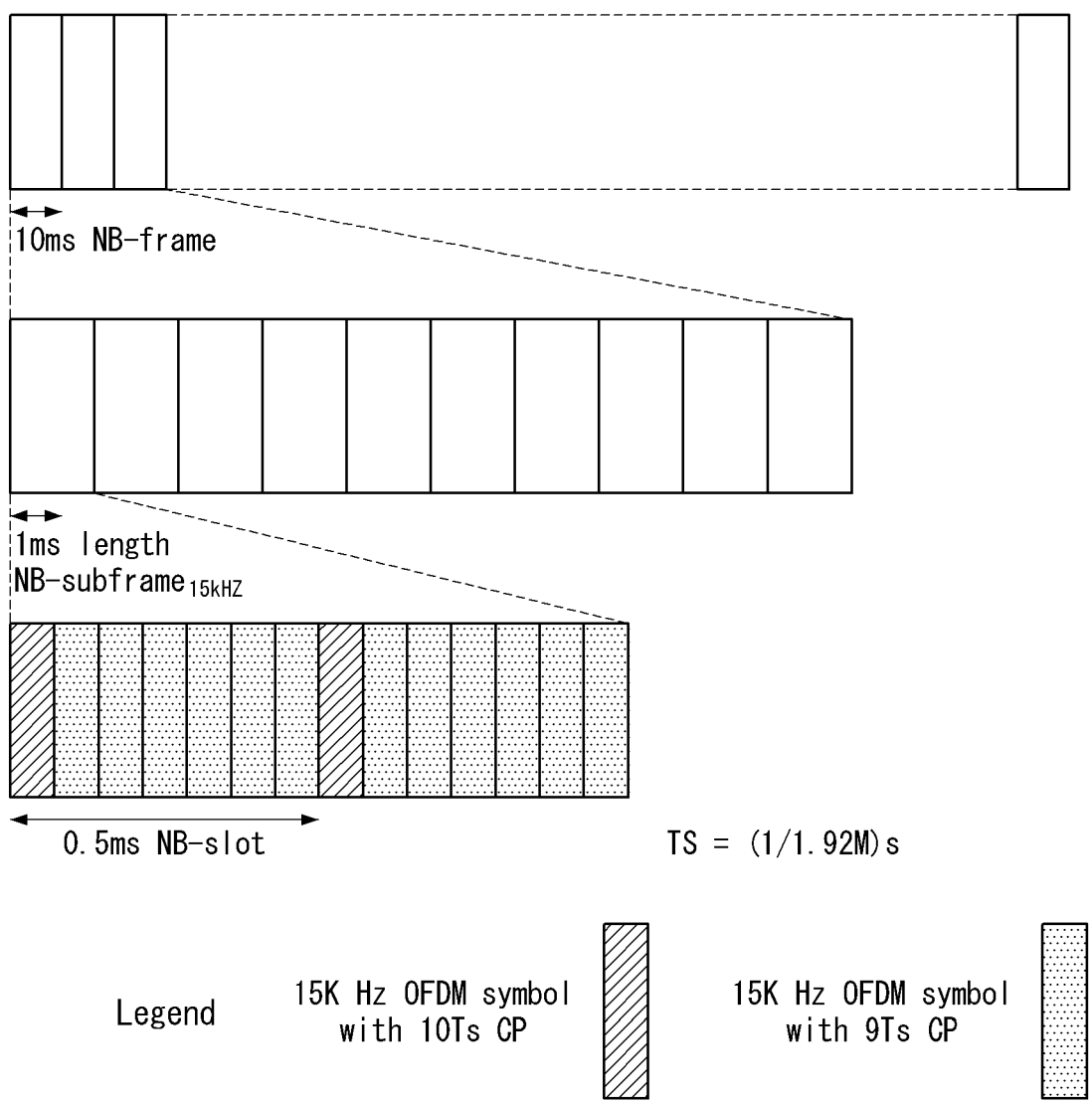

[FIG. 9]
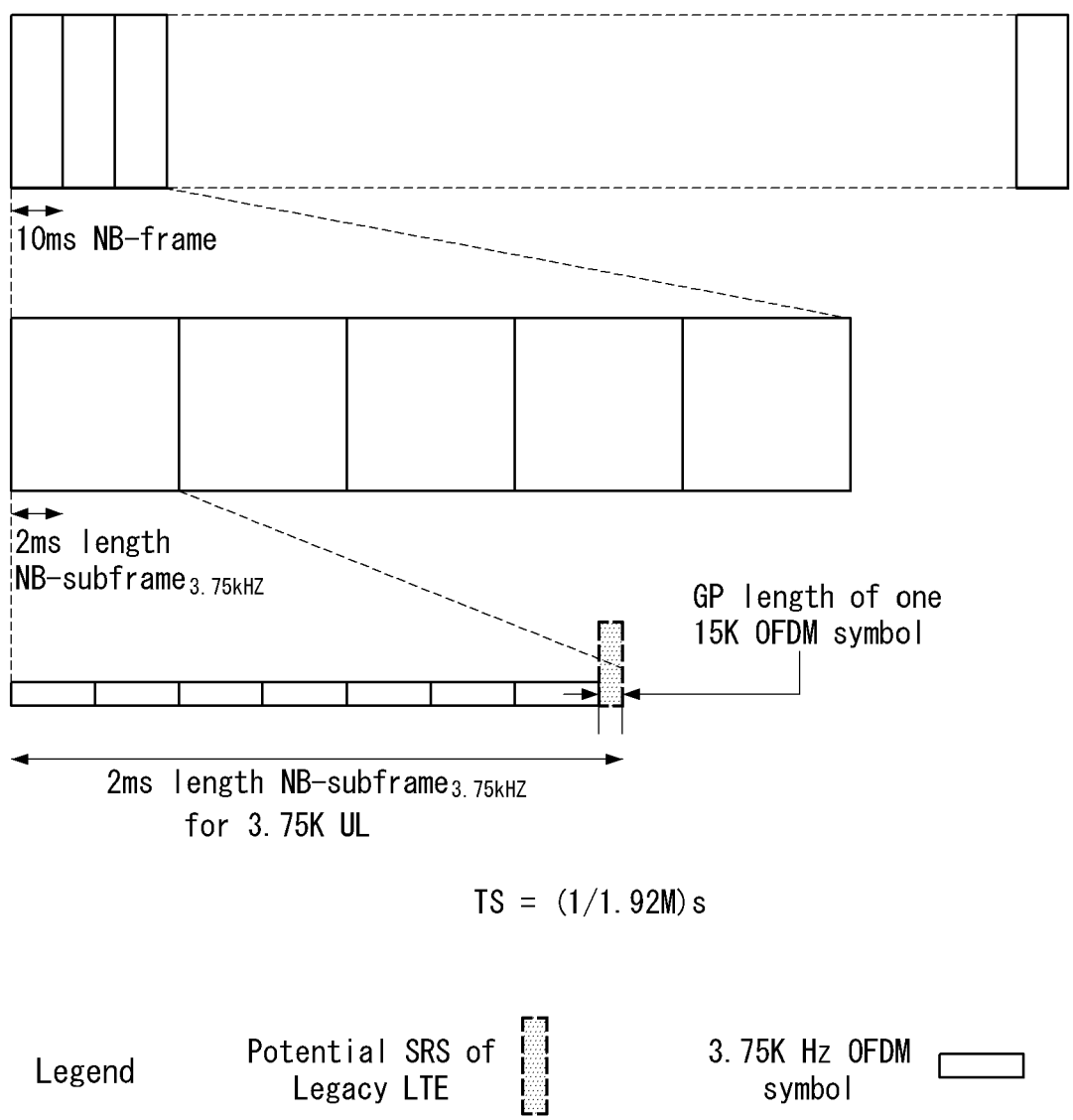

[FIG. 10]
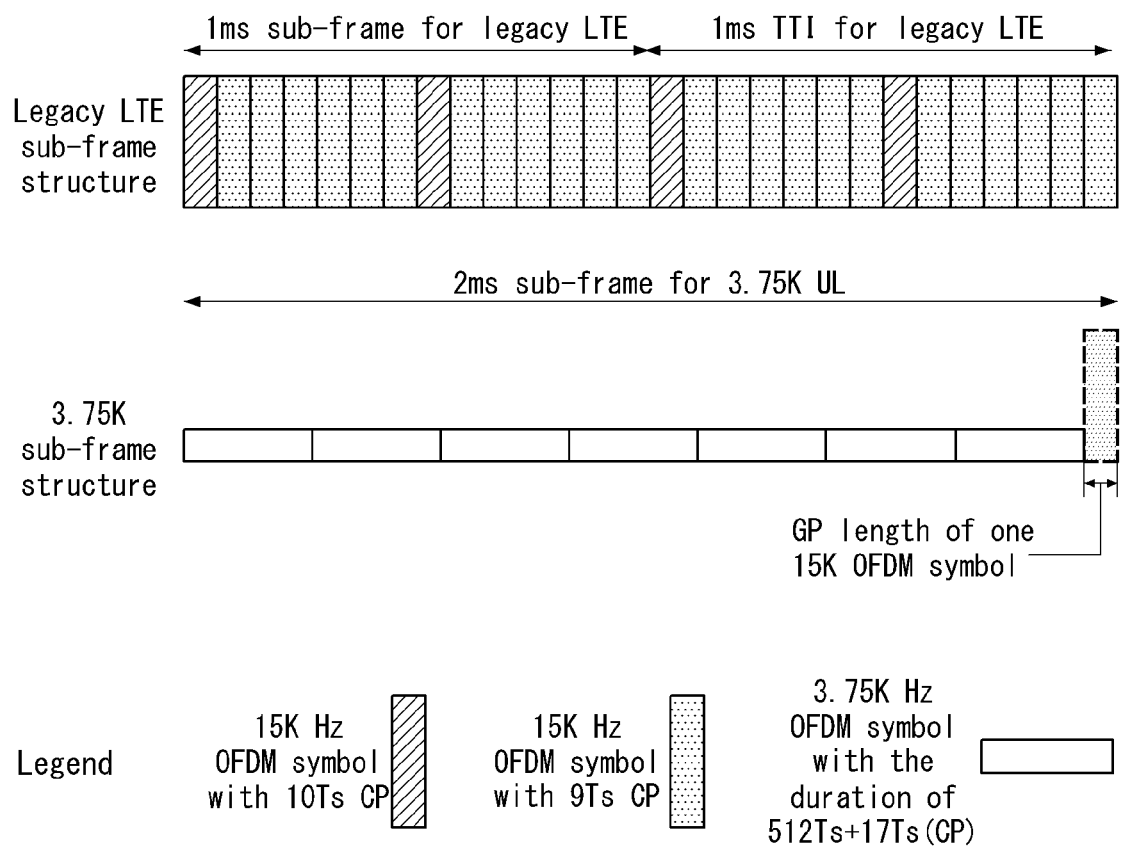

[FIG. 11]
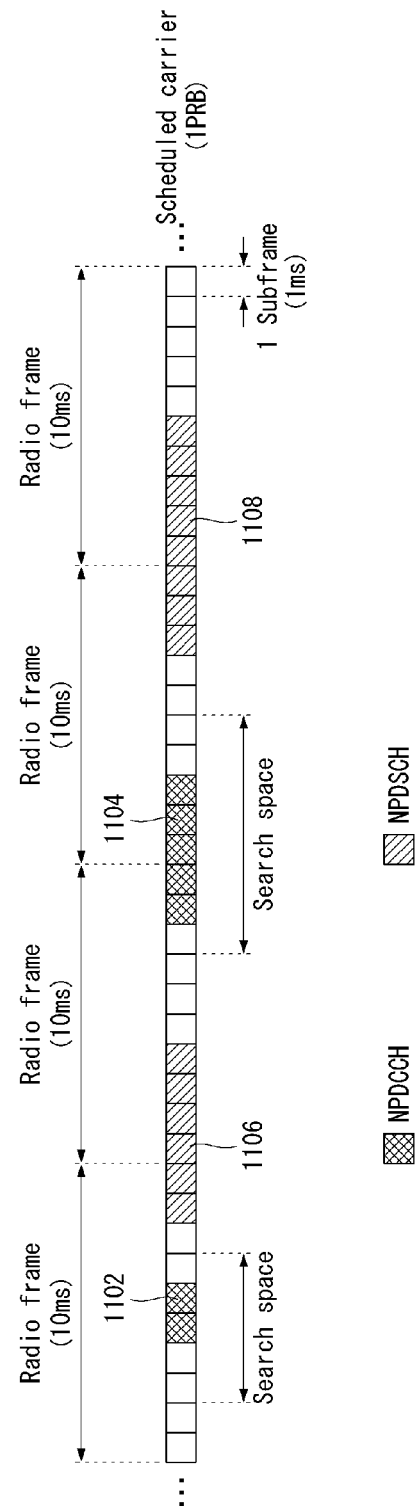

[FIG. 12]
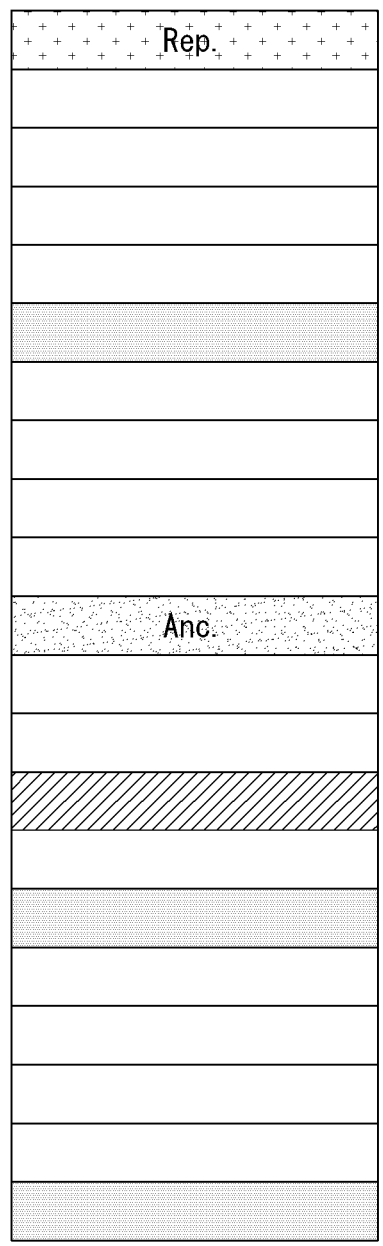
▨ Additional PRB (1202)
☐ Anchor-type PRB (1204)
[Anc.] Anchor PRB (1206)
[Rep.] Representative PRB (1208)

[FIG. 13]
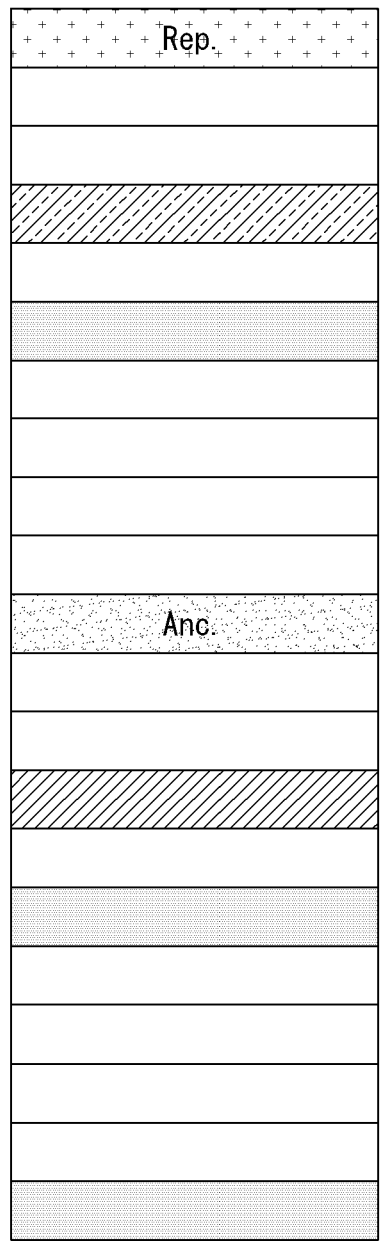
 M-PRB (1302)
 Additional PRB (1304)
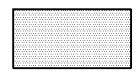 Anchor-type PRB (1306)
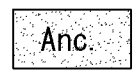 Anchor PRB (1308)
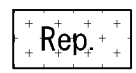 Representative PRB (1310)

[FIG. 14]
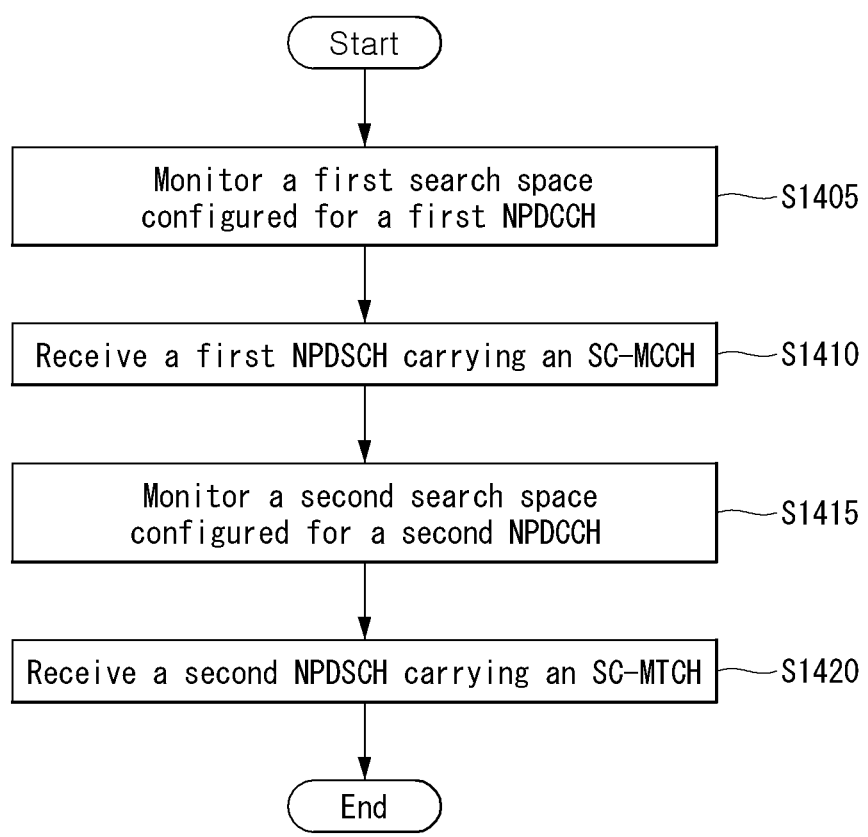

[FIG. 15]
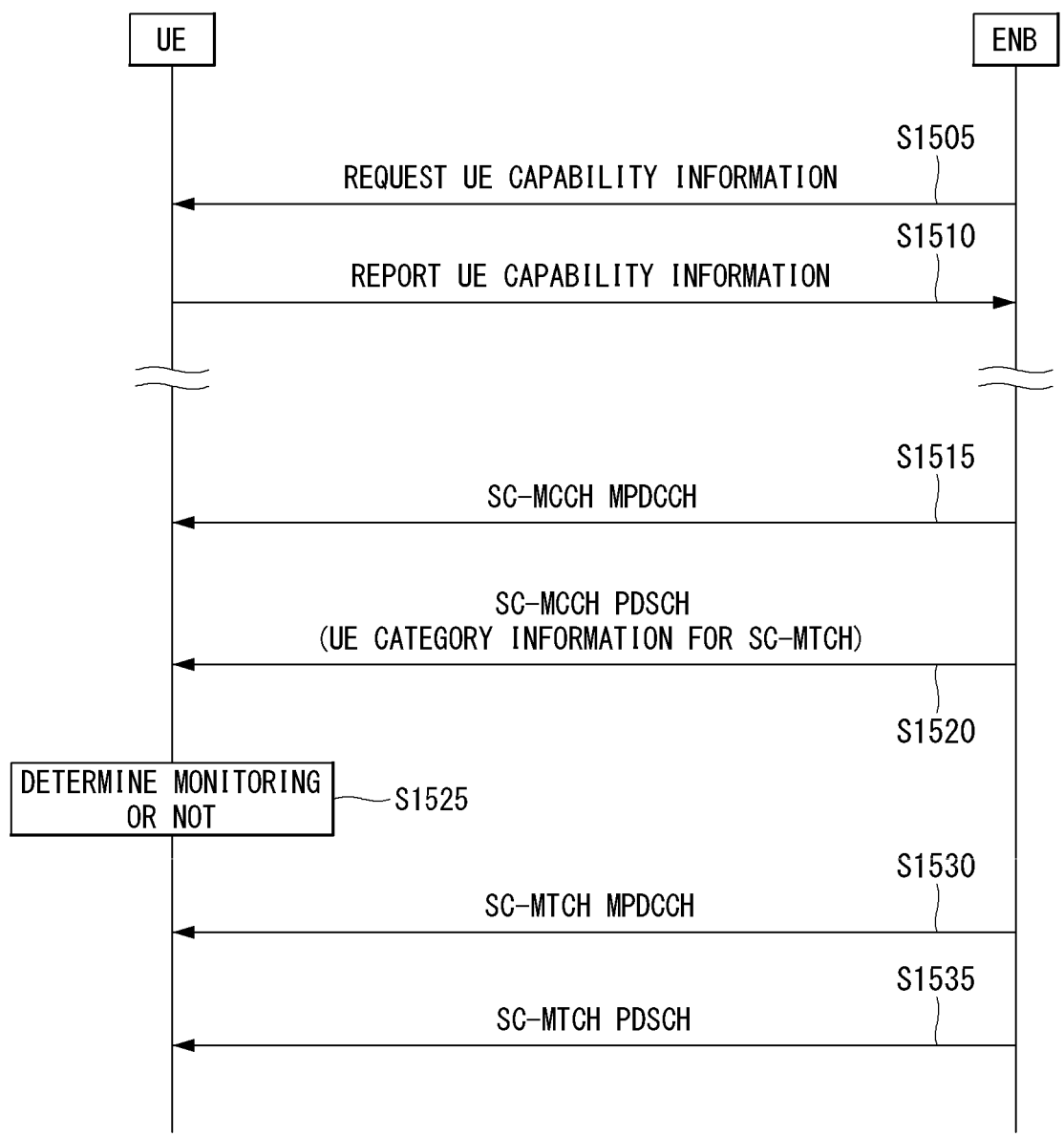

[FIG. 16]
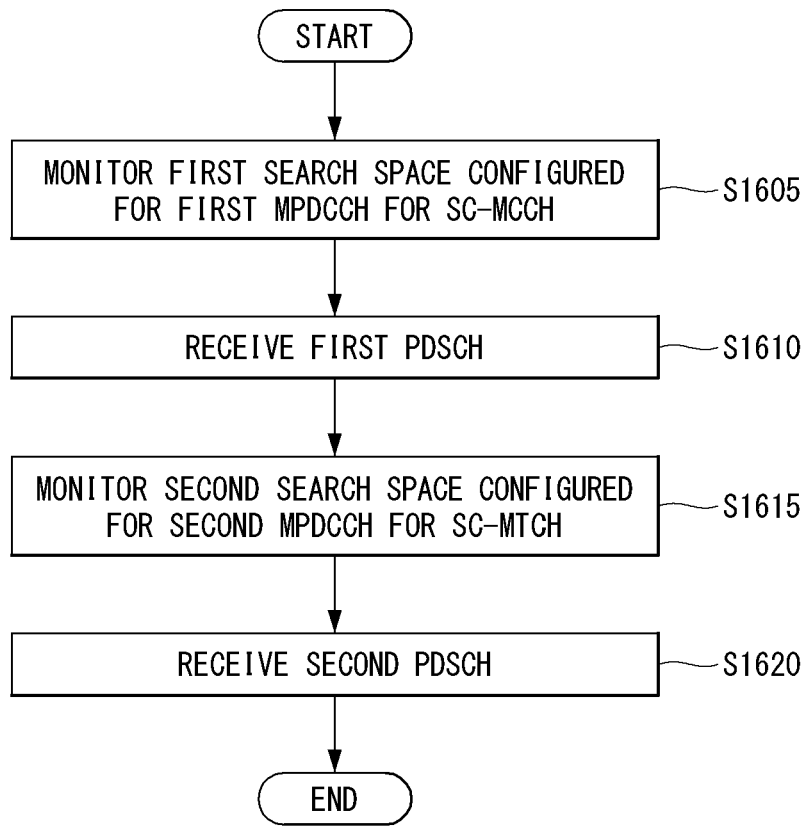
[FIG. 17]
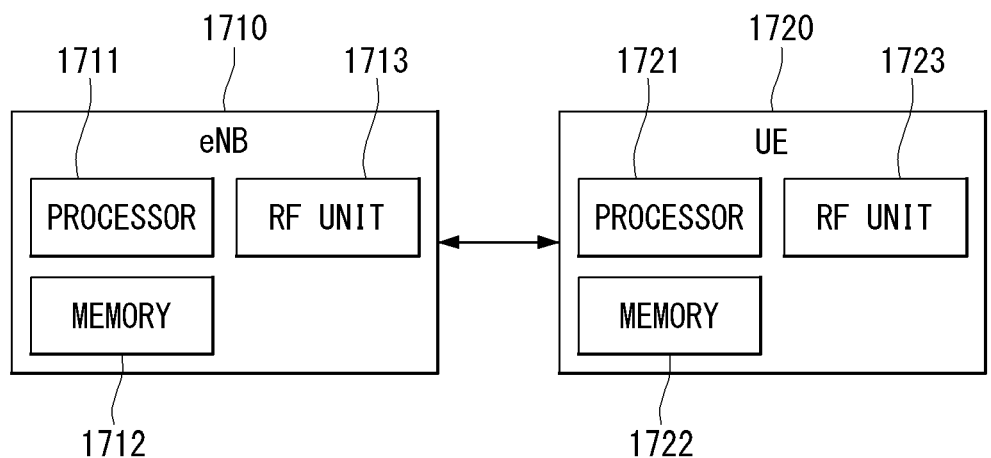

[FIG. 18]
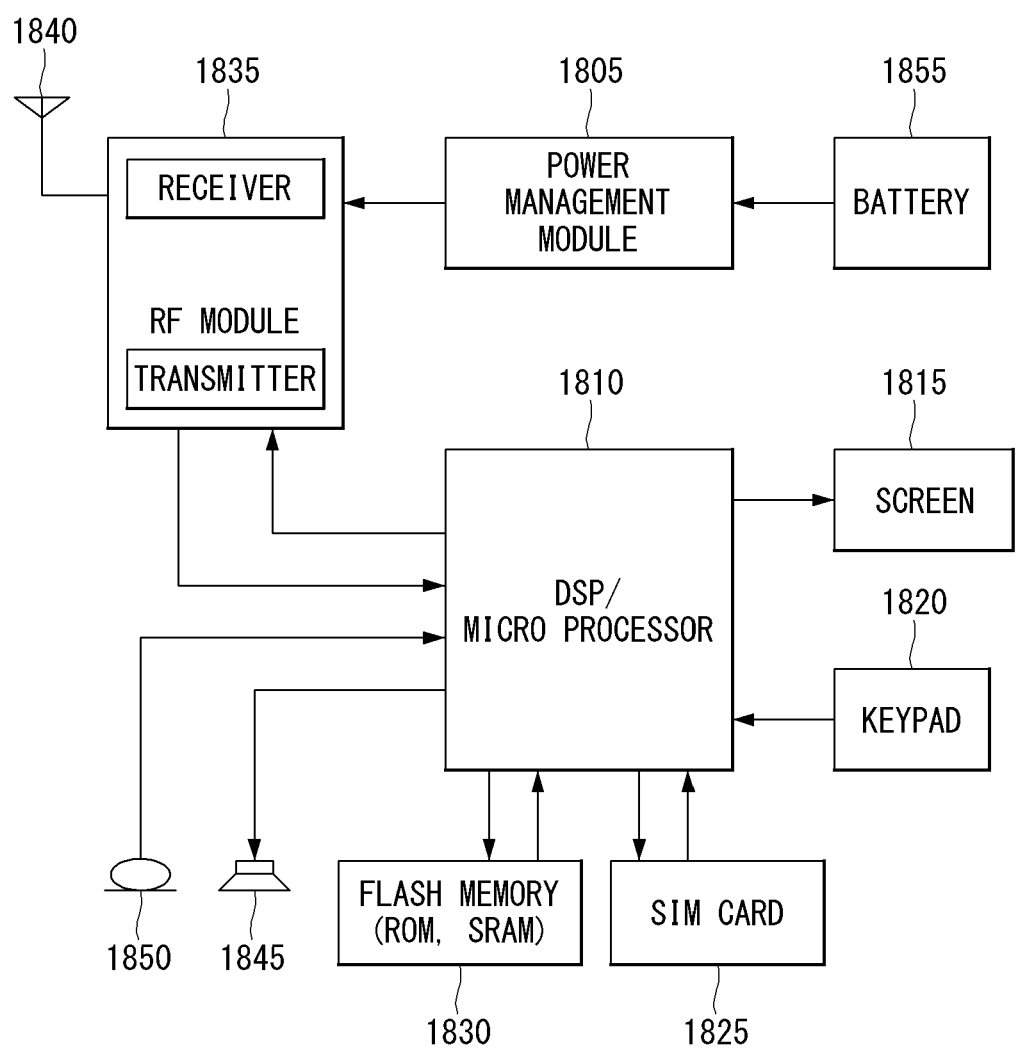

METHOD FOR TRANSMITTING AND RECEIVING DATA IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2017/012484, filed on Nov. 6, 2017, which claims the benefit of U.S. Provisional Application No. 62/454,877, filed on Feb. 5, 2017, and U.S. Provisional Application No. 62/417,343, filed on Nov. 4, 2016. The disclosures of the prior applications are incorporated by reference in their entirety.

TECHNICAL FIELD

The present invention relates to a method for transmitting and receiving data in a wireless communication system, and more particularly, to a method for transmitting data in association with transmission of multicast and/or broadcast information and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An embodiment of the present invention provides a method for transmitting and receiving data based on a Single Cell-Point to Multipoint (SC-PtM) in a wireless communication system.

Specifically, an embodiment of the present invention provides a method for transmitting and receiving a multicast signal and/or channel using a PRB different from a PRB (i.e., a camp on PRB, a unicast PRB, a paging PRB, or a random access PRB) configured for existing NB-IoT and/or MTC transmissions.

Furthermore, an embodiment of the present invention provides a method for transmitting and receiving the multicast signal and/or channel using a PRB which is the same as the PRB configured for the existing NB-IoT and/or MTC transmissions.

Furthermore, an embodiment of the present invention provides a method for notifying a change of a Multicast Control Channel (MCCH).

Furthermore, an embodiment of the present invention provides a method for transmitting a downlink control channel transmitting control information of the MCCH through multiple PRBs.

Furthermore, an embodiment of the present invention provides a method for configuring a repetition number (i.e., a coverage enhancement level) of the multicast signal and/or channel.

Furthermore, an embodiment of the present invention provides a method for transmitting and receiving an SC-MCCH and an SC-MTCH when supporting multiple UE categories in NB-IoT and/or MTC.

Furthermore, an embodiment of the present invention provides a method for delivering resource allocation information in MTC considering a narrow band and a wide band.

The technical objects of the present invention are not limited to the aforementioned technical objects, and other technical objects, which are not mentioned above, will be apparently appreciated by a person having ordinary skill in the art from the following description.

Technical Solution

In an aspect, a method for transmitting and receiving, by a user equipment (UE), data in a wireless communication system supporting Machine-Type Communication (MTC) includes: monitoring a first search space configured for an MTC Physical Downlink Control Channel (MPDCCH), in which the first MPDCCH includes first control information for scheduling of a first Physical Downlink shared Channel (PDSCH) for transferring a Single Cell-Multicast Control Channel (SC-MCCH); receiving the first PDSCH based on the first control information; monitoring a second search space configured for a second MPDCCH using a group identifier acquired through the SC-MCCH, in which the second MPDCCH includes second control information for scheduling of a second PDSCH for transferring a Single Cell-Multicast Traffic Channel (SC-MTCH); and receiving the second PDSCH based on the second control information, in which configuration information indicating a frequency bandwidth which the UE is capable of using in order to receive the second PDSCH may be transferred through the SC-MCCH.

Furthermore, in the method according to the embodiment of the present invention, the configuration information may indicate any one of a first frequency bandwidth and a second frequency bandwidth, and the first frequency bandwidth may be configured to be larger than the second frequency bandwidth.

Furthermore, in the method according to the embodiment of the present invention, a first transport block size (TBS) table may be configured to be used with respect to the first frequency bandwidth, a second TBS table may be configured to be used with respect to the second frequency bandwidth, and TBS values represented by the second TBS table are included in the first TBS.

Furthermore, in the method according to the embodiment of the present invention, the configuration information may indicate a first frequency bandwidth corresponding to 6 resource blocks and a second frequency bandwidth corresponding to 24 resource blocks.

Furthermore, in the method according to the embodiment of the present invention, the configuration information may be a 1 bit indicator indicating any one of the first frequency bandwidth and the second frequency bandwidth.

Furthermore, in the method according to the embodiment of the present invention, the group identifier and the configuration information may be configured for each Temporary Mobile Group Identity (TMGI).

Furthermore, in the method according to the embodiment of the present invention, the first search space may be monitored by using a single cell identifier.

Further, the method according to the embodiment of the present invention may further include transmitting capability information of the UE to a base station, in which the configuration information may be generated based on the capability information of the UE based the base station.

Furthermore, in the method according to the embodiment of the present invention, the first control information may be downlink control information corresponding to Downlink Control Information (DCI) format 6-2, and the second control information may be downlink control information corresponding to any one of DCI format 6-1A or DCI format 6-1B.

Furthermore, in the method according to the embodiment of the present invention, the configuration information may be transferred through the SC-MCCH when the UE supports an SC-PtM scheme.

In another aspect, a UE transmitting and receiving, by a user equipment (UE), data in a wireless communication system supporting Machine-Type Communication (MTC) includes: a Radio Frequency (RF) unit for transmitting and receiving a radio signal; and a processor functionally connected to the RF unit, in which the processor is configured to monitor a first search space configured for an MTC Physical Downlink Control Channel (MPDCCH), in which the first MPDCCH includes first control information for scheduling of a first Physical Downlink shared Channel (PDSCH) for transferring a Single Cell-Multicast Control Channel (SC-MCCH), monitor a first search space configured for an MTC Physical Downlink Control Channel (MPDCCH), where the first MPDCCH includes first control information for scheduling of a first Physical Downlink shared Channel (PDSCH) for transferring a Single Cell-Multicast Control Channel (SC-MCCH), receive the first PDSCH based on the first control information, monitor a second search space configured for a second MPDCCH using a group identifier acquired through the SC-MCCH, in which the second MPDCCH includes second control information for scheduling of a second PDSCH for transferring a Single Cell-Multicast Traffic Channel (SC-MTCH), and receive the second PDSCH based on the second control information, and in which configuration information indicating a frequency bandwidth which the UE is capable of using in order to receive the second PDSCH is transferred through the SC-MCCH.

Furthermore, in the UE according to the embodiment of the present invention, the configuration information may indicate any one of a first frequency bandwidth and a second frequency bandwidth, and the first frequency bandwidth may be configured to be larger than the second frequency bandwidth.

Furthermore, in the UE according to the embodiment of the present invention, the configuration information may indicate a first frequency bandwidth corresponding to 6 resource blocks and a second frequency bandwidth corresponding to 24 resource blocks.

Furthermore, in the UE according to the embodiment of the present invention, a first transport block size (TBS) table may be configured to be used with respect to the first frequency bandwidth, a second TBS table may be configured to be used with respect to the second frequency bandwidth, and TBS values represented by the second TBS table are included in the first TBS.

Furthermore, in the UE according to the embodiment of the present invention, the first control information may be downlink control information corresponding to Downlink Control Information (DCI) format 6-2, and the second control information may be downlink control information corresponding to any one of DCI format 6-1A or DCI format 6-1B.

Advantageous Effects

According to an embodiment of the present invention, even in an MTC system supporting multiple UE categories, multicast information or broadcast information can be efficiently delivered.

In addition, according to an embodiment of the present invention, a UE need not monitor a search area (or DCI) which does not correspond thereto, and as a result, the multicast information or broadcast information can be efficiently transmitted in terms of power consumption of the UE.

Advantages which can be obtained in the present invention are not limited to the aforementioned effects and other unmentioned advantages will be clearly understood by those skilled in the art from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 illustrates one example of a component carrier and carrier aggregation in a wireless communication system to which the present invention may be applied.

FIG. 6 illustrates an example where a system supporting carrier aggregation distinguishes cells.

FIG. 7 illustrates one example of an operation system of an NB LTE system to which a method proposed by the present specification may be applied.

FIG. 8 illustrates one example of an NB frame structure having a 15 kHz subcarrier spacing to which a method proposed by the present specification may be applied.

FIG. 9 illustrates one example of an NB frame structure having a 3.75 kHz subcarrier spacing to which a method proposed by the present specification may be applied.

FIG. 10 illustrates one example of an NB frame structure having a 3.75 kHz subcarrier spacing to which a method proposed by the present specification may be applied.

FIG. 11 illustrates one example of a method for transmitting an N-PDCCH and an N-PDSCH in an NB-LTE system to which a method proposed by the present specification may be applied.

FIG. 12 illustrates one example of a method for configuring a PRB in an NB-LTE (i.e. NB-IoT) system to which a method proposed by the present invention may be applied.

FIG. 13 illustrates another example of a method for configuring a PRB in an NB-LTE (i.e. NB-IoT) system to which a method proposed by the present invention may be applied.

FIG. 14 illustrates an operation flow diagram of a UE transmitting/receiving data in a wireless communication system supporting NB-IoT to which a method proposed by the present specification may be applied.

FIG. 15 illustrates a signaling procedure between an ENB and a UE that transmit and receive UE category information in a wireless communication system to which a method proposed by this specification may be applied.

FIG. 16 illustrates a flowchart of an operation of a UE transmitting and receiving data in a wireless communication system supporting Machine-Type Communication (MTC) to which the method proposed by the present specification may be applied.

FIG. 17 illustrates a block diagram of a wireless communication device to which methods proposed by this specification may be applied.

FIG. 18 illustrates a block diagram of a communication device according to an embodiment of the present invention.

MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(*a*) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2. A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to a UE and attaches a Cyclic Redundancy Check (CRC) to the control information. A unique identifier (which is called a Radio Network Temporary Identifier (RNTI)) is masked to the CRC depending on the owner or use of a PDCCH. If the PDCCH is intended for a specific UE, an identifier unique to the UE, for example, a Cell-RNTI (C-RNTI) may be masked to the CRC. If the PDCCH is intended for a paging message, a paging indication identifier, for example, a Paging-RNTI (P-RNTI) may be masked to the CRC. If the PDCCH is intended for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by a UE.

An EPDCCH (Enhanced PDCCH) carries UE-specific signaling. An EPDCCH is disposed at a Physical Resource Block (PRB) determined in a UE-specific manner. In other words, as described above, a PDCCH may be transmitted from up to three OFDM symbols in a first slot of a subframe, but an EPDCCH may be transmitted f a non-PDCCH resource region. The starting point (i.e., symbol) at which an EPDCCH is started in a subframe may be set to a UE through higher layer signaling (for example, RRC signaling).

An EPDCCH may carry a transmission format related to the DL-SCH; resource allocation and HARQ information; transmission format related to the UL-SCH; resource allocation information related to the Sidelink Shared Channel (SL-SCH) and Physical Sidelink Control Channel (PSCCH). Multiple EPDCCHs may be supported, and a UE may monitor a set of EPCCHs.

An EPDCCH may be transmitted by using one or more consecutive Enhanced CCEs (ECCEs), and for each EPDCCH format, the number of ECCEs for each EPDCCH may be determined.

Each ECCE may comprise a plurality of Enhanced Resource Element Groups (EREGs). An EREG is used for defining mapping ECCEs to REs. For each PRB pair, 16 EREGs may be defined. In each PRB pair, except for those REs carrying a DMRS, all of the REs are numbered ranging from 0 to 15 in the increasing order of frequency and then in the increasing order of time.

The UE may monitor a plurality of EPDCCHs. For example, one or two EPDCCH sets may be configured within one PRB pair for which the UE monitors EPDCCH transmission.

As a different number of ECCEs are merged together, different coding rates may be implemented for an EPCCH. An EPCCH may employ localized transmission or distributed transmission, according to which mapping of the ECCE to an RE within a PRB may be varied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Carrier Aggregation in General

Communication environments considered in the embodiments of the present invention includes all of multi-carrier supporting environments. In other words, a multi-carrier system or a carrier aggregation system according to the present invention refers to the system utilizing aggregation of one or more component carriers having bandwidth narrower than target bandwidth to establish a broadband communication environment.

A multi-carrier according to the present invention refers to aggregation of carriers, and the carrier aggregation in this sense refers to not only the aggregation of contiguous carriers but also the aggregation of non-contiguous carriers. Also, the numbers of component carriers aggregated for downlink and uplink transmission can be set differently from each other. The case where the number of downlink component carriers (hereinafter, it is called 'DL CC') is the same as the number of uplink component carriers (hereinafter, it is called 'UL CC') is called symmetric aggregation, whereas it is called asymmetric aggregation otherwise. The term of carrier aggregation may be used interchangeably with bandwidth aggregation and spectrum aggregation.

Carrier aggregation composed of a combination of two or more component carriers is intended to support bandwidth of up to 100 MHz for the case of the LTE-A system. When one or more carriers having narrower bandwidth than target bandwidth are combined, the bandwidth of the carrier to be combined may be limited to the bandwidth defined by an existing system to maintain compatibility with the existing IMT system. For example, while the existing system supports bandwidth of 1.4, 3, 5, 10, 15, and 20 MHz, the 3GPP LTE-A system may support bandwidth larger than 20 MHz by using a combination of the predefined bandwidth to maintain compatibility with the existing system. Also, a carrier aggregation system according to the present invention may support carrier aggregation by defining new bandwidth independently of the bandwidth used in the existing system.

The LTE-A system introduces a concept of a cell for management of radio resources.

The carrier aggregation environment may be referred to as a multiple cell environment. A cell is defined as a combination of a pair of a DL CC and an UL CC, but the UL CC is not an essential element. Therefore, a cell may be composed of downlink resources only or a combination of downlink and uplink resources. In case a particular UE is linked to only one configured serving cell, one DL CC and one UL CC are employed. However, if the particular UE is linked to two or more configured serving cells, as many DL CCs as the number of cells are employed while the number of UL CCs may be equal to or smaller than the number of DL CCs.

Meanwhile, the DL CCs and the UL CCs may be composed in the opposite way. In other words, in case a particular UE is linked to a plurality of configured serving cells, a carrier aggregation environment which has more UL CCs than DL CCs may also be supported. In other words, carrier aggregation may be understood as a combination of two or more cells having different carrier frequencies (center frequencies of the cells). At this time, the term of 'cell' should be distinguished from the 'cell' usually defined as a region covered by an eNB.

The LTE-A system defines a primary cell (PCell) and a secondary cell (SCell). A PCell and an SCell may be used as a serving cell. A UE being in an RRC_CONNECTED state but not being configured for carrier aggregation or not supporting carrier aggregation may be linked to one or more serving cells, and the entire serving cells include a PCell and one or more SCells.

A serving cell (PCell and SCell) may be configured through an RRC parameter. PhysCellId is a physical layer identifier of a cell, having an integer value ranging from 0 to 503. SCellIndex is a short identifier used for identifying an SCell, having an integer value ranging from 1 to 7. ServCellIndex is a short identifier used for identifying a serving cell (PCell or SCell), having an integer value ranging from 0 to 7. The value of 0 is applied to a PCell, and SCellIndex is pre-assigned to be applied to an SCell. In other words, the cell which has the smallest cell ID (or cell index) of ServCellIndex becomes the PCell.

A PCell refers to a cell operating on a primary frequency (or a primary CC). A PCell may be used for an UE to perform an initial connection establishment process or a connection re-establishment process; a PCell may refer to the cell indicated during a handover process. Also, a PCell refers to the cell which plays a central role for control-related communication among configured serving cells in a carrier aggregation environment. In other words, a UE is capable of receiving and transmitting a PUCCH only through its own PCell; also, the UE may obtain system information or modify a monitoring procedure only through the PCell. The Evolved Universal Terrestrial Radio Access Network (E-UTRAN) may change only the PCell by using an RRC connection reconfiguration message (RRCConnectionReconfiguration) of a higher layer including mobility control information (mobilityControlInfo) so that the UE supporting carrier aggregation environments may carry out a handout procedure.

An SCell refers to a cell operating on a secondary frequency (or a secondary CC). For a particular UE, only one PCell is allocated, but one or more SCells may be allocated. An SCell may be composed after configuration for an RRC connection is completed and may be used to provide additional radio resources. A PUCCH does not exist in the remaining cells except for PCells among the serving cells configured for a carrier aggregation environment, i.e., SCells. When adding an SCell to a UE supporting a carrier aggregation environment, the E-UTRAN may provide all of the system information related to the operation of a cell in the RRC_CONNECTED state through a dedicated signal. Modification of system information may be controlled according to release and addition of a related SCell, and at this time, an RRC connection reconfiguration (RRCConnectionReconfiguration) message of a higher layer may be used. The E-UTRAN, instead of broadcasting a signal within an SCell, may carry out dedicated signaling using parameters different for each UE.

After the initial security activation process is started, the E-UTRAN may form a network including one or more SCells in addition to a PCell defined in the initial step of a connection establishment process. In a carrier aggregation environment, a PCell and an SCell may operate as an independent component carrier. In the embodiment below, a primary component carrier (PCC) may be used in the same context as the PCell, while a secondary component carrier (SCC) may be used in the same context as the SCell.

FIG. 5 illustrates one example of a component carrier and carrier aggregation in a wireless communication system to which the present invention can be applied.

FIG. 5(a) shows a single carrier structure defined in the LTE system. Two types of component carriers are used: DL CC and UL CC. A component carrier may have frequency bandwidth of 20 MHz.

FIG. 5(b) shows a carrier aggregation structure used in the LTE A system. FIG. 5(b) shows a case where three component carriers having frequency bandwidth of 20 MHz are aggregated. In this example, 3 DL CCs and 3 UL CCs are employed, but the number of DL CCs and UL CCs is not limited to the example. In the case of carrier aggregation, the UE is capable of monitoring 3 CCs at the same time, capable of receiving a downlink signal/data and transmitting an uplink signal/data.

If a particular cell manages N DL CCs, the network may allocate M (M≤N) DL CCs to the UE. At this time, the UE may monitor only the M DL CCs and receive a DL signal from the M DL CCs. Also, the network may assign priorities for L (L≤M≤N) DL CCs so that primary DL CCs may be allocated to the UE; in this case, the UE has to monitor the L DL CCs. This scheme may be applied in the same manner to uplink transmission.

Linkage between a carrier frequency of downlink resources (or DL CC) and a carrier frequency of uplink resources (or UL CC) may be designated by a higher layer message such as an RRC message or system information. For example, according to the linkage defined by system information block type 2 (SIB2), a combination of DL resources and UL resources may be determined. More specifically, the linkage may refer to a mapping relationship between a DL CC through which a PDCCH carrying an UL grant is transmitted and an UL CC that uses the UL grant; or a mapping relationship between a DL CC (or an UL CC) through which data for HARQ signal are transmitted and an UL CC (or a DL CC) through which a HARQ ACK/NACK signal is transmitted.

FIG. 6 illustrates an example where a system supporting carrier aggregation distinguishes cells.

Referring to FIG. 6, a configured cell is a cell which is configured for carrier aggregation based on a measurement report among cells of an eNB and is configured for each UE as shown in FIG. 5. A configured cell may reserve a resource for ack/nack transmission in advance with respect to PDSCH transmission. An activated cell is a cell configured to actually transmit a PDSCH/PUSCH among the configured cells, which performs Channel State Information (CSI) reporting for PDSCH/PUSCH transmission and Sounding Reference Signal (SRS) transmission. A de-activated cell is a cell configured not to perform PDSCH/PUSCH transmission by a command from the eNB or timer operation, which may stop CSI reporting and SRS transmission.

Operation System of NB-LTE System

FIG. 7 illustrates one example of an operation system of an NB LTE system to which a method proposed by the present specification may be applied.

More specifically, FIG. 7(a) illustrates an in-band system, FIG. 7(b) illustrates a guard-band system, and FIG. 7(c) illustrates a stand-alone system.

The in-band system may be denoted as in-band mode, guard-band system as guard-band mode, and stand-alone system as stand-alone mode.

The in-band system of FIG. 7(a) refers to a system or a mode which uses a specific one RB within the legacy LTE band for the NB-LTE (or LTE-NB) and may be operated by allocating part of resource blocks of a carrier in the LTE system.

FIG. 7(b) refers to a system or a mode which uses a reserved space for a guard band of the legacy LTE band for the NB-LTE and may be operated by allocating a guard-band of an LTE carrier not used as a resource block in the LTE system.

The legacy LTE band has a guard band spanning at least 100 kHz at the last portion of each LTE band.

To use a band of 200 kHz, two non-contiguous guard bands may be used.

The in-band system and the guard-band system uses a structure in which NB-LTE coexists within the legacy LTE band.

On the other hand, the standalone system of FIG. 7(c) refers to a system or a mode composed independently from the legacy LTE band and may be operated by separately allocating a frequency band (a re-allocated GSM carrier afterwards) used in the GERAN.

FIG. 8 illustrates one example of an NB frame structure having a 15 kHz subcarrier spacing to which a method proposed by the present specification may be applied.

As shown in FIG. 8, an NB frame structure having a 15 kHz subcarrier spacing may be regarded as having the same frame structure of the legacy system (LTE system).

In other words, a 10 ms NB frame comprises ten 1 ms NB subframes, and a 1 ms NB subframe comprises two 0.5 ms NB slots.

Also, a 0.5 ms NB slot comprises 7 OFDM symbols.

FIG. 9 illustrates one example of an NB frame structure having a 3.75 kHz subcarrier spacing to which a method proposed by the present specification may be applied.

Referring to FIG. 9, a 10 ms NB frame comprises five 2 ms NB subframes, and a 2 ms NB subframes comprises seven OFDM symbols and one guard period (GP).

The 2 ms NB subframe may also be denoted as an NB slot or an NB resource unit (RU).

FIG. 10 illustrates one example of an NB frame structure having a 3.75 kHz subcarrier spacing to which a method proposed by the present specification may be applied.

FIG. 10 illustrates a correspondence relationship between a legacy LTE subframe structure and a 3.75 kHz subframe.

With reference to FIG. 10, the 3.75 kHz subframe (2 ms) corresponds to two 1 ms subframes (or 1 ms TTIs) of the legacy LTE.

Single Cell Point-to-Multipoint (SC-PtM)

SC-PtM control information is provided on a specific logic channel (SC-MCCH, SC-Multicast Control Channel). SC-MCCH carries not only Multimedia Broadcast Multicast Service (MBMS) sessions but also an SC-PtM-Configuration message (i.e. SC-PtM configuration message) representing information about a scheduling window and a start offset when each session is scheduled (in other words, a scheduling period). Also, the SC-PtM configuration message provides information about neighbor cells transmitting MBMS sessions which are ongoing in the current cell. Also, a limited amount of SC-PtM control information is provided on the Broadcast Control Channel (BCCH). This is related primarily to the information needed to acquire the SC-MCCH.

According to the scheduling of the SC-MCCH, SC-MCCH information (i.e. information transmitted from messages transmitted through the SC-MCCH) is transmitted periodically by using a configurable repetition period. SC-MCCH transmission (and related radio resources) and the Modulation and Coding Scheme (MCS) are indicated on Physical Downlink Control Channel (PDCCH).

Also, in association with validity and notification of change of SC-MCCH information, change of the SC-MCCH occurs at specific radio frames. In other words, a concept of a modification period is used. Within a modification period, the same SC-MCCH information may be transmitted a number of times (based on the repetition period) as defined by the corresponding scheduling. At this time, the modification period boundaries may be defined by a system frame number (SFN). Here, the modification period may be configured by means of system information (for example, SIB 20 (i.e., System InformationBlockType 20)).

If the network changes the information of the SC-MCCH (or part of the SC-MCCH), the network notifies UEs about a change of the first subframe which may be used for SC-MCCH transmission at the repetition period. At this time, the Least Significant Bit (LSB) bit in the 8-bit bitmap indicates a change of the SC-MCCH when information notified to the UEs (i.e., change notification) is set to '1'. Upon receiving the change notification, a UE attempting to receive an MBMS service transmitted using SC-PtM may acquire new SC-MCCH information starting from the same subframe. In this case, the UE applies the previously acquired SC-MCCH information until new SC-MCCH information is acquired.

Also, an SC-PtM capable UE which receives or intends to receive a service via an SC-MBSFN Radio Bearer (SC-MRB) may apply an SC-PtM procedure and an MBMS interest indication procedure.

SC-MCCH Information Acquisition

A procedure for acquiring SC-MCCH information is as follows. In general, a UE applies an SC-MCCH information acquisition procedure to acquire SC-PtM control information broadcasted by the E-UTRAN. The procedure may be applied to an SC-PtM capable UE in the RRC_IDLE or RRC_CONNECTED state.

In association with initiation of SC-MCCH information acquisition, upon entering cell broadcasting system information (for example, SIB 20) (for example, due to power-on or UE mobility) and receiving a notification notifying that the SC-MCCH information has been changed, the UE attempting to receive an MBMS service via an SC-MRB has to apply the SC-MCCH information acquisition procedure. The UE receiving an MBMS service via an SC-MRB has to apply the SC-MCCH information acquisition procedure to acquire the SC-MCCH information corresponding to a service received at the start of each modification period.

Also, the SC-MCCH information acquisition procedure overwrites stored SC-MCCH information unless the procedure is explicitly specified. That is, delta configuration is not applicable for the SC-MCCH information, and if a field is absent in the SC-MCCH information, use of the corresponding field is stopped.

Acquisition of the SC-MCCH information by a UE is performed according to the following procedure. When the procedure (i.e. SC-MCCH information acquisition procedure) is triggered by an SC-MCCH change notification, an SC-PtM capable UE starts acquisition of an SC-PtM configuration message from a subframe which has received the change notification. At this time, the UE continues to use the previously received SC-MCCH information until new SC-MCCH information is acquired. Or, when the UE enters the cell broadcasting system information (for example, SIB 20), the UE acquires an SC-PtM configuration message at the next repetition period. Or, when the UE receives an MBMS service via an SC-MRB, the UE starts acquisition of an SC-PtM configuration message from the start of each modification period.

SC-PtM Radio Bearer Configuration

Configuration of an SC-PtM radio bearer is performed as follows. In general, an SC-PtM radio bearer configuration procedure is used by a UE to configure the Radio Link Control (RLC) layer, Medium Access Control (MAC) layer, and physical layer when reception of an SC-MRB transmitted from an SC-Multicast Traffic Channel (SC-MTCH) is started and/or stopped. At this time, the procedure is applied to a UE (SC-PtM capable UE) which is in the RRC_CONNECTED or RRC_IDLE state and interested to receive MBMS services via the SC-MRB.

At this time, if the UE is unable to receive an MBMS service via an SC-MRB due to capability limitation, higher layers may take an appropriate action such as terminating a lower priority unicast service.

In association with initiation of the SC-PtM radio bearer configuration procedure, the UE applies an SC-MRB establishment procedure to start receiving a session of an MBMS service of interest. For example, the procedure may be initiated when an MBMS session is started, when capability limitation of the UE, which inhibits receiving the corresponding service, is removed, when the UE has an interest in an MBMS service, or when the UE enters a cell which provides, via an SC-MRB, an MBMS service in which the UE has interest.

The UE stops receiving a session by applying an SC-MRB release procedure. For example, the procedure may be initiated when the MBMS session is stopped, when capability limitation inhibits reception of a related service, when the UE leaves a cell in which an SC-MRB is established, or when the UE loses interest in the MBMS service.

In association with establishment of an SC-MRB, an SC-PtM capable UE may perform the following operation when an SC-MRB is established. The UE establishes an RLC entity. Also, the UE configures an SC-MTCH logic channel which may be applied for the SC-MRB and instructs the MAC to receive a DL-SCH from a cell which has received an SC-PtM configuration message with respect to an MBMS service for which the SC-MRB has been established. At this time, the cell uses a Group Radio Network Temporary Identifier (G-RNTI) and sc-mtch-SchedulingInfo carried in the message with respect to the corresponding MBMS service. Also, the UE configures a physical layer which may be applied to the SC-MRB according to sc-mtch-InfoList (which is included in the SC-PtM configuration message). Also, the UE informs the higher layer about establishment of the SC-MRB by indicating the corresponding Temporary Mobile Group Identifier (TMGI) and a session ID.

Also, in association with release of the SC-MRB, when the SC-MRB is released, an SC-PtM capable UE releases not only a related MAC and physical layer configurations but also the RLC entity. Also, the UE informs the higher layer of release of the SC-MRB by indicating the corresponding TMGI and a session identifier.

The SIB 20 (i.e., system information block type 20) described as an example in the procedure above includes information required for acquiring control information related to transmission of an MBMS which employs SC-PtM. The SIB 20 may be as shown in Table 3 below.

TABLE 3

```
--ASN1START
SystemInformationBlockType20-r13 ::=  SEQUENCE {
    sc-mcch-RepetionPeriod-r13          ENUMERATED {rf2, rf4, rf8, rf16, rf32,
rf64, rf128, rf256},
    sc-mcch-Offset-r13                  INTEGER (0..10),
    sc-mcch-FirstSubframe-r13           INTEGER (0..9),
    sc-mcch-duration-r13                INTEGER (2..9)OPTIONAL,
    sc-mcch-ModificationPeriod-r13      ENUMERATED {rf2, rf4, rf8, rf16, rf32, rf64,
rf128, rf256,
       rf512, rf1024, r2048, rf4096, rf8192, rf16384,
                                rf8192, rf16384, rf32768, rf65536},
    lateNonCriticalExtension            OCTET STRING
        OPTIONAL,
    ...
}
--ASN1STOP
```

In Table 3, the sc-mcch-ModificationPeriod defines periodically appearing boundaries, namely radio frames for which SFN mod sc-mcch-ModificationPeriod=0. The contents carried by the SC-MCCH may differ only when there is at least one such boundary among them. At this time, the value rf2 corresponds to two radio frames, and value rf4 corresponds to four radio frames.

Also, the sc-mcch-duration represents duration for which an SC-MCCH may be scheduled in non-MBSFN subframes. At this time, the duration starts from the subframe indicated by sc-mcch-FirstSubframe. Absence of this information element indicates that the SC-MCCH is scheduled only in the subframe indicated by sc-mcch-FirstSubframe.

Also, the sc-mcch-offset represents radio frames for which the SC-MCCH is scheduled together with sc-mcch-RepetitionPeriod. Also, the sc-mcch-FirstSubframe indicates the first subframe in which the SC-MCCH is scheduled. Also, the sc-mcch-RepetitionPeriod defines an interval between transmissions of SC-MCCH information in radio frames. At this time, value rf2 corresponds to two radio frames, and value rf4 corresponds to four radio frames.

MPDCCH Assignment Procedure

A Bandwidth reduced Low complexity (BL)/Coverage Enhancement (CE) UE shall monitor MPDCCH candidates (i.e., a set of MPDCCH candidates) on one or more Narrowbands (described in subclause 5.2.4 of [3]) as configured by higher layer signaling for control information. Here, the monitoring may imply attempting to decode each of the MPDCCHs in the set according to all the monitored DCI formats.

Unlike this, a UE that is not a BL/CE UE is not required to monitor MPDCCH.

Higher layer signaling may configure a BL/CE UE with one or two MPDCCH-PRB-sets for MPDCCH monitoring. The PRB-pairs corresponding to an MPDCCH-PRB-set are indicated by higher layers. Each MPDCCH-PRB-set consists of set of ECCEs numbered from 0 to N'ECCE,p,k−1. Here, N'ECCE,p,k is the number of ECCEs in MPDCCH-PRB-set p of subframe k.

The MPDCCH-PRB-set(s) may be configured by higher layers for either localized MPDCCH transmission or distributed MPDCCH transmission. The set of MPDCCH candidates to monitor are defined in terms of MPDCCH search spaces.

In this case, the BL/CE UE needs to monitor one or more of the following search spaces.
  a Type0-MPDCCH common search space (if configured with CEmodeA)
  a Type1-MPDCCH common search space,
  a Type2-MPDCCH common search space, and
  a MPDCCH UE-specific search space.

In this case, the BL/CE UE configured with CEModeB is not required to monitor Type0-MPDCCH common search space. The BL/CE UE is not required to simultaneously monitor MPDCCH UE-specific search space and Type1-MPDCCH common search space. The BL/CE UE is not required to simultaneously monitor MPDCCH UE-specific search space and Type2-MPDCCH common search space.

The BL/CE UE is not expected to monitor an MPDCCH candidate, if an ECCE corresponding to that MPDCCH candidate is mapped to a PRB pair that overlaps with a transmission of PDSCH scheduled previously in the same subframe. When an aggregation level L' is 24 ECCEs or 12 ECCEs, the number of ECCEs refers to the MPDCCH mapping to the REs of the 2+4 PRB set. An MPDCCH search space $MS_k^{(L',R)}$ at aggregation level $L' \in \{1, 2, 4, 8, 16, 12, 24\}$ and repetition level $R \in \{1, 2, 4, 8, 16, 32, 64, 128, 256\}$ is defined by a set of MPDCCH candidates where each candidate is repeated in a set of R consecutive BL/CE DL subframes starting with subframe k. For an MPDCCH-PRB-set p, the ECCEs corresponding to MPDCCH candidate m of the search space $MS_k^{(L',R)}$ are given by Equation 1.

$$L\left\{\left(Y_{p,k} + \left\lfloor \frac{m \cdot N'_{ECCE,p,k}}{L \cdot M_p'^{(L')}} \right\rfloor\right) \bmod \lfloor N'_{ECCE,p,k} / L' \rfloor\right\} + i \quad \text{[Equation 1]}$$

In Equation 1, i is 0, ..., L'−1, m is 0, 1, ..., $M'_p{}^{(L')}$−1, and $M'_p{}^{(L')}$ is the number of MPDCCH candidates to monitor at aggregation level L' in MPDCCH-PRB-set p in each subframe in the set of R consecutive subframes. In addition, $Y_{p,k}$ for MPDCCH UE-specific search space is 0 in Type0-MPDCCH common search space, Type1-MPDCCH common search space, and Type2-MPDCCH common search space.

The BL/CE UE is not expected to monitor MPDCCH in subframes that are not BL/CE DL subframes. Until BL/CE UE receives higher layer configuration of MPDCCH UE-specific search space, the BL/CE UE monitors MPDCCH according to the same configuration of MPDCCH search space and a narrowband such as MPDCCH scheduling Msg4.

The aggregation and repetition levels defining the MPDCCH search spaces and the number of monitored MPDCCH candidates are given as follows:

For MPDCCH UE-specific search space, a case where the BL/CE UE is not configured with $N'_{RB}{}^{X_p}=2$ or $N'_{RB}{}^{X_p}=4$ PRB-pairs, and mPDCCH-NumRepetition=1 will be described.

If the UE is configured with CEModeA, and $N'_{RB}{}^{X_p}=2$ or $N'_{RB}{}^{X_p}=4$, the aggregation and repetition levels defining the search spaces and the number of monitored MPDCCH candidates are listed in Table 4.

TABLE 4

| | | $M'_p{}^{(L')}$ | | | | |
|---|---|---|---|---|---|---|
| $N'_{RB}{}^{X_p}$ | R | L' = 2 | L' = 4 | L' = 8 | L' = 16 | L' = 24 |
| 2 | r1 | 2 | 1 | 1 | 0 | 0 |
| 4 | | 1 | 1 | 1 | 1 | 0 |
| 2 | r2 | 2 | 1 | 1 | 0 | 0 |
| 4 | | 1 | 1 | 1 | 1 | 0 |
| 2 | r3 | 2 | 1 | 1 | 0 | 0 |
| 4 | | 1 | 1 | 1 | 1 | 0 |
| 2 | r4 | 2 | 1 | 1 | 0 | 0 |
| 4 | | 1 | 1 | 1 | 1 | 0 |

Alternatively, if the UE is configured with CEModeA, and $N'_{RB}{}^{X_p}=2+4$, the aggregation and repetition levels defining the search spaces and the number of monitored MPDCCH candidates are listed in Table 5.

TABLE 5

| | | $M'_p{}^{(L')}$ | | | | |
|---|---|---|---|---|---|---|
| MPDCCH PRB set | R | L' = 2 | L' = 4 | L' = 8 | L' = 16 | L' = 24 |
| 2 PRB set in 2 + 4 PRB set | r1 | 1 | 1 | 0 | 0 | 0 |
| 4 PRB set in 2 + 4 PRB set | | 0 | 0 | 2 | 1 | 0 |
| Both PRB sets in 2 + 4 PRB set | | 0 | 0 | 0 | 0 | 1 |
| 2 PRB set in 2 + 4 PRB set | r2 | 0 | 1 | 1 | 0 | 0 |
| 4 PRB set in 2 + 4 PRB set | | 0 | 0 | 2 | 1 | 0 |
| Both PRB sets in 2 + 4 PRB set | | 0 | 0 | 0 | 0 | 1 |
| 2 PRB set in 2 + 4 PRB set | r3 | 0 | 0 | 0 | 0 | 0 |
| 4 PRB set in 2 + 4 PRB set | | 0 | 0 | 1 | 1 | 0 |
| Both PRB sets in 2 + 4 PRB set | | 0 | 0 | 0 | 0 | 1 |
| 2 PRB set in 2 + 4 PRB set | r4 | 0 | 0 | 0 | 0 | 0 |
| 4 PRB set in 2 + 4 PRB set | | 0 | 0 | 0 | 0 | 0 |
| Both PRB sets in 2 + 4 PRB set | | 0 | 0 | 0 | 0 | 1 |

Alternatively, if the UE is configured with CEModeB, and $N'_{RB}{}^{X_p}=2$ or $N'_{RB}{}^{X_p}=4$, the aggregation and repetition levels defining the search spaces and the number of monitored MPDCCH candidates are listed in Table 6.

TABLE 6

| | | $M'_p{}^{(L')}$ | | | | |
|---|---|---|---|---|---|---|
| $N'_{RB}{}^{X_p}$ | R | L' = 2 | L' = 4 | L' = 8 | L' = 16 | L' = 24 |
| 2 | r1 | 0 | 0 | 1 | 0 | 0 |
| 4 | | 0 | 0 | 1 | 1 | 0 |
| 2 | r2 | 0 | 0 | 1 | 0 | 0 |
| 4 | | 0 | 0 | 1 | 1 | 0 |
| 2 | r3 | 0 | 0 | 1 | 0 | 0 |
| 4 | | 0 | 0 | 1 | 1 | 0 |
| 2 | r4 | 0 | 0 | 1 | 0 | 0 |
| 4 | | 0 | 0 | 1 | 1 | 0 |

Alternatively, the UE is configured with CEModeB, and $N'_{RB}{}^{X_p}=2+4$, the aggregation and repetition levels defining the search spaces and the number of monitored MPDCCH candidates are listed in Table 7.

TABLE 7

| | | $M'_p{}^{(L')}$ | | | | |
|---|---|---|---|---|---|---|
| MPDCCH PRB set | R | L' = 2 | L' = 4 | L' = 8 | L' = 16 | L' = 24 |
| 2 PRB set in 2 + 4 PRB set | r1 | 0 | 0 | 1 | 0 | 0 |
| 4 PRB set in 2 + 4 PRB set | | 0 | 0 | 0 | 1 | 0 |
| Both PRB sets in 2 + 4 PRB set | | 0 | 0 | 0 | 0 | 1 |
| 2 PRB set in 2 + 4 PRB set | r2 | 0 | 0 | 1 | 0 | 0 |
| 4 PRB set in 2 + 4 PRB set | | 0 | 0 | 0 | 1 | 0 |
| Both PRB sets in 2 + 4 PRB set | | 0 | 0 | 0 | 0 | 1 |
| 2 PRB set in 2 + 4 PRB set | r3 | 0 | 0 | 1 | 0 | 0 |
| 4 PRB set in 2 + 4 PRB set | | 0 | 0 | 0 | 1 | 0 |
| Both PRB sets in 2 + 4 PRB set | | 0 | 0 | 0 | 0 | 1 |
| 2 PRB set in 2 + 4 PRB set | r4 | 0 | 0 | 1 | 0 | 0 |
| 4 PRB set in 2 + 4 PRB set | | 0 | 0 | 0 | 1 | 0 |
| Both PRB sets in 2 + 4 PRB set | | 0 | 0 | 0 | 0 | 1 |

Here, $N'_{RB}{}^{X_p}$ is the number of PRB-pairs configured for MPDCCH UE-specific search space. When $N'_{RB}{}^{X_p}=2+4$, it is given by the higher layer parameter numberPRB-Pairs-r13, and when $N'_{RB}{}^{X_p}=2$ or $N'_{RB}{}^{X_p}=4$, it is given by the higher layer parameter numberPRB-Pairs-r11.

In addition, r1, r2, r3, and r4 are determined from Table 8 by substituting the value of rmax with the value of higher layer parameter mPDCCH-NumRepetition. The PRB-pairs within a Narrowband corresponding to an MPDCCH-PRB-set are indicated by higher layers. If higher layer configuration numberPRB-Pairs-r13 for MPDCCH-PRB-set p is 6, $N'_{RB}{}^{X_p}=2+4$, and the number of PRB-pairs in an MPDCCH-PRB-set p=2+4.

TABLE 8

| $r_{max}$ | r1 | r2 | r3 | r4 |
|---|---|---|---|---|
| 1 | 1 | — | — | — |
| 2 | 1 | 2 | — | — |
| 4 | 1 | 2 | 4 | — |
| >=8 | $r_{max}/8$ | $r_{max}/4$ | $r_{max}/2$ | $r_{max}$ |

If Type2-MPDCCH common search space, PRB-pairs of the 2 PRB set in the 2+4 PRB set correspond to PRB-pairs with the largest two PRB indices in MPDCCH-PRB-set p. In addition, PRB-pairs of the 4 PRB set in the 2+4 PRB set correspond to PRB-pairs with the smallest 4 PRB indices in MPDCCH-PRB-set p. In addition, PRB-pairs of the 2+4 PRB set in the 2+4 PRB set correspond to all PRB-pairs in MPDCCH-PRB-set p.

For Type0-MPDCCH common search space, the narrowband location and the MPDCCH-PRB-set p are the same as for MPDCCH UE-specific search space. If $N'_{RB}{}^{X_p}$ is 2, $M'_p{}^{(L')}$ is 1 for L'=8 and repetition levels r1, r2, r3, and r4 given in Table 8. For all other cases, $M'_p{}^{(L')}$ is 0. If $N'_{RB}{}^{X_p}$ is 4, $M'_p{}^{(L')}$ is 1 for L'=16 and repetition levels r1, r2, r3, and r4 given in Table 8. For all other cases, $M'^{(L')}_p$ is 0. If $N'^{X_p}_{RB}$ is 2+4, $M'^{(L')}_p$ is 1 for L'=24 and repetition levels r1, r2, r3, and r4 given in Table 8. For all other cases, $M'^{(L')}_p$ is 0.

For Type1-MPDCCH common search space, the number of PRB-pairs in MPDCCH-PRB-set p is 2+4 PRB-pairs. In this case, $M'^{(L')}_p$ is 1 for L'=24 and repetition levels r1, r2, r3, and r4 given in Table 8 and for other cases, $M'^{(L')}_p$ is 0. Here, the repetition levels are determined from Table 9 by substituting rmax with the higher layer parameter mPDCCH-NumRepetition-Paging.

TABLE 9

| $r_{max}$ | r1 | r2 | r3 | r4 |
|---|---|---|---|---|
| 256 | 2 | 16 | 64 | 256 |
| 128 | 2 | 16 | 64 | 128 |
| 64 | 2 | 8 | 32 | 64 |
| 32 | 1 | 4 | 16 | 32 |
| 16 | 1 | 4 | 8 | 16 |
| 8 | 1 | 2 | 4 | 8 |
| 4 | 1 | 2 | 4 | — |
| 2 | 1 | 2 | — | — |
| 1 | 1 | — | — | — |

For Type2-MPDCCH common search space, the number of PRB-pairs in MPDCCH-PRB-set p is 2+4 PRB-pairs. If the most recent coverage enhancement level used for PRACH is coverage enhancement level 0 and 1, the aggregation and repetition levels defining the search spaces and the number of monitored MPDCCH candidates are determined from Table 5. If the most recent coverage enhancement level used for PRACH is coverage enhancement level 2 and 3, the aggregation and repetition levels defining the search spaces and the number of monitored MPDCCH candidates are determined from Table 7.

Here, r1, r2, r3, and r4 are determined from Table 8 by substituting rmax with the higher layer parameter mPDCCH-NumRepetition-RA.

For Type1-MPDCCH common search space and Type2-MPDCCH common search space, distributed MPDCCH transmission may be used.

For MPDCCH UE-specific search space, Type0-common search space, and Type2-common search space, locations of starting subframe k are given by kb which is the b-th consecutive BL/CE DL subframe from the subframe k0. In this case, the subrame k0 is given by the higher layer.

For Type1-common search space, k=k0 and k is determined from locations of paging opportunity subframes. If SystemInformationBlockType1-BR or SI message is transmitted in one narrowband in subframe k, the BL/CE UE assumes that MPDCCH in the same narrowband in the subframe k is dropped. The BL/CE UE is not required to monitor an MPDCCH search space if any ECCEs corresponding to any of its MPDCCH candidates occur within a frame before nf=0 and also occur within frame nf=0.

For MPDCCH UE-specific search space, Type0-MPDCCH common search space if the higher layer parameter mPDCCH-NumRepetition is set to 1, or Type2-MPDCCH common search space if the higher layer parameter mPDCCH-NumRepetition-RA is set to 1, the BL/CE UE is not required to monitor the MPDCCH in the following cases:

For TDD and normal downlink CP, in special subframes for the special subframe configurations 0 and 5; and For TDD and extended downlink CP, in special subframes for the special subframe configurations 0, 4 and 7.

Otherwise, the BL/CE UE is not required to monitor MPDCCH in the following cases:

For special subframes of TDD, if the BL/CE UE is configured with CEModeB;

For TDD and normal downlink CP, in special subframes for the special subframe configurations 0, 1, 2, 5, 6, 7 and 9 if the BL/CE UE is configured with CEModeA; and For TDD and extended downlink CP, in special subframes for the special subframe configurations 0, 4, 7, 8 and 9 if the BL/CE UE is configured with CEModeA.

The number of MPDCCH repetitions is indicated in the 'DCI subframe repetition number' field in Table 10.

TABLE 10

| R | DCI subframe repetition number |
|---|---|
| r1 | 00 |
| r2 | 01 |
| r3 | 10 |
| r4 | 11 |

Further, for a MPDCCH starting position, a starting OFDM symbol for the MPDCCH is given by index IMPDCCHStart in the first slot in a subframe k. Here, IMPDCCHStar may be determined as follows. First, if the subframe k is configured as an MBSFN subframe and the BL/CE UE is configured in CEModeA, IMPDCCHStart is min(2, I'MPDCCHStart). If not, IMPDCCHStart is I'MPDCCHStart. Here, I'MPDCCHStart is given by the higher layer.

Further, regardless of transmission modes configuration of PDSCH data transmissions, the BL/CE UE may assume the antenna ports 0-3, 107-110 of the serving cell are quasi co-located (as defined in [3]) with respect to Doppler shift, Doppler spread, average delay, and delay spread.

Downlink Control Channel-Related Procedure in NB-IoT

In what follows, a procedure related to Narrowband Physical Downlink Control Channel (NPDCCH) used for NB-IoT will be described.

A UE has to monitor NPDCCH candidates (i.e., a set of NPDCCH candidates) according to the control information configured by higher layer signaling. Here, the monitoring may indicate attempting to decode individual NPDCCHs belonging to the set according to all of the monitored DCI formats. The set of NPDCCH candidates to monitor may be defined in terms of NPDCCH search spaces. In this case, the UE may perform monitoring using identifiers (for example, C-RNTI, P-RNTI, SC-RNTI, or G-RNTI) corresponding to the respective NPDCCH search spaces.

In this case, the UE needs to monitor one or more of the following search spaces: a) Type1-NPDCCH common search space, b) Type2-NPDCCH common search space, and c) NPDCCH UE-specific search space. At this time, the UE is not required to monitor the NPDCCH UE-specific search space and the Type1-NPDCCH common search space simultaneously. Also, the UE is not required to monitor the NPDCCH UE-specific search space and the Type2-NPDCCH common search space simultaneously. Also, the UE is not required to monitor the Type1-NPDCCH common search space and the Type2-NPDCCH common search space simultaneously.

The NPDCCH search spaces at aggregation and repetition levels are defined by a set of NPDCCH candidates. Here, each NPDCCH candidate is repeated in R consecutive NB-IoT downlink subframes except for subframes used for transmission of System Information (SI) messages starting from the subframe k.

In the case of the NPDCCH UE-specific search space, the aggregation and repetition levels defining the search space and the corresponding NPDCCH candidates being monitored are listed in Table 11, where the RMAX value is replaced with the parameter al-Repetition-USS configured by the higher layer.

TABLE 11

| $R_{max}$ | R | NCCE indices of monitored NPDCCH candidates | |
|---|---|---|---|
| | | L' = 1 | L' = 2 |
| 1 | 1 | {0}, {1} | {0, 1} |
| 2 | 1 | {0}, {1} | {0, 1} |
| | 2 | — | {0, 1} |
| 4 | 1 | — | {0, 1} |
| | 2 | — | {0, 1} |
| | 4 | — | {0, 1} |
| >=8 | $R_{max}/8$ | — | {0, 1} |
| | | — | {0, 1} |
| | $R_{max}/2$ | — | {0, 1} |
| | $R_{max}$ | — | {0, 1} |

Note 1:
{x}, {y} denotes NPDCCH format 0 candidate of NCCE index 'x' and NPDCCH format 0 candidate of NCCE index 'y'.
Note 2:
{x, y} denotes NPDCCH format 1 candidate corresponding to NCCE indexes 'x' and 'y'.

In the case of the Type 1-NPDCCH common search space, the aggregation and repetition levels defining the search spaces and the NPDCCH candidates being monitored are listed in Table 12, where the RMAX value is replaced with the parameter al-Repetition-CSS-Paging configured by the higher layer.

TABLE 12

| $R_{max}$ | R | NCCE indices of monitored NPDCCH candidates | |
|---|---|---|---|
| | | L' = 1 | L' = 2 |
| 1 | 1 | — | {0, 1} |
| 2 | 1, 2 | — | {0, 1} |
| 4 | 1, 2, 4 | — | {0, 1} |
| 8 | 1, 2, 4, 8 | — | {0, 1} |
| 16 | 1, 2, 4, 8, 16 | — | {0, 1} |
| 32 | 1, 2, 4, 8, 16, 32 | — | {0, 1} |
| 64 | 1, 2, 4, 8, 16, 32, 64 | — | {0, 1} |
| 128 | 1, 2, 4, 8, 16, 32, 64, 128 | — | {0, 1} |
| 256 | 1, 4, 8, 16, 32, 64, 128, 256 | — | {0, 1} |
| 512 | 1, 4, 16, 32, 64, 128, 256, 512 | — | {0, 1} |
| 1024 | 1, 8, 32, 64, 128, 256, 512, 1024 | — | {0, 1} |
| 2048 | 1, 8, 64, 128, 256, 512, 1024, 2048 | — | {0, 1} |

Note 1:
{x}, {y} denotes NPDCCH format 0 candidate of NCCE index 'x' and NPDCCH format 0 candidate of NCCE index 'y'.
Note 2:
{x, y} denotes NPDCCH format 1 candidate corresponding to NCCE indexes 'x' and 'y'.

In the case of the Type 2-NPDCCH common search space, the aggregation and repetition levels defining the search spaces and the NPDCCH candidates being monitored are in Table 13, where the RMAX value is replaced with the parameter npdcch-MaxNumRepetitions-RA configured by the higher layer.

TABLE 13

| $R_{max}$ | R | NCCE indices of monitored NPDCCH candidates | |
|---|---|---|---|
| | | L' = 1 | L' = 2 |
| 1 | 1 | — | {0, 1} |
| 2 | 1 | — | {0, 1} |
| | 2 | — | {0, 1} |
| 4 | 1 | — | {0, 1} |
| | 2 | — | {0, 1} |
| | 4 | — | {0, 1} |
| >=8 | $R_{max}/8$ | — | {0, 1} |
| | $R_{max}/4$ | — | {0, 1} |
| | $R_{max}/2$ | — | {0, 1} |
| | $R_{max}$ | — | {0, 1} |

Note 1:
{x}, {y} denotes NPDCCH format 0 candidate of NCCE index 'x' and NPDCCH format 0 candidate of NCCE index 'y'.
Note 2:
{x, y} denotes NPDCCH format 1 candidate corresponding to NCCE indexes 'x' and 'y'.

At this time, the locations of the starting subframe k are given by k=kb. Here, kb indicates the b-th consecutive NB-IoT downlink subframe from subframe k0, b is u×R, and u ranges 0, 1, ..., $(R_{MAX}/R)-1$. Also, subframe k0 indicates a subframe satisfying the condition of Equation 2.

$$(10n_f+\lfloor n_s/2 \rfloor) \mod T = \alpha_{offset} \cdot T, \text{ where } T=R_{max} \cdot G \quad \text{[Equation 2]}$$

In the case of the NPDCCH UE-specific search space, G appearing in Equation 2 is given by the higher layer parameter nPDCCH-startSF-UESS, and $\alpha_{offset}$ is given by the higher layer parameter nPDCCH-StartSFoffset-UESS. Also, in the case of the Type2-NPDCCH common search space, G appearing in Equation 2 is given by the higher layer parameter nPDCCH-startSF-Type2CSS, and $\alpha_{offset}$ is given by the higher layer parameter nPDCCH-startSFoffset-Type2CSS. Also, in the case of Type1-NPDCCH common search space, k is k0 and is determined based on the position of an NB-IoT paging opportunity subframe.

When a UE is configured with a PRB for monitoring the NPDCCH UE-specific search space by the higher layer, the UE has to monitor the NPDCCH UE-specific search space in the PRB configured by the higher layer. In this case, the UE is not expected to receive NPSS, NSSS, and NPBCH from the corresponding PRB. On the other hand, if the PRB is not configured by the higher layer, the UE has to monitor the NPDCCH UE-specific search space on the same PRB from which the NPSS/NSSS/NPBCH has been detected.

When an NB-IoT UE detects an NPDCCH with DCI format N0 which ends at subframe n, and transmission of the corresponding NPUSCH format 1 is started from subframe n+k, the UE is not required to monitor the NPDCCH in any subframe starting from subframe n+1 to subframe n+k−1.

Also, when an NB-IoT UE detects an NPDCCH with DCI format N1 or N2 which ends at subframe n; and transmission of the corresponding NPDSCH is started from subframe n+k, the UE is not required to monitor the NPDCCH in any subframe starting from subframe n+1 to subframe n+k−1.

Also, when an NB-IoT UE detects an NPDCCH with DCI format N1 which ends at subframe n, and transmission of the corresponding NPUSCH format 2 is started from subframe n+k, the UE is not required to monitor the NPDCCH in any subframe starting from subframe n+1 to subframe n+k−1.

Also, when an NB-IoT UE detects an NPDCCH with DCI format N1 for "PDCCH order", which ends at subframe n, and transmission of the corresponding NPRACH is started from subframe n+k, the UE is not required to monitor the NPDCCH in any subframe starting from subframe n+1 to subframe n+k−1.

Also, when an NB-IoT UE performs NPUSCH transmission which ends at subframe n, the UE is not required to monitor the NPDCCH in any subframe starting from subframe n+1 to subframe n+3.

Also, when an NB-IoT UE performs NPUSCH transmission which ends at subframe n, the UE is not required to monitor the NPDCCH in any subframe starting from subframe n+1 to subframe n+3.

With respect to the NPDCCH starting position, the starting OFDM symbol of the NPDCCH is given by the index $l_{NPDCCHStart}$ in the first slot of subframe k. At this time, the higher layer parameter operationModeInfo is '00' or '01', the index $l_{NPDCCHStart}$ is given by the higher layer parameter operationModeInfo. On the other hand, if the higher layer parameter operationModeInfo indicates '10' or '11', the index $l_{NPDCCHStart}$ is 0.

Downlink Control Information (DCI) Format

In association with MTC, DCI format 6-0A, DCI format 6-0B, DCI format 6-1A, DCI format 6-1B, and DCI format 6-2 may be considered as downlink control information (DCI) format for the Bandwidth reduced Low complexity (BL) operation.

First, the DCI format 6-0A is used for scheduling a PUSCH in an uplink cell and may transmit the following information.

Flag (for example, 1 bit) for distinguishing the format 6-0A and the format 6-1A from each other.

Frequency hopping flag (for example, 1 bit)

Resource block assignment (for example, $$\left\lceil \log_2 \left\lfloor \frac{N_{RB}^{UL}}{6} \right\rfloor \right\rceil + 5 \text{ bits} \right).$$

With respect to the bits for the resource block assignment, the $$\left\lceil \log_2 \left\lfloor \frac{N_{RB}^{UL}}{6} \right\rfloor \right\rceil \text{ MSB bit}$$

provides a narrowband index, and the 5 bits provide resource allocation by using UL resource allocation type 0 within the indicated (i.e., provided) narrowband.

Modulation and Coding Scheme (for example, 4 bits)
Repetition number (for example, 2 bits)
HARQ process number (for example, 3 bits)
New data indicator (for example, 1 bit)
Redundancy version (for example, 2 bits)
Transmit Power Control (TPC) command for a scheduled PUSCH (for example, 2 bits)
UL index (for example, 2 bits)
Downlink Assignment Index (DAI) (for example, 2 bits)
Channel State Information (CSI) request (for example, 1 bit)
Sounding Reference Signal (SRS) request (for example, 1 bit)
DCI subframe repetition number (for example, 2 bits)

At this time, if the number of information bits of the format 6-0A mapped to a given search space is intended for scheduling the same serving cell and is smaller than the payload size (at this time, the payload size includes padding bits added to the format 6-1A) of the format 6-1A mapped to the same search space, '0's have to be appended until the payload size of the format 6-0A becomes the same as the payload size of the format 6-1A.

Next, the DCI format 6-0B is used for scheduling a PUSCH in an uplink cell and may transmit the following information.

Flag (for example, 1 bit) for distinguishing the format 6-0B and the format 6-1B from each other.

Frequency hopping flag (for example, 1 bit)

Resource block assignment (for example, $$\left\lceil \log_2 \left\lfloor \frac{N_{RB}^{UL}}{6} \right\rfloor \right\rceil + 3 \text{ bits} \right).$$

With respect to the bits for the resource block assignment, the $$\left\lceil \log_2 \left\lfloor \frac{N_{RB}^{UL}}{6} \right\rfloor \right\rceil \text{ MSB bit}$$

provides a narrowband index, and the 3 bits provide resource allocation within the indicated (i.e., provided) narrowband.

Modulation and Coding Scheme (for example, 4 bits)
Repetition number (for example, 3 bits)
HARQ process number (for example, 3 bits)
New data indicator (for example, 1 bit)
DCI subframe repetition number (for example, 2 bits)

At this time, if the number of information bits of the format 6-0B mapped to a given search space is intended for scheduling the same serving cell and is smaller than the payload size (at this time, the payload size includes padding bits added to the format 6-1B) of the format 6-1B mapped to the same search space, '0's have to be appended until the payload size of the format 6-0B becomes the same as the payload size of the format 6-1B.

Next, the DCI format 6-1A is used for scheduling one PDSCH codeword in a cell and a random access procedure initiated by a PDCCH order. At this time, the DCI corresponding to the PDCCH order may be carried by an MPDCCH.

The DCI format 6-1A may transmit the following information.

Flag (for example, 1 bit) for distinguishing the format 6-0A and the format 6-1A from each other.

The format 6-1A is used in the random access procedure initiated by the PDCCH order only when the Cyclic Redundancy Check (CRC) of the format 6-1A is scrambled with the C-RNTI, and all the remaining fields are configured as follows.

Resource block assignment (for example, $$\left\lceil \log_2 \left\lfloor \frac{N_{RB}^{UL}}{6} \right\rfloor \right\rceil + 5 \text{ bits},$$

all of the bits are set to '1').

Preamble index (for example, 6 bits)
PRACH mask index (for example, 4 bits)
Starting CE level (for example, 2 bits)

The remaining bits of the format 6-1A for scheduling allocation of one PDSCH codeword are set to '0'.

Otherwise, the remaining information as shown below is transmitted.

Frequency hopping flag (for example, 1 bit)
Resource block assignment (for example, $$\left\lceil \log_2 \left\lfloor \frac{N_{RB}^{UL}}{6} \right\rfloor \right\rceil + 5 \text{ bits} \Big).$$

With respect to the bits for the resource block assignment, the $$\left\lceil \log_2 \left\lfloor \frac{N_{RB}^{UL}}{6} \right\rfloor \right\rceil \text{ MSB bit}$$

provides a narrowband index, and the 5 bits provide resource allocation by using DL resource allocation type 2 within the indicated (i.e., provided) narrowband.
    Modulation and Coding Scheme (for example, 4 bits)
    Repetition number (for example, 2 bits)
    HARQ process number (for example, 3 bits)
    New data indicator (for example, 1 bit)
    Redundancy version (for example, 2 bits)
    Transmit Power Control (TPC) command for a PUSCH (for example, 2 bits)
    Downlink Assignment Index (DAI) (for example, 2 bits)
    Antenna port and scrambling identity (for example, 2 bits)
    Sounding reference signal (SRS) request (for example, 1 bit)
    TPMI information for precoding
    PMI confirmation for precoding (for example, 1 bit)
    HARQ-ACK resource offset (for example, 2 bits)
    DCI subframe repetition number (for example, 2 bits)
    When the CRC of the format 6-1A is scrambled with the RA-RNTI, the following information (i.e., field), among the information (i.e., fields), is reserved.
    HARQ process number
    New data indicator
    Downlink assignment index (DAI)
    HARQ-ACK resource offset
    At this time, if a UE is not configured to decode an MPDCCH having a CRC scrambled by the C-RNTI, and the number of information bits of the format 6-1A is smaller than the number of information bits of the format 6-0A, '0's have to be appended until the payload size of the format 6-1A becomes the same as the payload size of the format 6-0A.
    Also, if a UE is configured to decode an MPDCCH having a CRC scrambled by the C-RNTI, and the number of information bits of the format 6-1A mapped onto a given search space is intended for scheduling the same serving cell and is smaller than the payload size of the format 6-0A mapped to the same search space, '0's have to be appended until the payload size of the format 6-1A becomes the same as the payload size of the format 6-0A.
    Next, the DCI format 6-1B is used for scheduling one PDSCH codeword and may transmit the following information.
    Flag (for example, 1 bit) for distinguishing the format 6-0B and the format 6-1B from each other.
    The format 6-1B is used for a random access procedure initiated by a PDCCH order only when a CRC is scrambled with the C-RNTI, and all of the remaining fields are configured as follows.
    Reserved bit (for example, $$\left\lceil \log_2 \left\lfloor \frac{N_{RB}^{UL}}{6} \right\rfloor \right\rceil + 2 \text{ bits},$$

all of the bits are set to '1').
    Preamble index (for example, 6 bits)
    PRACH mask index (for example, 4 bits)
    Starting CE level (for example, 2 bits)
    The remaining bits of the format 6-1A for scheduling allocation of one PDSCH codeword are set to '0'.
    Otherwise, the remaining information as shown below is transmitted.
    Modulation and Coding Scheme (for example, 4 bits)
    Resource block assignment (for example, $$\left\lceil \log_2 \left\lfloor \frac{N_{RB}^{UL}}{6} \right\rfloor \right\rceil + 1 \text{ bits}$$

for a PDSCH). With respect to the bits for the resource block assignment, the $$\left\lceil \log_2 \left\lfloor \frac{N_{RB}^{UL}}{6} \right\rfloor \right\rceil \text{ MSB bit}$$

provides a narrowband index, and the 1 bit provides resource allocation within the indicated (i.e., provided) narrowband.
    Repetition number (for example, 2 bits)
    HARQ process number (for example, 3 bits)
    New data indicator (for example, 1 bit)
    HARQ-ACK resource offset (for example, 2 bits)
    DCI subframe repetition number (for example, 2 bits)
    When the CRC of the format 6-1B is scrambled with the RA-RNTI, the following information (i.e., field), among the information (i.e., fields), is reserved.
    HARQ process number
    New data indicator
    HARQ-ACK resource offset
    At this time, if a UE is not configured to decode an MPDCCH having a CRC scrambled by the C-RNTI, and the number of information bits of the format 6-1B is smaller than the number of information bits of the format 6-0B, '0's have to be appended until the payload size of the format 6-1B becomes the same as the payload size of the format 6-0B.
    Also, if a UE is configured to decode an MPDCCH having a CRC scrambled by the C-RNTI, and the number of information bits of the format 6-1B mapped onto a given search space is intended for scheduling the same serving cell and is smaller than the payload size of the format 6-0B mapped to the same search space, '0's have to be appended until the payload size of the format 6-1B becomes the same as the payload size of the format 6-0B.
    Next, the DCI format 6-2 is used for paging and direct indication; and may transmit the following information.
    Flag (for example, 1 bit) for distinguishing paging and direction indication from each other
    When a value of the flag is 0, the DCI format 6-2 includes (or transmits) direct indication information (for example, 8 bits) and reserved information bits for configuring the size to be the same as the format 6-2 where the flag value is 1.
    On the other hand, when the flag value is 1, the DCI format 6-2 includes (or transmits) resource block assignment (for example, $$\left\lceil \log_2 \left\lfloor \frac{N_{RB}^{UL}}{6} \right\rfloor \right\rceil \text{ bits}),$$

modulation and coding scheme (for example, 3 bits), repetition number (for example, 3 bits), and DCI subframe repetition number (for example, 2 bits).

Differently from the description above, as a DCI format related to NB-IoT, a DCI format N0, DCI format N1, and DCI format N2 may be considered.

First, the DCI format N0 is used for scheduling an NPUSCH in one uplink (UL) cell and may transmit the following information.

Flag (for example, 1 bit) for distinguishing the format N0 and the format N1 from each other, wherein the value of 0 may indicate the format N0, and the value of 1 the format N1.
  Subcarrier indication (for example, 6 bits)
  Resource assignment (for example, 3 bits)
  Scheduling delay (for example, 2 bits)
  Modulation and coding scheme (for example, 4 bits)
  Redundancy version (for example, 1 bit)
  Repetition number (for example, 3 bits)
  New data indicator (for example, 1 bit)
  DCI subframe repetition number (for example, 2 bits)

Next, the DCI format N1 is used for scheduling one NPDSCH codeword in one cell and a random access procedure initiated by NPDCCH order. At this time, the DCI corresponding to the NPDCCH order may be carried by an NPDCCH.

The DCI format N1 may transmit the following information.

Flag (for example, 1 bit) for distinguishing the format N0 and the format N1 from each other, wherein the value of 0 may indicate the format N0, and the value of 1 the format N1.

The format N1 is used for a random access procedure initiated by NPDCCH order only when an NPDCCH order indicator is set to '1', Cyclic Redundancy Check (CRC) of the format N1 is scrambled with the C-RNTI, and all of the remaining fields are configured as follows.
  Starting number of NPRACH repetitions (for example, 2 bits)
  Subcarrier indication of NPRACH (for example, 6 bits)
  All of the remaining bits of the format N1 are set to '1'.
  Otherwise, the remaining information as shown below is transmitted.
  Scheduling delay (for example, 3 bits)
  Resource assignment (for example, 3 bits)
  Modulation and coding scheme (for example, 4 bits)
  Repetition number (for example, 4 bits)
  New data indicator (for example, 1 bit)
  HARQ-ACK resource (for example, 4 bits)
  DCI subframe repetition number (for example, 2 bits)

When the CRC of the format N1 is scrambled with the RA-RNTI, the following information (i.e., field), among the information (i.e., fields), is reserved.
  New data indicator
  HARQ-ACK resource offset At this time, if the number of information bits of the format N1 is smaller than the number of information bits of the format N0, '0's have to be appended until the payload size of the format n1 becomes the same as the payload size of the format N0.

Next, the DCI format N2 is used for paging and direct indication; and may transmit the following information.

Flag (for example, 1 bit) for distinguishing paging and direct indication, where the value of 0 may represent direct indication, and the value of 1 may represent paging.

When a value of the flag is 0, the DCI format N2 includes (or transmits) direct indication information (for example, 8 bits) and reserved information bits for configuring the size to be the same as the format N2 where the flag value is 1.

Meanwhile, if a value of the flag is 1, the DCI format N2 includes (or transmits) resource allocation (for example, 3 bits), modulation and coding scheme (for example, 4 bits), repetition number (for example, 4 bits), and DCI subframe repetition number (for example, 3 bits).

As described above, Narrowband (NB)-LTE refers to a system for supporting low complexity and low power consumption, having system bandwidth (BW) corresponding to one physical resource block (PRB) of the LTE system.

In other words, an NB-LTE system may be used as a communication method for implementing IoT by supporting mainly such devices (or UEs) as ones based on machine-type communication (MTC) in the cellular system. In other words, an NB-LTE system may also be called NB-IoT.

Also, the NB-LTE system is not required to allocate an additional band by using the same OFDM parameters used in the existing LTE system such as subcarrier spacing of the legacy LTE system. In this case, by allocating one PRB of the legacy LTE system band to be used for NB-LTE, frequency resources may be utilized in an efficient manner.

In the case of downlink, a physical channel of the NB-LTE system may be defined as N-Primary Synchronization Signal (N-PSS)/N-Secondary Synchronization Signal (N-SSS), N-Physical Broadcast Channel (N-PBCH), N-PDCCH/N-EPDCCH, or N-PDSCH. Here, the prefix 'N-' may be added to distinguish the physical channel of the NB-LTE system from that of the legacy LTE system.

In view of multicast or broadcast transmission distinguished from unicast transmission, the (legacy) LTE system has adopted the MBSFN subframe for supporting MBMS services and/or Single Cell Point-to-Multipoint (SC-PtM) scheme. Here, the SC-PtM scheme supports multicast-based downlink transmission, which may be used for update of firmware and/or software, group-wise message transmission, and so on. At this time, not only for a general LTE system but also for the NB-LTE (i.e. NB-IoT) system, a situation may occur where a broadcast or multicast service (for example, the SC-PtM) has to be provided, and it is necessary to consider a method which allows an MBMS service to be used.

Accordingly, the present invention proposes a method for performing (or applying) the SC-PtM scheme in the NB-LTE (i.e., NB-IoT) system. More specifically, the present specification proposes an N-PDCCH which transmits information related to SC-PtM and/or a position of a PRB to which an N-PDSCH is transmitted and a method for allocating the corresponding PRB. Here, the information related to SC-PtM may include SC-Multicast Control Channel (SC-MCCH), SC-Multicast Traffic Channel (SC-MTCH), and so on. The SC-MCCH may include control information related to the SC-MTCH (for example, RRC signaling message), and the SC-MTCH may include multicast or broadcast information (for example, broadcast traffic).

In the case of NB-LTE (i.e. NB-IoT), by taking into account the fact that an eNB and/or UE transmits and receives data and/or control information by receiving one PRB unit (i.e. by using a frequency region occupying a particular band), an available region in the frequency domain may be limited compared with the general LTE system. Moreover, in the case of NB-LTE, due to the characteristic that an eNB and/or UE repeatedly transmits data and/or control information, an available region in the time domain may also be limited compared with the general LTE system.

FIG. 11 illustrates one example of a method for transmitting an N-PDCCH and an N-PDSCH in an NB-LTE system to which a method proposed by the present specification may be applied. FIG. 11 is used only for the convenience of descriptions and is not intended to limit the technical scope of the present invention.

Referring to FIG. 11, an N-PDCCH and the corresponding N-PDSCH are transmitted through a scheduled carrier (i.e. 1 PRB), and it is assumed that the N-PDCCH and N-PDSCH are transmitted in subframe units. In the NB-LTE system, each UE recognizes a single PRB as an individual carrier. Accordingly, a PRB in the present specification may be referred to as a concept similar to or the same as a carrier.

Also, as shown in FIG. 11, a UE needs to monitor a search space (for example, the 5 subframes and 8 subframes) configured for each N-PDCCH to receive the N-PDCCH. Here, monitoring a search space may be regarded as a process for decoding an N-PDCCH as much as a specific region according to the DCI format desired to be received through the corresponding search space and scrambling the corresponding CRC with a predefined specific RNTI value to check whether the scrambled CRC matches (i.e. corresponds to) a desired value.

In the case of the NB-LTE system, as shown in FIG. 11, an N-PDCCH and/or N-PDSCH may be transmitted repeatedly. For example, if it is assumed that an N-PDCCH is transmitted in 1 subframe unit, the N-PDCCH may be transmitted twice (N-PDCCH 1102) or five times (N-PDCCH 1104). Also, when it is assumed that the N-PDSCH is transmitted in 2 subframe units (i.e., a case where two subframes are configured as a default transmission unit by the resource allocation field included in the DCI), the N-PDSCH may be transmitted three times (N-PDSCH 1106) or four times (N-PDSCH 1108).

At this time, the repetition number of the N-PDCCH and/or the repetition number of the N-PDSCH may be specified by the DCI transmitted through the N-PDCCH.

As described above, compared with the general LTE system, an NB-LTE system has limited access to time and frequency resources for transmitting and receiving a signal and/or channel. Therefore, if the SC-PtM scheme is adopted additionally to the NB-LTE system, various problems may occur.

For example, in the case of the NB-LTE system, due to the characteristic described above, transmitted and received signals and/or channels may frequently overlap with each other. Therefore, when the SC-PtM scheme is introduced to an NB-LTE system, it may be highly likely that a signal and/or channel used in the SC-PtM scheme overlaps with a signal and/or channel (for example, random access channel (RACH) and paging channel) used in the existing NB-LTE system.

Alternatively, as another example, according as a frequency region to which a control channel is transmitted is limited, and channels of the same content have to be transmitted repeatedly, the amount of control information which may be carried by a specific control channel region of an NB-LTE system may be limited. In this case, there are chances that specific control information may not be carried by the control channel region. Therefore, for an NB-LTE system, it is also necessary to consider a method for carrying control information for a specific signal and/or channel (for example, N-PDCCH/N-PDSCH for an SC-MTCH) through a data channel rather than the control channel.

Also, considering the fact that the control information used in SC-PtM may be requested differently from the methods used in the legacy NB-LTE, a DCI format considered in SC-PtM may differ from a DCI format used in the legacy NB-LTE. In this case, the length (i.e. payload size or the number of information bits) of the DCI format for SC-PtM may be different from the length of a DCI format (for example, DCI format for a random access use or DCI format for paging use) used in the legacy NB-LTE. At this time, a UE may need to perform an additional blind decoding operation according as the DCI format is varied. Therefore, to prevent a UE from performing an unnecessary blind decoding operation, it may be necessary to consider a method for configuring a search space for an N-PDCCH which carries DCI of SC-PtM use separately through an identifier (for example, Single Cell (SC)-RNTI or Group-RNTI (G-RNTI)) of SC-PtM use.

As described above, when SC-PtM is introduced to the NB-LTE in view of multicast or broadcast transmission, various problems may occur. Therefore, in what follows, described in detail will be a method for preventing the problems above and performing multicast PRB transmission which transmits and receives an N-PDCCH and N-PDSCH related to SC-PtM.

For the convenience of descriptions, in what follows, an anchor-type PRB (or anchor-type carrier) may indicate a PRB that transmits, for initial access in view of an eNB, an N-PSS, N-SSS, N-PBCH, and N-PDSCH for N-SIB. In this case, there may be one anchor-type PRB or a plurality of anchor-type PRBs. Also, in the present specification, as described above, when there exists one or a plurality of anchor-type PRBs, a specific anchor-type PRB selected by a UE through initial access may be referred to (or defined) as an anchor PRB (or anchor carrier). In addition, in the present specification, a PRB allocated by an eNB to perform a downlink process (or procedure) after initial access may be referred to (or defined) as an additional PRB (or additional carrier).

Also, the DCI format N0, DCI format N1, and DCI format N2 mentioned in the present specification may refer to the DCI format N0, DCI format N1, and DCI format N2 described above (defined by the 3GPP specification, for example).

Also, embodiments described below are distinguished from each other only for the convenience of descriptions; part of a structure or characteristics of a particular embodiment may be included in another embodiment or may be replaced with a structure or characteristics corresponding to yet another embodiment. For example, a method described in a second embodiment below may be applied additionally to a method described in a first embodiment and vice versa.

First Embodiment—Multicast Transmission Method Using a PRB Different from a PRB Configured for Transmission of Legacy NB-IoT First, described will be a method performed by a UE for performing multicast transmission by using a PRB different from a PRB (i.e., a camp-on PRB, unicast PRB, paging PRB, or random access PRB) configured for transmission of the legacy NB-IoT. In other words, the method may be a method for performing multicast transmission by using a PRB different from a PRB allocated for procedures used in the legacy NB-IoT. This may be understood that a UE performs multicast transmission based on the SC-PtM scheme through a PRB different from a camped-on PRB, PRB allocated for unicast transmission, PRB allocated for a paging procedure, or PRB allocated for a random access procedure. Here, the multicast transmission based on the SC-PtM scheme may include transmission of an SC-MCCH-related N-PDCCH and/or N-PDSCH; and transmission of an SC-MTCH-related N-PDCCH and/or N-PDSCH.

First of all, when the multicast PRB transmission is performed in the different PRB, a method for configuring an N-PDCCH transmitting control information of an MCCH (i.e., SC-MCCH) and an N-PDCCH transmitting control information of an MTCH (i.e., SC-MTCH) to be transmitted from the same PRB (method 1); or from PRBs different from each other (method 2) may be considered. In other words, an SC-MCCH-related N-PDCCH and an SC-MTCH-related N-PDCCH may be transmitted from the same PRB or separately from PRBs different from each other.

Method 1: Method for Configuring an N-PDCCH Transmitting Control Information of an MCCH and an N-PDCCH Transmitting Control Information of an MTCH to be Transmitted from the Same PRB First, described will be a method for transmitting an N-PDCCH for an MCCH (i.e. SC-MCCH) and an N-PDCCH for an MTCH (i.e. SC-MTCH) at the same PRB.

FIG. 12 illustrates one example of a method for configuring a PRB in an NB-LTE (i.e. NB-IoT) system to which a method proposed by the present invention may be applied. FIG. 12 is used only for the convenience of descriptions and is not intended to limit the technical scope of the present invention.

Referring to FIG. 12, an additional PRB 1202, anchor-type PRB 1204, anchor PRB 1206, and representative PRB 1208 may be configured as a PRB for the SC-PtM scheme in the NB-LTE (i.e. NB-IoT) system.

In the case of method 1, it may be configured so that an N-PDCCH for an MCCH (i.e. SC-MCCH) and an N-PDCCH for an MTCH (i.e. SC-MTCH) are transmitted through the representative PRB.

An initial UE may be configured to receive information about a representative PRB index configured as a representative through an anchor PRB (i.e. an initially accessed anchor-type PRB) by using a system information block (SIB) (for example, SIB 20 for NB-IoT use). Here, the representative PRB index may refer to an index indicating a specific PRB configured to receive an SC-PtM-related signal and/or channel. In other words, the SIB may include (or may be used to carry) information related to SC-PtM (for example, a period at which SC-PtM is transmitted (i.e. SC-PtM transmission period)) and additionally include information about the representative PRB index.

The UE which has received the system information (SI) may know (or identify or determine) the representative PRB index by which SC-PtM is transmitted and know the period at which SC-PtM is transmitted. Here, transmission of SC-PtM may indicate transmission of an N-PDCCH/N-PDSCH related to an SC-MCCH for the SC-PtM scheme and/or transmission of the N-PDCCH/N-PDSCH related to an SC-MTCH.

Since the UE may know the representative PRB index and/or SC-PtM transmission period, the UE may monitor a predefined (or preconfigured or predetermined) common search space (CSS) (for example, Type1A-NPDCCH CSS) at the representative PRB. Through the monitoring, the UE may acquire SC-MCCH related scheduling information (i.e. N-PDSCH scheduling). In other words, the UE may acquire N-PDSCH scheduling information about an SC-MCCH through the monitoring.

At this time, the UE may be configured to monitor the CSS region by using an SC-RNTI value or another predefined (or preconfigured) RNTI value. Also, a DCI format used in this case may be configured to the DCI format N1 or DCI format N2 used in the legacy NB-IoT (i.e. NB-LTE) or to a new DCI format (i.e. DCI format Nm where m is an integer). Therefore (or accordingly) (i.e. by using the acquired N-PDSCH scheduling information), if the UE acquires SC-MCCH information by decoding the corresponding N-PDSCH, the UE may acquire a G-RNTI value for each Temporary Mobile Group Identifier (TMGI). In other words, the UE may acquire SC-MCCH information from the N-PDSCH corresponding to the scheduling information acquired through the monitoring and acquire the G-RNTI value from the acquired SC-MCCH information.

Next (or afterwards), the UE may monitor the predefined (or preconfigured) CSS (for example, Type2A-NPDCCH CSS) at the representative PRB. Through the monitoring, the UE may acquire SC-MTCH related scheduling information (i.e. N-PDSCH scheduling). In other words, the UE, through the monitoring, may acquire N-PDSCH scheduling information about the SC-MTCH.

At this time, the UE may be configured to monitor the CSS region by using a G-RNTI value corresponding to a TMGI that the UE wants to receive or another predefined (or preconfigured) RNTI value. Also, a DCI format used in this case may be configured to the DCI format N1 or DCI format N2 used in the legacy NB-IoT (i.e. NB-LTE) or to a new DCI format (i.e. DCI format Nm where m is an integer). Therefore (or accordingly) (i.e. by using the acquired N-PDSCH scheduling information), if the UE acquires SC-MTCH information by decoding the corresponding N-PDSCH, the UE may acquire MBMS data (for example, software update). In other words, the UE may acquire multicast or broadcast data by acquiring SC-MTCH information from an N-PDSCH corresponding to the scheduling information acquired through the monitoring.

Method 2: Method for Configuring an N-PDCCH Transmitting Control Information of an MCCH and an N-PDCCH Transmitting Control Information of an MTCH to be Transmitted from Different PRBs In view of utilization of a resource block, it may be efficient to transmit an MCCH (i.e. SC-MCCH) from a single PRB. This is so because if the MCCH is configured to be transmitted by a plurality of PRBs, the same information has to be carried for a plurality of PRBs. On the other hand, taking into account the fact that an MTCH (i.e. SC-MTCH) carries different information for each TMGI, transmitting an MTCH from a single PRB may cause system overload. Therefore, it may be necessary for an NB-LTE (i.e. NB-IoT) system to consider a method for transmitting the MTCH by using different PRBs according to the Temporary Mobile Group Identifier (TMGI) (or G-RNTI).

Accordingly, differently from the method above, a method for transmitting an N-PDCCH for an MCCH (i.e. SC-MCCH) and an N-PDCCH for an MTCH (i.e. SC-MTCH) from different PRBs will be described below.

FIG. 13 illustrates another example of a method for configuring a PRB in an NB-LTE (i.e. NB-IoT) system to which a method proposed by the present invention may be applied. FIG. 13 is used only for the convenience of descriptions and is not intended to limit the technical scope of the present invention.

Referring to FIG. 13, a Multicast-PRB (M-PRB) 1302, additional PRB 1304, anchor-type PRB 1306, anchor PRB 1308, and representative PRB 1310 may be configured as a PRB for the SC-PtM scheme in the NB-LTE (i.e. NB-IoT) system.

In the case of method 2, it may be configured so that an N-PDCCH for an MCCH (i.e. SC-MCCH) is transmitted through the representative PRB and an N-PDCCH for an MTCH (i.e. SC-MTCH) is transmitted through the M-PRB (or Multicast-carrier).

An initial UE may be configured to receive information about a representative PRB index configured as a representative through an anchor PRB by using an SIB (for example, SIB 20 for NB-IoT use). Here, the representative PRB index may refer to an index indicating a specific PRB configured to receive an SC-PtM-related signal and/or channel. In other words, the SIB may include information (for example, a period at which SC-PtM is transmitted) related to SC-PtM (or is used to carry the information) and additionally include (or carry) information about the representative PRB index.

The UE which has received the system information (SI) may know (or identify or determine) the representative PRB index by which SC-PtM is transmitted and know the period at which SC-PtM is transmitted. Here, transmission of SC-PtM may indicate transmission of an N-PDCCH/N-PDSCH related to an SC-MCCH for the SC-PtM scheme and/or transmission of the N-PDCCH/N-PDSCH related to an SC-MTCH.

Since the UE may know the representative PRB index and/or SC-PtM transmission period, the UE may monitor a predefined (or preconfigured or predetermined) common search space (CSS) (for example, Type1A-NPDCCH CSS) at the representative PRB. Through the monitoring, the UE may acquire SC-MCCH related scheduling information (i.e. N-PDSCH scheduling). In other words, the UE may acquire N-PDSCH scheduling information about an SC-MCCH through the monitoring.

At this time, the UE may be configured to monitor the CSS region by using an SC-RNTI value or another predefined (or preconfigured) RNTI value. Here, the SC-RNTI value is used for dynamically scheduled SC-PtM control information and is related to the SC-MCCH.

Also, the DCI format used in this case may be configured to the DCI format N1 or DCI format N2 used in the legacy NB-IoT (i.e. NB-LTE) or to a new DCI format (i.e. DCI format Nm where m is an integer). Therefore, if the UE acquires SC-MCCH information by decoding the corresponding N-PDSCH, the UE may acquire a G-RNTI value for each Temporary Mobile Group Identifier (TMGI). In other words, the UE may acquire SC-MCCH information from the N-PDSCH corresponding to the scheduling information acquired through the monitoring and acquire the G-RNTI value from the acquired SC-MCCH information. Here, the G-RNTI value is used for dynamically scheduled SC-PtM transmission and is related to the SC-MTCH.

Also, the UE may be configured to acquire different M-PRB index information according to a G-RNTI (or specific G-RNTI group) by decoding an N-PDSCH through which an SC-MCCH is transmitted or configured to receive different M-PRB index information according to the G-RNTI (or specific G-RNTI group) through group-specific RRC signaling. In other words, by decoding an N-PDSCH through which an SC-MCCH is transmitted, the UE may acquire information about an M-PRB index (i.e. a PRB index by which an SC-MTCH is transmitted) configured differently for each G-RNTI. At this time, information about the M-PRB index may be carried through RRC signaling.

In other words, the UE may receive an SC-MCCH, which is a logical channel, through an N-PDSCH, which is a physical channel, and acquire information (for example, index) about a PRB (i.e. a downlink carrier) used for an SC-MTCH included in the received SC-MCCH (i.e. carried by the received SC-MCCH). Here, information about a PRB used for the SC-MTCH may be carried through higher layer signaling (for example, RRC signaling). At this time, information about the PRB and/or the higher layer signaling may be configured for each G-RNTI.

In this case, configuration information (i.e. control information) for an N-PDCCH/N-PDSCH related to the SC-MTCH is carried through the SC-MCCH (i.e. N-PDSCH related to the SC-MCCH). In other words, as specific control information is carried through a data channel region rather than a control channel region, the control information may be carried in an efficient manner for the NB-IoT system limited in terms of time and frequency resources.

Next (or afterwards), the UE may monitor a CSS (for example, Type2A-NPDCCH CSS) predefined (or preconfigured) at a PRB corresponding to a G-RNTI (or specific G-RNTI group) included in a TMGI that the UE wants to receive (or corresponding to a TMGI that the UE wants to receive), User (UE)-specific Search Space (USS), or Group-specific Search Space (GSS) (or at least one thereof). Through the monitoring, the UE may acquire scheduling information (i.e. N-PDSCH scheduling) related to an SC-MCCH. In other words, through the monitoring, the UE may acquire N-PDSCH scheduling information for an SC-MTCH.

At this time, the UE may be configured to monitor the CSS, USS, or GSS (or at least one thereof) by using a G-RNTI value corresponding to a TMGI that the UE wants to receive or another predefined (or preconfigured) RNTI value. Also, a DCI format used in this case may be configured by a DCI format N1 or DCI format N2 used in the legacy NB-IoT (i.e. NB-LTE) or by a new DCI format (i.e. DCI format Nm where m is an integer). Therefore, if the UE acquires SC-MTCH information by decoding the corresponding N-PDSCH, the UE may acquire MBMS data. In other words, the UE may acquire multicast or broadcast data by acquiring SC-MTCH information from an N-PDSCH corresponding to the scheduling information acquired through the monitoring.

For both of the method 1 and the method 2, in most cases, an N-PDSCH transmitting an MCCH (i.e. SC-MCCH) is configured to be transmitted to the same PRB to which an N-PDCCH transmitting control information of the MCCH is transmitted, and also, an N-PDSCH transmitting an MTCH (i.e. SC-MTCH) is configured to be transmitted to the same PRB to which an N-PDCCH transmitting control information of the MTCH is transmitted. However, considering the characteristics of an NB-IoT system which uses one resource block, a PRB transmitting an N-PDCCH doesn't necessarily have to be configured to be the same unconditionally as a PRB transmitting a (corresponding) N-PDSCH. Therefore, it may be configured so that information indicating transmission of an N-PDSCH through the third PRB different from PRBs through which individual N-PDCCHs are transmitted may be carried dynamically.

For example, an N-PDCCH transmitting control information of an MCCH (i.e. SC-MCCH) may be configured to inform of a new (i.e., different) PRB index by which an N-PDSCH additionally transmitting the MCCH is transmitted. In other words, information indicating a PRB to which the N-PDSCH is transmitted may be included in the N-PDSCH. Similarly, an N-PDCCH transmitting control information of an MTCH (i.e. SC-MTCH) may be configured to inform of a new PRB index by which an N-PDSCH additionally transmitting the MTCH is transmitted.

At this time, a new PRB to which an N-PDSCH transmitting (or carrying) an SC-MCCH is transmitted, a new PRB to which an N-PDCCH transmitting (or carrying) SC-MTCH scheduling information is transmitted, and/or a new PRB to which an N-PDSCH transmitting (or carrying) an SC-MTCH is transmitted may be configured in various ways. As one example, the three new PRBs may be allocated independently from each other, may be the same with each other, may be separated from each other by a predetermined spacing of PRBs, or may have a relationship based on a specific rule among them.

Also, for both of the method 1 and the method 2, a UE may acquire SC-MCCH change notification information by monitoring a predefined (or preconfigured) common search space (CSS) at the representative PRB. Here, the SC-MCCH change notification information may include an indicator notifying that the SC-MCCH has been changed or information in the form of a flag. At this time, the UE may be configured to monitor the CSS region by using an SC-RNTI value or another predefined (or preconfigured) RNTI value. Also, the DCI format used in this case may be configured to the DCI format N1 or DCI format N2 used in the legacy NB-IoT (i.e. NB-LTE) or to a new DCI format (i.e. DCI format Nm where m is an integer).

Also, in the method 1 and the method 2, a method for notifying of a PRB to which an MCCH (i.e. N-PDSCH to which an SC-MCCH is transmitted) and/or an N-PDCCH scheduling an MCCH (i.e. SC-MTCH) is transmitted and a PRB to which an MTCH (i.e. N-PDSCH to which an SC-MTCH is transmitted) and/or an N-PDCCH scheduling an MTCH (i.e. SC-MTCH) is transmitted separately through system information (for example, SIB) may be taken into account. In other words, in the method above, PRB information (i.e. index) related to an SC-MCCH and PRB information related to an SC-MTCH may be carried through an SIB. Similarly, in the method 1, a representative PRB may be configured to be applied to an MTCH and/or an N-PDCCH scheduling an MTCH rather than an MCCH and/or an N-PDCCH scheduling an MCCH. At this time, the UE may be configured to read (or decode) the MCCH and/or an N-PDCCH scheduling the MCCH from an anchor PRB.

Also, the representative PRB mentioned in the method 1 and the method 2 may be a representative anchor-type PRB selected among anchor-type PRBs.

Second Embodiment—Multicast Transmission Method Using the Same PRB Configured for Transmission of Legacy NB-IoT As described above, a method for receiving an N-PDCCH (and/or N-PDSCH) for an MCCH or an N-PDCCH (and/or N-PDSCH) for an MTCH by using a PRB different from the PRB (i.e., a camp-on PRB, unicast PRB, paging PRB, or random access PRB) configured for transmission of the legacy NB-IoT receives multicast transmission by using a PRB independent from legacy NB-IoT transmission in view of a UE.

Therefore, when viewed from the standpoint of a configured UE, there is no such a case where an N-PDCCH for unicast transmission is transmitted through the same PRB for an N-PDCCH for SC-PtM. Also, from the standpoint of an idle UE, there is no such a case where Paging DCI (i.e. an N-PDCCH for paging) is transmitted through the same PRB for an N-PDCCH for SC-PtM.

Differently from the above, when an N-PDCCH and/or N-PDSCH for SC-PtM is transmitted through the same PRB as a camp-on PRB (or unicast PRB, paging PRB, or random access PRB), the N-PDCCH and/or N-PDSCH may overlap a signal and/or channel in the legacy NB-IoT system such as the unicast N-PDCH or the paging DCI. Therefore, when SC-PtM based multicast transmission is performed through the same PRB as a camp-on PRB (or unicast PRB, paging PRB, random access PRB), a method for processing (or performing) the multicast transmission needs to be considered.

The following two methods may be considered as a method for receiving an N-PDCCH (and/or N-PDSCH) for an MCCH or an N-PDCCH (and/or N-PDSCH) for an MTCH (i.e. SC-MTCH) by using the same PRB as the camp-on PRB (or unicast PRB, paging PRB, random access PRB). Here, the two methods may be distinguished from each other according to which DCI format is used for setting a DCI format of an N-PDCCH carrying control information of the M-CCH (i.e. SC-MCCH) or MTCH (i.e. SC-MTCH). In other words, in this case, a method for setting a DCI format of an N-PDCCH carrying control information of the MCCH (i.e. SC-MCCH) or MTCH (i.e. SC-MTCH) to be the same as the DCI format N1 (method 1) and a method for setting a DCI format of the N-PDCCH to be the same as the DCI format N2 (method 2) may be considered. Also, each method may be further classified according to whether a UE is in the idle mode or connected mode. This is so because a DCI format may be selected according to the UE's mode. For example, while a UE uses the DCI format N2 for paging in the idle mode, the UE may use the DCI format N1 for an uplink/downlink grant in the connected mode.

Method 1: Method for Setting a DCI Format of an N-PDCCH Carrying Control Information of an MCCH or an MTCH to be the Same as the DCI Format N1

First, a method for setting a DCI format of an N-PDCCH related to SC-PtM to be the same as the DCI format N1 will be described. At this time, a method for setting the DCI format to be the same as the DCI format N1 may indicate a configuration method which actually uses the DCI format N1 or uses a new DCI format to have the same payload of the DCI format N1. At this time, when space (for example, the number of bits) is still available even if all of the data are put into a DCI format, a method for inserting additional 'O's (i.e. a zero-padding method) may have to be used to configure the length of the DCI format to be the same as the length of the DCI format N1. At this time, when zero padding is performed to set the size of the DCI format N1 to be the same as that of a different DCI format, the length of the DCI format N1 may indicate the length after the corresponding zero padding is performed.

Also, a search space to which an N-PDCCH carrying control information of an MCCH or an MTCH is transmitted may be configured to use a common search space (CSS) for SC-PtM. In particular, in order not to increase the number of blind decoding of an N-PDCCH by a UE, setting the DCI format of an N-PDCCH carrying control information of an MCCH or an MTCH to be the same as the DCI format N1 may be applied to a case where the following two conditions are satisfied.

The first of the two conditions may be a case where a search space to which an N-PDCCH carrying control information of an MCCH or MTCH is transmitted is configured to be included in a UE-specific search space (USS) to which an N-PDCCH for UE-specific data scheduling is transmitted while the second may be a case where a PRB to which an N-PDCCH carrying control information of an MCCH or MTCH is transmitted is the same as a PRB to which an N-PDCCH for UE-specific data scheduling is transmitted (USS is transmitted).

In particular, when the aforementioned method is applied to Machine Type Communication (MTC), a method for configuring a search space differently for each Coverage Enhancement (CE) mode may be considered. For example, in the case of CE mode B, similarly to the case of NB-IoT described above, a search space to which an N-PDCCH carrying control information of an MCCH or MTCH is transmitted may be included in the USS or configured to be the same as the UESS. Differently from the aforementioned case, in the case of CE mode A, a search space to which an N-PDCCH carrying control information of an MCCH or MTCH is transmitted may be included in the Type0-MPDCCH CSS or configured to be the same as the Type0-MPDCCH CSS.

In what follows, detailed descriptions of the method 1 will be given by distinguishing a UE in the connected mode (for example, RRC connected UE) from a UE in the idle mode.

First, in the case of a UE in the connected mode, the corresponding UE may consider a method for configuring a search space to which DCI of an MCCH and an MTCH is transmitted to be the same as USS (i.e. NPDCCH USS) or to be included in the corresponding USS. In this case, a UE in the connected mode, without involving additional separate blind decoding (BD), may distinguish unicast control DCI that the UE has been watching so far (in other words, which has been being monitored) and DCI of an MCCH or DCI of an MTCH from each other by using CRC masking with different RNTI values. In the present specification, distinguishing DCI by using CRC masking with different RNTI values may indicate distinguishing DCI through CRC masking employing a different RNTI value. As one example, the different RNTI values may be configured as C-RNTI for the case of unicast, SC-RNTI for the case of an MCCH, and G-RNTI for the case of an MTCH. Also, in this case, the corresponding UE, without frequency shift (or transition) and/or unicast interruption, may decode MCCH control (i.e. an N-PDCCH/DCI related to control information of an MCCH) or MTCH control (i.e., an N-PDCCH/DCI related to control information of an MTCH).

In particular, when the method above is applied to MTC, in the case of CE mode B, similarly to the case of NB-IoT described above, a method for configuring a search space to which DCI of an MCCH and an MTCH is transmitted to be the same as USS (i.e. MPDCCH USS) or to be included in the corresponding USS may be considered. However, in the case of CE mode A, an MTC UE may monitor its USS and Type0-MPDCCH CSS simultaneously. Therefore, differently from the case of NB-IoT described above, a search space to which an N-PDCCH carrying control information of an MCCH or an MTCH may be included in the Type0-MPDCCH CSS or configured to be the same as the corresponding Type0-MPDCCH CSS. In this case, a UE in the connected mode, without involving additional separate blind decoding (BD), may distinguish common control DCI that the UE has been watching so far (in other words, which has been being monitored) and DCI of an MCCH or DCI of an MTCH from each other by using CRC masking with different RNTI values. As one example, the different RNTI values may be configured as C-RNTI for the case of unicast, SC-RNTI for the case of an MCCH, and G-RNTI for the case of an MTCH. Also, in this case, the corresponding UE, without frequency shift (or transition) and/or unicast interruption, may decode MCCH control (i.e. an N-PDCCH/DCI related to control information of an MCCH) or MTCH control (i.e., an N-PDCCH/DCI related to control information of an MTCH).

Differently from the description above, since a DCI format related to SC-PtM is set (i.e. configured) to the DCI format N1, a UE in the idle mode may be required to perform an additional action compared with the legacy action (for example, a legacy NB-IoT action) to watch (i.e. monitor) control information of an MCCH or control information of an MTCH transmitted according to the DCI format N1. At this time, the additional action may be described as follows.

A UE in the idle mode may monitor the DCI format N2 (or size of the DCI format N2) by using Paging-RNTI (P-RNTI) to watch (i.e. detect) paging that the UE previously desired to watch during a Discontinuous Reception (DRX) cycle of the UE. At this time, when DCI related to SC-PtM (i.e. MCCH or MTCH control) is transmitted to the same subframe, since the DCI is configured to have the size of the DCI format N1 (i.e. since the DCI format N1 and the DCI format N2 have different sizes), getting SC-PtM related information has to be given up. However, when a UE is capable of performing additional blind decoding, the UE may acquire SC-PtM related information by monitoring the DCI format N1 (i.e., the DCI format for an MCCH or an MTCH) by using the SC-RNTI or G-RNTI.

When paging and multicast (i.e. a signal and/or channel related to SC-PtM) are transmitted to the same subframe (i.e. the same timing), the method for monitoring the DCI format N2 to see (i.e. detect) paging by using P-RNTI at a PRB to which paging is transmitted may also be applied to the method of the first embodiment described above (for example, the method 2 of the first embodiment) for transmitting paging and multicast at different PRBs. In other words, when paging and multicast are transmitted at the same timing from different PRBs, a UE may monitor the DCI format N2 by using Paging-RNTI (P-RNTI) to see (i.e. detect) paging that the UE previously desired to watch during a DRX cycle of the UE.

Also, as described above, an N-PDCCH and/or N-PDSCH related to SC-PtM may overlap an N-PDCCH and/or N-PDSCH transmitted from the legacy NB-IoT. At this time, it may be required to configure which of the two is received first (i.e. configuration for priority).

For example, when an N-PDSCH transmitting paging (i.e., related to paging) and an N-PDSCH transmitting SC-PtM are transmitted to the same subframe (i.e. at the same timing), it may be configured as receiving paging. In other words, a UE may be configured to receive an N-PDSCH transmitting paging for the case above. Here, the N-PDSCH transmitting SC-PtM may include an N-PDSCH for an SC-MCCH and/or an N-PDSCH for an SC-MTCH as described above (for example, first embodiment). In other words, SC-PtM may indicate an SC-MCCH or SC-MTCH. Also, the N-PDSCH for the SC-MCCH may indicate an N-PDSCH corresponding to an N-PDSCH received by monitoring a specific CSS by using an SC-RNTI value or other RNTI value as described above (for example, first embodiment).

Similar to the above, the N-PDSCH for the SC-MTCH may indicate an N-PDSCH corresponding to an N-PDSCH received by monitoring CSS, USS, or GSS by using a G-RNTI value or other RNTI value as described above (for example, first embodiment). In other words, the N-PDSCH carrying SC-PtM may indicate an N-PDSCH corresponding to an N-PDCCH (i.e. allocated or scheduled by the NPDCCH) having a DCI CRC scrambled with the SC-RNTI or G-RNTI value. Also, the N-PDSCH transmitting the paging may indicate an N-PDSCH corresponding to an N-PDCCH having a DCI CRC scrambled with a P-RNTI.

Also, when an N-PDSCH transmitting paging and an N-PDCCH transmitting SC-PtM scheduling information are transmitted to the same subframe (i.e., at the same timing), it may be configured as receiving paging. In other words, a UE may be configured to receive an N-PDSCH transmitting paging for the case above. Here, the N-PDDCH transmitting the SC-PtM scheduling information may include an N-PDSCH for an SC-MCCH and/or an N-PDDCH for an SC-MTCH as described above (for example, first embodiment). In other words, the SC-PtM scheduling information may indicate DCI for an SC-MCCH or DCI for an SC-MTCH. Also, the N-PDSCH for the SC-MCCH may be detected (or received or decoded) as a specific CSS is monitored by using an SC-RNTI value or other RNTI value as described above (for example, first embodiment)

Similarly, the N-PDSCH for the SC-MTCH may be detected (or received or decoded) as a specific CSS is monitored by using a G-RNTI value or other RNTI value as described above (for example, first embodiment). Therefore, at a timing (i.e. subframe) of receiving an N-PDSCH transmitting paging, UE is not required to monitor a specific CSS corresponding to an SC-RNTI value G-RNTI related to SC-PtM.

Also, even when an N-PDDCH transmitting scheduling information of paging and an N-PDSCH transmitting SC-PtM are transmitted to the same subframe (i.e., at the same timing), it may be configured as receiving paging (i.e., an N-PDCCH transmitting scheduling information of paging). In other words, a UE may be configured to receive an N-PDCCH transmitting scheduling information of paging for the case above. Here, the N-PDSCH transmitting SC-PtM may include an N-PDSCH for an SC-MCCH and/or N-PDSCH for an SC-MTCH as described above. Also, the N-PDCCH transmitting scheduling information of paging may be detected (or received or decoded) by monitoring a specific search space (for example, Type1-NPDCCH CSS) by using a P-RNTI value as described above. Therefore, a UE may not have to receive the N-PDSCH transmitting SC-PtM in a specific search space (i.e. a subframe corresponding to the specific search space) configured for the N-PDCCH transmitting scheduling information of paging (i.e. the N-PDCCH configured by P-RNTI).

Also, even when an N-PDDCH transmitting scheduling information of paging and an N-PDCCH transmitting scheduling information of SC-PtM are transmitted to the same subframe (i.e., at the same timing), it (a UE) may be configured as receiving paging (i.e., an N-PDCCH transmitting scheduling information of paging). In other words, a UE may be configured to receive an N-PDCCH transmitting scheduling information of paging for the case above. In other words, the UE is not required to monitor a specific CSS corresponding to an SC-RNTI value or G-RNTI related to SC-PtM in a specific search space (i.e. a subframe corresponding to the specific search space) configured for the N-PDCCH transmitting scheduling information of paging (i.e. the N-PDCCH configured by P-RNTI).

In other words, when an N-PDSCH and/or N-PDCCH (or search space) related to SC-PtM overlaps an N-PDSCH and/or N-PDCCH (or search space) related to paging, a UE may be configured to first receive the N-PDSCH and/or N-PDCCH (or search space) related to paging.

The method described above may be applied even when a PRB transmitting paging is the same as a PRB transmitting SC-PtM and also be applied when a PRB transmitting paging is different from a PRB transmitting SC-PtM. In other words, the aforementioned method may be applied not only for the second embodiment but also for the first embodiment described above (a method for performing multicast transmission in a PRB different from a paging PRB).

Also, the method related to paging may be applied in the same manner even when random access (i.e. an N-PDCCH and/or N-PDSCH related to random access) collides with (or overlaps) multicast (i.e. an N-PDCCH and/or N-PDSCH related to SC-PtM).

For example, when an N-PDSCH related to a random access procedure and an N-PDSCH transmitting SC-PtM are transmitted to the same subframe (i.e. at the same timing), it may be configured as receiving random access. In other words, a UE may be configured to receive an N-PDSCH related to a random access procedure for the case above. Here, the N-PDSCH transmitting SC-PtM is the same as described above (i.e. what has been described in the paging-related embodiment). Also, the N-PDSCH related to the random access procedure may indicate an N-PDSCH corresponding to an N-PDCCH having a DCI CRC scrambled with a C-RNTI or a temporary C-RNTI.

Also, even when an N-PDSCH related to a random access procedure and an N-PDCCH transmitting SC-PtM scheduling information are transmitted to the same subframe (i.e. at the same timing), it may be configured as receiving random access. In other words, a UE may be configured to receive an N-PDSCH related to a random access procedure for the case above. Therefore, the UE is not required to monitor a specific CSS corresponding to an SC-RNTI value or G-RNTI related to SC-PtM at a timing (i.e. subframe) of receiving an N-PDSCH transmitting random access.

Also, even when an N-PDCCH transmitting scheduling information of random access (i.e. scheduling information of an N-PDSCH for random access) and an N-PDSCH transmitting SC-PtM are transmitted to the same subframe (i.e. at the same timing), it may be configured as receiving random access (i.e. an N-PDCCH transmitting scheduling information of random access). Therefore, the UE may not have to receive the N-PDSCH transmitting SC-PtM in a specific search space (i.e. a subframe corresponding to the specific search space) configured for the N-PDCCH transmitting scheduling information of random access (i.e. the N-PDCCH configured by a C-RNTI or a temporary C-RNTI).

Also, even when an N-PDCCH transmitting scheduling information of random access and an N-PDCCH transmitting scheduling information of SC-PtM are transmitted to the same subframe (i.e. at the same timing), it (a UE) may be configured as receiving random access (i.e. an N-PDCCH transmitting scheduling information of random access). In other words, the UE is not required to monitor a specific CSS corresponding to an SC-RNTI value or G-RNTI related to SC-PtM in a specific search space (i.e. a subframe corresponding to the specific search space) configured for the N-PDCCH transmitting scheduling information of random access.

In other words, when an N-PDSCH and/or N-PDCCH (or search space) related to SC-PtM overlaps an N-PDSCH and/or N-PDCCH (or search space) related to random access, a UE may be configured to first receive the N-PDSCH and/or N-PDCCH (or search space) related to random access.

Also, when random access and multicast are transmitted to the same subframe (i.e. at the same timing), the corresponding UE may be configured as having a relationship such that a search space to which DCI of an MCCH (i.e. SC-MCCH) or DCI of an MTCH (i.e. SC-MTCH) is transmitted is the same as the CSS used for random access (i.e. Type2-NPDCCH CSS) or included in the corresponding CSS. In this case, the corresponding UE, without involving additional separate blind decoding (BD), may distinguish random access DCI that the UE has been watching so far (in other words, which has been being monitored) and DCI of an MCCH or DCI of an MTCH from each other by using CRC masking with different RNTI values. As one example, the different RNTI values may be configured as C-RNTI for the case of random access, SC-RNTI for the case of an MCCH, and G-RNTI for the case of an MTCH.

Method 2: Method for Setting a DCI Format of an N-PDCCH Carrying Control Information of an MCCH or an MTCH to be the Same as the DCI Format N2

Different from the method 1 described above, a method for setting a DCI format of an N-PDCCH related to SC-PtM to be the same as the DCI format N2 will be described.

At this time, a method for setting the DCI format to be the same as the DCI format N2 may indicate a configuration method which actually uses the DCI format N2 or uses a new DCI format to have a payload such as the DCI format N2. At this time, when space (for example, the number of bits) is still available even if all of the data are put into a DCI format, a method for inserting additional '0's (i.e. a zero-padding method) may have to be used to configure the length of the DCI format to be the same as the length of the DCI format N2. At this time, when zero padding is performed to set the size of the DCI format N2 to be the same as that of a different DCI format, the length of the DCI format N2 may indicate the length after the corresponding zero padding has been performed.

Also, a search space to which an N-PDCCH carrying control information of an MCCH or an MTCH is transmitted may be configured to use a common search space (CSS) for SC-PtM. In particular, in order not to increase the number of blind decoding of an N-PDCCH by a UE, setting the DCI format of an N-PDCCH carrying control information of an MCCH or an MTCH to be the same as the DCI format N2 may be applied to a case where the following two conditions are satisfied.

The first of the two conditions may be a case where a search space to which an N-PDCCH carrying control information of an MCCH or MTCH is transmitted is configured to be included in a common search space (CSS) (i.e., Type1-NPDCCH CSS) to which an N-PDCCH for paging scheduling is transmitted while the second may be a case where a PRB to which an N-PDCCH carrying control information (i.e. DCI) of an MCCH or MTCH is transmitted is the same as a PRB (to which a cell-specific search space is transmitted) to which an N-PDCCH scheduling paging is transmitted.

In what follows, detailed descriptions of the method 2 will be given by distinguishing a UE in the idle mode from a UE in the connected mode.

First, in the case of a UE in the idle mode, the corresponding UE may consider a method for configuring a search space to which DCI of an MCCH and an MTCH is transmitted to be the same as CSS used by a paging signal (i.e. Type1-NPDCCH CSS) or to be included in the corresponding CSS. As one specific example, with respect to a search space to which control information (DCI) of an MCCH or MTCH is transmitted and a search space to which paging-related DCI (i.e. paging DCI) is transmitted, the same candidate resource element mapping and a set of candidate repetition number applied to subframe repetition may be applied within one subframe.

In this case, a UE in the idle mode, without involving additional separate blind decoding (BD), may distinguish paging DCI that the UE has been watching so far (in other words, which has been being monitored) and DCI of an MCCH or DCI of an MTCH from each other by using CRC masking with different RNTI values. As one example, the different RNTI values may be configured as P-RNTI for the case of paging, SC-RNTI for the case of an MCCH, and G-RNTI for the case of an MTCH.

Differently from the description above, since a DCI format related to SC-PtM is set (i.e. configured) to the DCI format N2, a UE in the connected mode may be requested to perform an additional operation compared with an existing operation (for example, a legacy NB-IoT operation) to watch (i.e. monitor) control information of an MCCH or control information of an MTCH transmitted according to the DCI format N2. At this time, the additional operation may be described as follows.

A UE in the connected mode may monitor the DCI format N1 by using Cell-RNTI (C-RNTI) to watch (i.e. detect) unicast control information. At this time, when DCI related to SC-PtM (i.e. MCCH (i.e., SC-MCCH) or MTCH (i.e., SC-MTCH) control) is transmitted to the same subframe, since the DCI is configured to have the size of the DCI format N2, the UE in the idle mode is unable to perform decoding of the DCI related to SC-PtM without employing additional blind decoding.

Therefore, the UE may have to give up acquiring information related to SC-PtM (i.e. control information) or giver up acquiring unicast control information. At this time, it is necessary to determine a priority for which one to acquire first. First, it may be configured to determine whether to receive multicast (i.e. a signal, channel and/or information related to SC-PtM) according to a service type.

For example, in the case of firmware update with a high priority, a UE may be configured to receive multicast first, even if unicast (i.e. a signal, channel and/or information related to unicast) is set to be received later. In the case of unicast, a UE may notify of reception immediately through ACK/NACK (A/N) procedure; however, since the ACK/NACK procedure is not defined for the case of multicast, a UE has no other way to notify of reception until information is exchanged in a higher layer. Therefore, it may be more advantageous to configure a UE to receive multicast before unicast.

In another example, the priority may be determined according to the amount of unicast data transfer. If a UE currently receives an amount of unicast data exceeding a predetermined threshold value, the UE may be configured to continue to receive unicast transmission. Otherwise, the UE may be configured to receive multicast. This is so because a large amount of unicast data previously received are present in a buffer, and it is more burdensome to use a configuration method to receive the data again.

However, when a UE is capable of performing additional blind decoding, the UE may acquire information related to SC-PtM by additionally monitoring the DCI format N2 (i.e. DCI format for an MCCH or an MTCH) by using an SC-RNTI or G-RNTI. Also, when a UE is scheduled to receive a unicast PDSCH through an N-PDCCH already decoded through USS, the UE may continue to receive the unicast PDSCH rather than attempt to receive multicast in the corresponding interval.

Also, as described above, an N-PDCCH and/or N-PDSCH related to SC-PtM may overlap an N-PDCCH and/or N-PDSCH related to the unicast. At this time, it may be required to configure which of the two is received first (i.e. configuration for priority).

For example, when an N-PDSCH transmitting unicast and an N-PDSCH transmitting SC-PtM are transmitted to the same subframe (i.e. at the same timing), it may be configured as receiving multicast (i.e. an N-PDSCH transmitting SC-PtM). In other words, a UE may be configured to receive an N-PDSCH transmitting SC-PtM for the case above.

Also, even when an N-PDSCH transmitting unicast and an N-PDCCH transmitting scheduling information of SC-PtM are transmitted to the same subframe (i.e. at the same timing), it may be configured as receiving multicast (i.e. an N-PDCCH transmitting scheduling information of SC-PtM). In other words, a UE may be configured to receive an N-PDCCH transmitting scheduling information of SC-PtM for the case above.

Also, even when an N-PDCCH transmitting scheduling information of unicast and an N-PDSCH transmitting SC-PtM are transmitted to the same subframe (i.e. at the same timing), it may be configured as receiving multicast (i.e. an N-PDSCH transmitting SC-PtM). In other words, a UE may be configured to receive an N-PDSCH transmitting SC-PtM for the case above.

Also, even when an N-PDCCH transmitting scheduling information of unicast and an N-PDCCH transmitting scheduling information of SC-PtM are transmitted to the same subframe (i.e. at the same timing), it may be configured as receiving multicast (i.e. an N-PDCCH transmitting scheduling information of SC-PtM). In other words, a UE may be configured to receive an N-PDCCH transmitting scheduling information of SC-PtM for the case above.

In other words, when an N-PDSCH and/or N-PDCCH (or search space) related to SC-PtM overlaps an N-PDSCH and/or N-PDCCH (or search space) related to unicast, a UE may be configured to first receive the N-PDSCH and/or N-PDCCH (or search space) related to SC-PtM (i.e. multicast).

In another example, when an N-PDSCH transmitting unicast and an N-PDSCH transmitting SC-PtM are transmitted to the same subframe (i.e. at the same timing), it may be configured as receiving unicast (i.e. an N-PDSCH transmitting unicast). In other words, a UE may be configured to receive an N-PDSCH transmitting unicast for the case above.

Also, even when an N-PDSCH transmitting unicast and an N-PDCCH transmitting scheduling information of SC-PtM are transmitted to the same subframe (i.e. at the same timing), it may be configured as receiving unicast (i.e. an N-PDSCH transmitting unicast). In other words, a UE may be configured to receive an N-PDSCH transmitting unicast for the case above.

Also, even when an N-PDCCH transmitting scheduling information of unicast and an N-PDSCH transmitting SC-PtM are transmitted to the same subframe (i.e. at the same timing), it may be configured as receiving unicast (i.e. an N-PDCCH transmitting scheduling information of unicast). In other words, a UE may be configured to receive an N-PDCCH transmitting scheduling information of unicast for the case above.

Also, even when an N-PDCCH transmitting scheduling information of unicast and an N-PDCCH transmitting scheduling information of SC-PtM are transmitted to the same subframe (i.e. at the same timing), it may be configured as receiving unicast (i.e. an N-PDCCH transmitting scheduling information of unicast). In other words, a UE may be configured to receive an N-PDCCH transmitting scheduling information of unicast for the case above.

In other words, when an N-PDSCH and/or N-PDCCH (or search space) related to SC-PtM overlaps an N-PDSCH and/or N-PDCCH (or search space) related to unicast, a UE may be configured to first receive the N-PDSCH and/or N-PDCCH (or search space) related to unicast.

The method described above may be applied even when a PRB transmitting unicast is the same as a PRB transmitting SC-PtM and also be applied when a PRB transmitting unicast is different from a PRB transmitting SC-PtM. In other words, the aforementioned method may be applied not only for the second embodiment but also for the first embodiment described above (a method for performing multicast transmission in a PRB different from a unicast PRB). Further, an above-mentioned method for determining a priority for which one to receive between the unicast transmission and the multicast transmission may also be applied for the same PRB, but it should be understood that the method may also be applied when unicast and multicast are transmitted from different PRBs and at the same subframe.

Also, in various embodiments of the present invention, an MCCH change notification (i.e. an SC-MCCH change notification) is transmitted to CSS type 1 by using the DCI format N2. However, since the MCCH change notification is transmitted once over a very long time period and is transmitted from a subframe different from a subframe to which control information of the MCCH (i.e. DCI of the MCCH) is transmitted, a UE in the connected mode and/or idle mode may not encounter a problem of additional blind decoding (BD).

However, in various embodiments of the present invention, an N-PDCCH of an MCCH (i.e. an N-PDCCH having DCI of an SC-MCCH) may be transmitted at the same timing (i.e. subframe) at which the MCCH change notification is known to be transmitted from an eNB. In this case, when a DCI format payload size of an N-PDCCH carrying control information of the MCCH is configured to be different in view of a UE from a DCI format payload size of an N-PDCCH carrying information about an MCCH change notification, the UE may encounter an additional blind decoding problem.

Therefore, in this case, to satisfy the max BD requirement (of a UE), the following methods (method 1 and method 2) may be considered. At this time, the two methods (method 1 and method 2) may be divided into a method where RNTIs used for CRC masking of a DCI format of an N-PDCCH of an MCCH and a DCI format of an MCCH change notification are configured to be different from each other (method 1) and a method where the RNTIs are configured to be the same with each other.

Method 1: Method for Distinguishing DCI Formats by Using CRC Masking with Different RNTI Values First, described will be a method which sets (or configures) sizes of a DCI format payload of an N-PDCCH of an MCCH and a DCI format payload of an MCCH change notification to the DCI format N1 or DCI format N2 and distinguishes the DCI formats by using CRC masking with different RNTI values. In this case, a method for setting the DCI format payload sizes to be the same with each other may include a method using actually the same DCI format and a method using zero padding to make lengths of DCI formats equal to each other even if the DCI formats are different from each other.

For example, when DCI of an N-PDCCH of an MCCH uses DCI format N1, and DCI of an MCCH change notification uses DCI format N2, since the DCI format N2 is shorter than the DCI format N1, a method for applying zero padding to the DCI format N2 to set the payload size thereof to be the same as that of the DCI format N1 may be considered.

At this time, when the same search space is configured for two DCI formats (i.e. a DCI format of an N-PDCCH of an MCCH and a DCI format of an MCCH change notification), a UE may check (or acquire) scheduling information for an MCCH through one-time blind decoding and check information about an MCCH change notification. More specifically, a UE may acquire scheduling information for an MCCH from an N-PDCCH of the MCCH through CRC masking by using an SC-RNTI value and acquire information about an MCCH change notification from an N-PDCCH carrying information about the MCCH change notification through CRC masking by using a newly defined RNTI.

Method 2: Method for Using the Same RNTI Value but Distinguishing DCI Formats by Using a Flag Included in the Payload Thereof Different from method 1, described will be a method which sets (or configures) a DCI format payload of an N-PDCCH of an MCCH and a DCI format payload of an MCCH change notification to be the same (as the DCI format N1 or the DCI format N2) and distinguishes the DCI formats by using an explicit flag (for example, 1 bit) included in the payload although the same RNTI value is used. In this case, a method for setting the DCI format payload sizes to be the same with each other may include a method using actually the same DCI format and a method using zero padding to make lengths of DCI formats equal to each other even if the DCI formats are different from each other.

For example, when DCI of an N-PDCCH of an MCCH uses DCI format N1, and DCI of an MCCH change notification uses DCI format N2, since the DCI format N2 is shorter than the DCI format N1, a method for applying zero padding to the DCI format N2 to set the payload size thereof to be the same as that of the DCI format N1 may be considered.

At this time, the same search space may be configured for two DCI formats (i.e. a DCI format of an N-PDCCH of an MCCH and a DCI format of an MCCH change notification), and for both of an N-PDCCH carrying information about an NPDCCH of an MCCH and an MCCH change notification, only one SC-RNTI may be configured to be used. In this case, through an explicit flag included in an actual DCI payload, it may be configured to indicate whether it is an N-PDCCH of an MCCH or an N-PDCCH of an MCCH change notification. For example, the flag value of '1' may represent (or indicate) transmitting an N-PDCCH of an MCCH, and the flag value of '0' may represent transmitting information about an MCCH change notification (i.e. an N-PDCCH carrying information about an MCCH change notification). Apparently, the flag value may also be configured in the opposite way to the above.

Also, with respect to the method 1 and the method 2 for an MCCH change notification, the DCI format payload size set (or configured) to be the same with each other may be equal to the DCI format N1, the DCI format N2, or a DCI format to be newly defined (for example, DCI format Nm, where m is an integer).

Also, in various embodiments of the present invention, a search space of Paging DCI may overlap a search space of DCI for an MCCH or an MTCH. At this time, in order to prevent the number of blind decoding, which monitors a search space for DCI decoding from the point of view of a UE, from being increased, the following two methods may be considered.

In a first method, when the respective search spaces repeated through a plurality of subframes overlap with each other in the same subframe from the point of view of an eNB, a method which predetermines (or preconfigures) a starting subframe constituting each search space to be configured in the same manner may be considered. In other words, when a search space of Paging DCI and a search space of DCI for an MCCH or an MTCH overlap each other, the method may configure starting subframes of the two search spaces to be the same with each other. In this case, when the two search spaces overlap, a UE may decode the two DC's simultaneously by using N-PDCCH samples stored in the same soft buffer only with a little increase of complexity.

However, from the point of view of an eNB, the starting subframe constituting each search space in which subframes are overlapped may not be predetermined (or preconfigured or predefined) to be configured in the same manner. In this case, when the starting subframe constituting each search space is started from the same subframe, a UE may be configured to decode two DCIs simultaneously without involving additional blind decoding. Or, when the starting subframe constituting each search space overlaps with each other and is started from a different subframe, the UE may be configured to select DCI to be decoded first between two DCIs according to their priority. As one example, the UE may be configured to first decode Paging DCI, or the network may configure the priority depending on the situation.

In a second method, from the point of view of an eNB, when individual search spaces repeated through a plurality of subframes are overlapped with each other in the same subframe, a method which predetermines (or preconfigures) a starting subframe and an ending subframe constituting each search space to be configured in the same manner may be considered. In other words, when a search space of Paging DCI and a search space of DCI for an MCCH or an MTCH overlap each other, the method may configure the starting and ending subframes of the two search spaces to be the same. In this case, when the two search spaces overlap with each other, a UE, expecting Paging DCI and DCI for an MCCH or MTCH to be transmitted (always) through the same search space, may (always) decode the two DC's simultaneously without involving additional blind decoding.

However, from the point of view of an eNB, starting and ending subframes constituting the respective search spaces in which subframes are overlapped may not be predetermined (or preconfigured or predefined) to be configured in the same manner. In this case, when a starting and ending subframes constituting each search space are the same for all of the search spaces, a UE may be configured to decode two DC's simultaneously without involving additional blind decoding. Or, when a starting and/or ending subframe constituting each search space are different for each search space, a UE may be configured to select DCI to be decoded first between two DC's according to their priority. As one example, the UE may be configured to first decode Paging DCI, or the network may configure the priority depending on the situation.

The aforementioned methods are not limited to a specific DCI format or a specific search space type and may be applied when it is necessary to configure two or more DC's to be simultaneously decoded. Further, a repetition level may be applied to a search space in which a paging DCI is transmitted and a search space for scheduling the MCCH or MTCH.

Third Embodiment—Method for Transmitting Control Information of MCCH Through Multiple PRBs Further, a method for transmitting an N-PDCCH transmitting the control information of the MCCH (i.e., SC-MCCH) through multiple RPBs other than one RPB may also be considered. That is, when the ENB transmits the control information (i.e., DCI) of the MCCH using multiple PRBs configured semi-statically, each UE may verify (or acquire) by selecting one PRB among multiple PRBs and verify a G-RNTI value configured for each TMGI by decoding the MCCH. In this case, multiple PRBs used for transmitting the control information of the MCCH may overlap with a unicast PRB, a paging PRB, or a camp-on PRB monitoring respective UEs. In this case, the corresponding UE may decode the control information of the MCCH and the MCCH without frequency shift and/or unicast interruption.

Thereafter, the UE that verifies (or acquires) the G-RNTI value in the MCCH (or N-PDSCH to which the MCCH is delivered) may verify the control information of the MTCH using the G-RNTI value corresponding to the TMGI which the UE desires to receive by moving to the PRB to which the control information of the MTCH (i.e., SC-MTCH) is transmitted. Thereafter, the corresponding UE may receive MBMS data (i.e., multicasted or broadcasted data) by decoding the MTCH according to the verified control information of the MTCH.

In addition, the UE may acquire information on MCCH change notification (i.e., SC-MCCH change notification0 by monitoring a prearranged (predetermined) CSS space in the PRB where the control information of the MCCH is transmitted. In this case, the UE may be configured to monitor the CSS space by using the SC-RNTI value or a prearranged (or predetermined) other RNTI value. Further, the DCI format used in this case may be configured to DCI format N1 or DCI format N2 or configured to a new DCI format (i.e., DCI format Nm, here, m is an integer).

Fourth Embodiment—Method for Configuring Coverage Enhancement (CE) Level in SC-PtM In addition, coverage enhancement may be required for some UEs of the NB-LTE (or NB-IoT) system, so that the Coverage Enhancement level needs to be considered even with respect to multicast transmission (i.e., SC-PtM transmission). That is, when the SC-PtM scheme is applied to the NB-LTE (i.e., NB-IoT) system, a method for efficiently configuring the CE level of the N-PDCCH and/or N-PDSCH related to the SC-PtM. Here, the N-PDCCH and the N-PDSCH associated with the SC-PtM may mean N-PDCCH and MCCH (SC-MCCH) for transmitting the control information of MCCH (SC-MCCH) and/or N-PDSCH for transmitting data of the MTCH (SC-MTCH).

In this case, a method for configuring the CE level of the N-PDCCH and/or N-PDSCH for the SC-PtM may be divided into two following methods (method 1 and method 2) according to the number of CE levels (e.g., single CE level) and multiple CE levels which are configured.

Method 1: Method for Using a Single CE Level

First, a method for configuring a CE level of an N-PDCCH or N-PDSCH carrying SC-PtM information (i.e. SC-PtM control information or data) as a single CE level will be described. At this time, CE level may indicate a repetition number set of an N-PDCCH or N-PDSCH or a maximum repetition number. Therefore, change of a CE level may indicate change of a repetition number set of an N-PDCCH or N-PDSCH or change of a maximum repetition number. Also, a repetition number set of an N-PDCCH or N-PDSCH; or a maximum repetition number corresponding to each CE level may be defined (or configured). At this time, using a single CE level (i.e. one CE level) brings an advantage that complexity is low from the system implementation point of view. Specific examples using a single CE level are as follows.

For example, a method for configuring a CE level used in a system to a fixed CE level may be considered. In other words, the method may indicate a method for configuring a multicast CE level of NB-IoT for all of the cells to a specific fixed CE level. Here, a fixed CE level may indicate a repetition number set corresponding to a fixed CE level or a maximum repetition number.

The method for using a fixed CE level may be applied to determine a CE level of an N-PDCCH carrying control information of an MCCH or control information of an MTCH. When the fixed CE level is set to the maximum CE level (i.e. a repetition number set or maximum repetition number corresponding to the maximum CE level), the network may support a service for most of UEs belonging to the corresponding system (or cell). In this case, the corresponding method may be applied in an advantageous manner for a system in which a plurality of UEs are present (or located) at locations where channel conditions are poor (for example, underground passage or warehouse).

In another example, a method by which each cell is configured to a single CE level in a cell-specific manner, and an eNB informs a UE of the corresponding CE level (or carries the corresponding CE level to the UE) through system information (for example, SIB) may be considered. The method for using a CE level configured in a cell-specific manner may be applied to determine a CE level of an N-PDCCH carrying control information of an MCCH or control information of an MTCH.

At this time, an eNB may determine an average channel condition by figuring out channel characteristics or channel properties of UEs configured to the eNB and locations of the corresponding UEs. Afterwards, the eNB may be configured so that it configures a CE level corresponding to the channel condition in a semi-static manner and informs a UE of the configured CE level through system information. Since a CE level may be determined in a cell-specific manner when the corresponding method is used, an advantageous effect may be obtained in that complexity is low from the system implementation point of view, and unnecessary repetitions are reduced.

Method 2: Method for Using Multiple CE Levels

Next, a method for configuring a CE level of an N-PDCCH or N-PDSCH carrying SC-PtM information to multiple CE levels will be described. Using multiple CE levels may indicate setting a CE level differently according to a channel condition of a UE and/or multicast service type. In the case of the corresponding method, an advantageous effect may be achieved in that unnecessary repetitions are reduced, and an appropriate CE level is applied depending on the situation. Specific examples using multiple CE levels are described as follows.

For example, a configuration method which assumes that a CE level configured for each TMGI (or G-RNTI or service type) is known in advance (or predefined) between an eNB and a UE may be considered. The method may be applied to determine a CE level of an N-PDSCH carrying control information of an MTCH and/or a CE level of an N-PDSCH carrying an MTCH. In this case, the CE level is configured differently according to TMGI (or G-RNTI or service type) which may be known (or acquired) through an N-PDSCH of an MCCH (i.e. an N-PDSCH through which an MCCH is carried).

As one example, if a multicast service type is an important update which has to be performed immediately by all of the UEs, the CE level may be set as large as possible so that UEs with poor channel conditions may also receive the service. Or if a multicast service type is a group call for UEs located in a good channel condition, the CE level may be set to a minimum CE level at which the corresponding UEs may receive the service so that unnecessary repetitions may be prevented.

The CE level configuration information for each TMGI (or G-RNTI or service type) as described above may be transmitted (or carried) to a UE through RRC signaling and/or MCCH.

As another example, a method for configuring a CE level for each UE group may be considered. The method may be applied to determine a CE level of an N-PDCCH carrying control information of an MCCH or MTCH and/or a CE level of an N-PDSCH carrying an MCCH or MTCH. In this case, an eNB may be configured to transmit an N-PDCCH carrying control information of an MCCH or MTCH and/or an N-PDSCH carrying an MCCH or MTCH at different CE levels through different PRBs. At this time, the CE levels used may be configured independently for each cell, but (configuration) information for a CE level transmitted to a specific PRB may be configured to be transmitted through system information to all of the UEs. A UE(s) which has received the corresponding system information may be configured to select a desired CE level and receive control information of an MCCH or MTCH by moving to a PRB to which the corresponding control information is transmitted. In the case of the corresponding method, an advantage may be achieved that each UE may select a desired CE level according to a channel condition of the UE.

Further, the ENB may be configured to transmit the control information of the MCCH or MTCH using different CE levels at different subframes (i.e., timings) of the same PRB other than different PRBs. In this case, the used CE levels may be independently configured for each cell as described above, but a subframe (i.e., information on the subframe) to which N-PDCCHs (i.e., having different CE levels) corresponding to different CE levels are allocated may be configured to be transmitted to all UEs through system information. A UE that receives the corresponding system information may be configured to select a desired CE level for each UE and receive the control information of the MCCH or MTCH according to the timing of transmitting the corresponding subframe. The corresponding method has an advantage in that an inefficient procedure that needs to send the same information using multiple PRBs may be reduced in terms of the eNB.

Fifth Embodiment—Method for Transmitting SC-MCCH Change Notification

Further, various transmission methods of the SC-MCCH change notification may be considered.

First, in the case of the existing LTE(-A) system, the eNB transmits (or delivers) the DCI scrambled to SC-N-RNTI to the UE through the PDCCH for the SC-MCCH change notification. Further, as the corresponding DCI is transmitted through a common search space (CSS), the UE that monitors the CSS may basically receive the SC-MCCH change notification (i.e., information associated with the SC-MCCH change notification) without an additional blind decoding (BD) operation.

Meanwhile, in the case of NB-IoT (i.e. NB-LTE) system, if it is assumed that an eNB transmits additional DCI through a specific CSS for notification of an SCCH change, a UE may acquire information about the SC-MCCH change notification (i.e. information related to the SC-MCCH change notification) by performing an additional blind decoding operation. Since additional blind decoding may invoke unnecessary overhead on a UE, methods for transmitting information about an SC-MCCH change notification differently from an existing (i.e. the legacy LTE(-A)) system may need to be considered for the NB-IoT system.

In this case, as a method for transmitting information about the SC-MCCH change notification, a method for transmitting through DCI scheduling an SC-MTCH (for example, DCI format N1) (method 1), method for transmitting through DCI scheduling an SC-MCCH (for example, DCI format N2) (method 2), method for transmitting through SC-MCCH payload (i.e. an N-PDSCH carrying an SC-MCCH) (method 3), method for transmitting through SC-MTCH payload (i.e. an N-PDSCH carrying an SC-MCCH) (method 4), and method for transmitting through a system information block (SIB) (method 5) may be considered. In other words, the method may be classified according to an entity transmitting SC-MCCH change information. In what follows, the methods above will be described in detail.

Method 1: Method for Transmitting Through DCI Scheduling an SC-MTCH

First, a method for transmitting information about an SC-MCCH change notification by an eNB to a UE through DCI scheduling an SC-MTCH will be described.

First, a method for adding an SC-MCCH change notification field to the corresponding DCI field (i.e. DIC scheduling an SC-MTCH) may be considered. For example, when the number of bits to be transmitted by an SC-MCCH is n (i.e. n bits), an SC-MCCH change notification field (n bits) may be added to the corresponding DCI. When an SC-MCCH is changed, an eNB may carry (or transmit) information (i.e. information indicating that the SC-MCCH has been changed) to a UE by using the corresponding field. The corresponding method provides an advantage that information about an SC-MCCH change notification may be carried without increasing the number of blind decoding of a UE.

Second, a method for notifying of change of an SC-MCCH as the corresponding DCI indicates a specific value may be considered. For example, by using a combination of reserved bits among existing DCI fields, the corresponding bits may be configured to indicate a specific value. Through the configuration, the corresponding DCI may be configured to carry information about an SC-MCCH change notification (simultaneously) while scheduling an SC-MTCH (i.e. an N-PDSCH carrying an SC-MTCH). In other words, an eNB may schedule an SC-MTCH by using the corresponding DCI and carry information about an SC-MCCH change notification. The corresponding method provides an advantage in that differently from the first method, the method does not require an additional DCI field and carries information about an SC-MCCH change notification without increasing the number of blind decoding of a UE. Also, the corresponding method may be used efficiently when the amount of information to be carried through an SC-MCCH change notification is not large.

Third, a method for scrambling the corresponding DCI by using a specific RNTI value according to whether an SC-MCCH has been changed may be considered. For example, in the case of an existing system (i.e. the legacy LTE(-A) system), a UE may acquire a G-RNTI value for each TMGI from the payload (i.e. N-PDSCH) carrying an SC-MCCH and distinguish (or identify or check) DCI scheduling an SC-MTCH by monitoring a search space by using the corresponding G-RNTI value.

Meanwhile, in the case of the method using a specific RNTI, a UE may descramble DCI by using the specific RNTI value (i.e. the RNTI value scrambling the corresponding DCI when an SC-MCCH is changed) and using a G-RNTI value corresponding to a TMGI that the UE desires to receive. At this time, if the corresponding DCI is descrambled into a G-RNTI value, the UE may determine that only the scheduling information for an SC-MTCH has been transmitted. Differently from the above, if the corresponding DCI is descrambled into the specific RNTI value, the UE may determine that scheduling information for an SC-MTCH and information about an SC-MCCH change notification have been transmitted together. Here, the specific RNTI value may be a previously used SC-N-RNTI value, a specific G-RNTI value different from G-RNTI values corresponding to all of the TMGIs being transmitted (i.e. supported) from the system, or a newly defined RNTI value. The corresponding method provides an advantage in that it does not require an additional DCI field and carries information about an SC-MCCH change notification without increasing the number of blind decoding of a UE.

The methods have been classified only for the purposes of illustration, and carrying information about an SC-MCCH change notification through DCI scheduling an SC-MTCH may be performed not only by the methods above but also by various other methods.

Method 2: Method for Transmitting Through DCI Scheduling an SC-MCCH

Different from the method above, a method for transmitting information about an SC-MCCH change notification by an eNB to a UE through DCI scheduling an SC-MCCH will be described.

First, a method for adding an SC-MCCH change notification field to the corresponding DCI field (i.e. DIC scheduling an SC-MCCH) may be considered. For example, when the number of bits to be transmitted by an SC-MCCH is n (i.e. n bits), an SC-MCCH change notification field (n bits) may be added to the corresponding DCI. When an SC-MCCH is changed, an eNB may carry (or transmit) information (i.e. information indicating that the SC-MCCH has been changed) to a UE by using the corresponding field. The corresponding method provides an advantage that information about an SC-MCCH change notification may be carried without increasing the number of blind decoding of a UE.

Second, a method for notifying of change of an SC-MCCH as the corresponding DCI indicates a specific value may be considered. For example, by using a combination of reserved bits among existing DCI fields, the corresponding bits may be configured to indicate a specific value. Through the configuration, the corresponding DCI may be configured to carry information about an SC-MCCH change notification (simultaneously) while scheduling an SC-MCCH (i.e. an N-PDSCH carrying an SC-MCCH). In other words, an eNB may schedule an SC-MCCH by using the corresponding DCI and carry information about an SC-MCCH change notification. The corresponding method provides an advantage in that differently from the first method, the method does not require an additional DCI field and carries information about an SC-MCCH change notification without increasing the number of blind decoding of a UE. Also, the corresponding method may be used efficiently when the amount of information to be carried through an SC-MCCH change notification is not large.

Third, a method for scrambling the corresponding DCI by using a specific RNTI value according to whether an SC-MCCH has been changed may be considered. In the case of the corresponding method, a UE may descramble DCI by using the specific RNTI value (i.e. the RNTI value scrambling the corresponding DCI when an SC-MCCH is changed) and using an S-RNTI value. At this time, if the corresponding DCI is descrambled into an SC-RNTI value, the UE may determine that only the scheduling information for an SC-MCCH has been transmitted. Differently from the above, if the corresponding DCI is descrambled into the specific RNTI value, the UE may determine that scheduling information for an SC-MCCH and information about an SC-MCCH change notification have been transmitted together.

Here, the specific RNTI value may be a previously used SC-N-RNTI value or a newly defined RNTI value. The corresponding method provides an advantage in that it does not require an additional DCI field and carries information about an SC-MCCH change notification without increasing the number of blind decoding of a UE.

Fourth, when an SC-MCCH is changed, a method for transmitting by changing a transmission resource of an N-PDCCH to which DCI scheduling an SC-MCCH is transmitted may be considered. At this time, a transmission resource of an N-PDCCH may indicate a subframe to which the N-PDCCH is to be transmitted or a decoding candidate. More specifically, the corresponding method may be a method by which a subframe to which DCI scheduling an SC-MCCH which has been being transmitted or a decoding candidate is changed to a different subframe or a different decoding candidate. Similarly, the corresponding method may be a method for predefining (or preconfiguring) a specific subframe or specific decoding candidate between an eNB and a UE; and configuring DCI scheduling an SC-MCCH to be transmitted through the corresponding subframe or corresponding decoding candidate. As described in detail above, when a transmission resource is changed, a UE may recognize (or check) that an SC-MCCH has been changed. The corresponding method is advantageous in that an additional DCI field is not required, and a descrambling procedure using an additional RNTI is not required to be performed.

The methods have been classified only for the purposes of illustration, and carrying information about an SC-MCCH change notification through DCI scheduling an SC-MTCH may be performed not only by the methods above but also by various other methods.

Method 3: Method for Transmitting Through SC-MCCH Payload (i.e. an N-PDSCH

Also, a method for transmitting information about an SC-MCCH change notification through payload (i.e. an N-PDSCH) of an SC-MCCH rather than DCI scheduling an SC-MCCH or SC-MTCH may be considered. More specifically, the corresponding method may be a method which transmits information about an SC-MCCH change notification at a specific timing predetermined (or predefined) between an eNB and a UE or determined through higher layer signaling (for example, RRC signaling). Here, the specific timing may indicate a specific subframe.

In this case, a UE may receive payload (i.e., an N-PDSCH) about an SC-MCCH at the specific timing while at the same time, additionally receiving information about an SC-MCCH change notification. Accordingly, the UE is not required to additionally monitor a search space to acquire information about an SC-MCCH change notification. Also, the corresponding method is advantageous in that since it uses SC-MCCH payload, space for transmitting an SC-MCCH change notification (i.e. information about an SC-MCCH change notification) may be configured sufficiently.

Method 4: Method for Transmitting Through SC-MTCH Payload (i.e. an N-PDSCH

Also, a method for transmitting information about an SC-MCCH change notification through payload (i.e. an N-PDSCH) of an SC-MTCH may be considered. More specifically, the corresponding method may be a method which transmits information about an SC-MCCH change notification at a specific timing predetermined (or predefined) between an eNB and a UE or determined through higher layer signaling (for example, RRC signaling). Here, the specific timing may indicate a specific subframe.

In this case, a UE may receive SC-MTCH payload (i.e., an N-PDSCH) at the specific timing while at the same time, additionally receiving information about an SC-MCCH change notification. Accordingly, the UE is not required to additionally monitor a search space to acquire information about an SC-MCCH change notification. Also, the corresponding method is advantageous in that since it uses SC-MTCH payload, space for transmitting an SC-MCCH change notification (i.e. information about an SC-MCCH change notification) may be configured sufficiently.

Method 5: Method for Transmitting Through a System Information Block (SIB)

Also, an SC-MCCH change notification through a system information block (SIB) rather than DCI or payload of an SC-MCCH or SC-MTCH may be considered. Here, the SIB may indicate an information block (or message) used for transmitting system information. In this case, if an SC-MCCH is changed, an eNB may be configured to transmit an SIB change notification to a UE and transmit a new SIB (i.e. an SIB including information about an SC-MCCH change notification) to the UE. Accordingly, the UE may receive a new SIB including information about an SC-MCCH change notification. The corresponding method is advantageous in that since an SIB carries information about an SC-MCCH change notification, sufficient space for transmitting information about an SC-MCCH change notification may be configured.

The various methods for transmitting information about an SC-MCCH change notification described above may be applied to various embodiments of the present invention described above. Also, the methods may be used not only separately but also in combination of the methods.

Also, a method (i.e. a control-less SC-MCCH transmission method) which does not use an N-PDCCH for transmitting SC-MCCH information (i.e. SC-MCCH) may be considered. In this case, a method for preconfiguring a region to which the corresponding information (i.e. SC-MCCH information) is transmitted instead of using an N-PDCCH for transmitting an SC-MCCH may be considered. For example, when the initial SC-MCCH scheduling information is transmitted through an SIB, a UE is not required to monitor DCI for scheduling an SC-MCCH. In this case, compared with the legacy NB-IoT, an advantage is obtained in that a UE is not required to perform additional blind decoding. At this time, when scheduling information for an SC-MCCH is changed, it is necessary to consider a method for carrying (or informing of) the corresponding change to a UE.

For example, a method for configuring a UE to receive (or read) an SIB again by performing SIB change notification through a paging signal may be considered. More specifically, since SC-MCCH scheduling information is transmitted through an SIB, an eNB may be configured to perform SIB change notification through a paging signal. In this case, a UE may be configured to check (or identify) scheduling information about a changed SC-MCCH by reading an SIB again (i.e. receiving a new SIB). The corresponding method may be used when a UE is in the idle mode (for example, RRC idle mode) where the UE monitors a common search space (CSS) in which a paging signal is scheduled.

As another example, a method for transmitting an indication indicating change of SC-MCCH scheduling information through new DCI or predefined, specific DCI may be considered. More specifically, like the methods for transmitting information about an SC-MCCH change notification described above, a method for adding an SC-MCCH scheduling change notification field to the corresponding DCI field and/or a method for notifying of change of SC-MCCH scheduling information as the corresponding DCI indicates a specific value may be considered. At this time, when a UE receives an indication indicating change of SC-MCCH scheduling information, the UE may be configured to read (or receive) an SIB including SC-MCCH scheduling information (i.e. SC-MCCH scheduling information).

Here, the predefined, specific DCI may be DCI transmitting information about an SC-MCCH change notification. At this time, the SC-MCCH scheduling change information may be configured to be carried by the corresponding DCI by using an additional field (for example, 1 bit) or carried without involving an additional field when DCI indicates a specific value. In the case of a method for transmitting an indication indicating change of SC-MCCH scheduling information through the new DCI or predefined, specific DCI, an eNB may have to transmit SC-MCCH scheduling information only when the SC-MCCH scheduling information is changed. Therefore, the corresponding method provides an advantage in that it does not need to transmit scheduling information each time (as in the existing method).

As yet another example, a method for transmitting an indication indicating change of SC-MCCH scheduling information and SC-MCCH scheduling information through new DCI or predefined, specific DCI may be considered. More specifically, an SC-MCCH scheduling change notification field and SC-MCCH scheduling field may be added to the corresponding DCI field. At this time, a UE may be configured to receive an indication indicating change of SC-MCCH scheduling information and also receive SC-MCCH scheduling information without necessarily reading (or receiving) an SIB.

Here, the predefined, specific DCI may be DCI transmitting information about an SC-MCCH change notification. At this time, SC-MCCH scheduling change information and actual SC-MCCH scheduling information may be carried by using an additional field (for example, one or more bits) of the corresponding DCI. In the case of the method for transmitting an indication indicating change of SC-MCCH scheduling information and SC-MCCH scheduling information through the new DCI or predefined, specific DCI, an eNB may have to transmit SC-MCCH scheduling information only when SC-MCCH scheduling information has been changed. Therefore, the corresponding method provides an advantage in that it does not need to transmit scheduling each time (as in the existing method).

Also, as a method for distinguishing the predefined, specific DCI in the embodiments described above, a CRC masking operation using a new RNTI value (for example, SC-N-RNTI value) instead of a previously used RNTI value may be performed. In this case, an advantage is obtained that a UE becomes able to distinguish DCI notifying of change of scheduling for an SC-MCCH from existing DCI without involving additional blind decoding (BD). Also, a method, which applies a payload size that is the same as existing DCI monitored by a UE to the corresponding DCI but uses a field for distinguishing whether the corresponding DCI is intended for SC-MCCH scheduling change notification or other purpose, may also be considered. The corresponding method also provides an advantage in that it is able to carry (or inform of) information related to change of SC-MCCH scheduling to a UE without involving the UE's additional blind decoding.

Also, in various embodiments of the present invention, with respect to transmitting control information about an SC-MCCH, a method which does not transmit SC-MCCH scheduling information each time through an N-PDCCH may also be considered. In other words, an eNB does not have to transmit DCI including SC-MCCH scheduling information each time through an N-PDCCH. In this case, a method for associating an SIB with DCI for an SC-MCCH change notification (i.e. DCI including information about an SC-MCCH change notification) may be used (or applied).

For example, a method for transmitting SC-MCCH scheduling information through an SIB but transmitting DCI for an SC-MCCH change notification only when any of SC-MCCH scheduling information and SC-MCCH payload (i.e. N-PDSCH) is changed may be considered. In this case, the period of a position at which the DCI for the SC-MCCH change notification may be transmitted (i.e. timing, occasion, or subframe) may be configured to a fixed value. Also, with respect to the DCI for the SC-MCCH change notification, an SC-N-RNTI or SC-RNTI may be used.

More specifically, through the initial (i.e. the first) SIB, a UE may receive (or acquire) SC-MCCH scheduling information and information about a period and/or subframe position at which DCI for an SC-MCCH change notification may be transmitted. Afterwards, a UE may check (or identify) SC-MCCH payload of an N-PDSCH by using the corresponding SC-MCCH scheduling information. At this time, an eNB may be configured to transmit DCI for an SC-MCCH change notification only when any of SC-MCCH scheduling information and SC-MCCH payload is changed. Here, the period of a position at which the corresponding DCI may be transmitted is configured to be the same as that informed to a UE through the initial SIB (i.e. a period that the UE has received).

Also, a 1-bit field (for example, an on-off form) for a change notification may be configured in the DCI for an SC-MCCH change notification. Or, a separate field for a change notification may not be configured within the DCI since change may be carried only through transmission of the DCI for an SC-MCCH change notification. In other words, when transmission of the corresponding DCI itself indicates whether an SC-MCCH has been changed or not, it is not necessary to configure a separate, additional field for a change notification within the corresponding DCI. However, since it is efficient to maintain the size of DCI to a fixed value from the point of view of blind decoding of a UE, a zero padding operation may be performed on the corresponding DCI for consistency with other DCI size.

Afterwards, a UE may be configured to attempt detection of the corresponding DCI by using an SC-N-RNTI (or SC-RNTI) at each position to which the corresponding DCI may be transmitted. When a UE detects the corresponding DCI, the UE may check scheduling information (i.e. SC-MCCH scheduling information) by moving to an SIB (i.e. by using an SIB). Afterwards, a UE may be configured to attempt detection of an N-PDSCH (i.e. an N-PDSCH to which an SC-MCCH is carried) according to checked scheduling information.

The method described in the embodiment above provides an advantage in that overhead of DCI may be reduced, and SC-MCCH scheduling information may be transmitted through an SIB which has a sufficient space.

As another example, a method for transmitting SC-MCCH scheduling information through DCI for an SC-MCCH change notification but transmitting DCI for an SC-MCCH change notification only when any of SC-MCCH scheduling information and SC-MCCH payload (i.e. N-PDSCH) is changed may be considered. In this case, the period of a position at which the DCI for the SC-MCCH change notification may be transmitted (i.e. timing, occasion, or subframe) may be configured to a fixed value. Also, with respect to the DCI for the SC-MCCH change notification, an SC-N-RNTI or SC-RNTI may be used.

More specifically, through the initial (i.e. the first) SIB, a UE may receive (or acquire) information about a period and/or subframe position at which DCI for an SC-MCCH change notification may be transmitted. Here, the corresponding DCI transmits SC-MCCH scheduling information. Afterwards, a UE may check SC-MCCH scheduling information, through which the UE checks SC-MCCH payload of an N-PDSCH. At this time, an eNB may be configured to transmit DCI for an SC-MCCH change notification only when any of SC-MCCH scheduling information and SC-MCCH payload is changed. Here, the period of a position at which the corresponding DCI may be transmitted is configured to be the same as a period that the UE has received through the initial SIB.

Also, a 1-bit field (for example, an on-off form) for a change notification may be configured in the DCI for an SC-MCCH change notification. Or, a separate field for a change notification may not be configured within the DCI since change may be carried only through transmission of the DCI for an SC-MCCH change notification. In other words, when transmission of the corresponding DCI itself indicates whether an SC-MCCH has been changed or not, it is not necessary to configure a separate, additional field for a change notification within the corresponding DCI. However, since it is efficient to maintain the size of DCI to a fixed value from the point of view of blind decoding of a UE, a zero padding operation may be performed on the corresponding DCI for consistency with other DCI size.

Afterwards, a UE may be configured to attempt detection of the corresponding DCI by using an SC-N-RNTI (or SC-RNTI) at each position to which the corresponding DCI may be transmitted. When a UE detects the corresponding DCI, the UE may reconfirm SC-MCCH scheduling information through the corresponding DCI. Afterwards, a UE may be configured to attempt detection of an N-PDSCH (i.e. an N-PDSCH to which an SC-MCCH is carried) according to checked scheduling information. The method described in the embodiment above may reduce DCI overhead.

In the embodiments above, through the initial SIB, SC-MCCH scheduling information and/or a period and/or subframe position at which DCI for an SC-MCCH change notification is transmitted may be configured to be larger than the period at which SC-MCCH payload (i.e. N-PDSCH) is transmitted or configured adaptively by the network.

Also, in the embodiments above, instead of using a method for configuring an eNB to transmit DCI for an SC-MCCH change notification only when any of SC-MCCH scheduling information and SC-MCCH payload is changed, a method for configuring to transmit, at each period, DCI for an SC-MCCH change notification having a period larger than that at which SC-MCCH payload is transmitted may be applied. In this case, it may be necessary to configure a 1-bit field (for example, an on-off form) for a change notification (i.e. which indicates change of an SC-MCCH) within the DCI for an SC-MCCH change notification. Afterwards, a UE may be configured to attempt detection of the corresponding DCI by using an SC-N-RNTI (or SC-RNTI) at each position to which the corresponding DCI may be transmitted.

At this time, when a UE detects the corresponding DCI and confirms (or identifies) an SC-MCCH change notification, the UE may reconfirm SC-MCCH scheduling information through an SIB or the corresponding DCI. Afterwards, the UE may be configured to attempt detection of an N-PDSCH (i.e. an N-PDSCH to which an SC-MCCH is transmitted) according to the confirmed scheduling information. On the other hand, when the UE detects the corresponding DCI but confirms that an SC-MCCH has not been changed, the UE may be configured to continue to receive SC-MCCH payload by using scheduling information received (i.e. checked) previously until the UE checks the next (i.e. subsequently transmitted) DCI for an SC-MCCH change notification.

From the point of view of the network (for example, in view of an eNB), the corresponding method provides an advantage in that DCI overhead related to DCI transmission may be reduced. Also, from the point of view of a UE, too, the corresponding method provides an advantage in that overhead due to DCI detection may be reduced as the transmission period of DCI for an SC-MCCH change notification is configured to be longer than a transmission period of SC-MCCH payload.

FIG. 14 illustrates an operation flow diagram of a UE transmitting/receiving data in a wireless communication system supporting NB-IoT to which a method proposed by the present specification may be applied. FIG. 14 is introduced only for the convenience of description and is not intended to limit the technical scope of the present invention.

Referring to FIG. 14, it is assumed that a specific carrier indicated among a plurality of PRBs (i.e. carriers) carries a multicast traffic channel (MTCH, i.e. SC-MTCH). Also, the corresponding UE is capable of performing operations described in the various embodiments of the present invention described above.

At the S1405 step, a UE monitors a first search space configured for a first NPDCCH (i.e. first N-PDCCH) (for SC-MCCH (i.e. MCCH)). Here, the first NPDCCH includes first control information (for example, DCI corresponding to the DCI format N2) for scheduling of a first NPDSCH (i.e. first N-PDSCH) carrying the SC-MCCH. Also, here, the monitoring process refers to a process for decoding candidates of the first NPDCCH in the first search space, i.e. a process for receiving the first NPDCCH.

Afterwards, at the S1410 step, the UE receives (or decodes) the first NPDSCH based on the first control information. Accordingly, the UE may acquire the SC-MCCH (i.e. information carried by the SC-MCCH (SC-MCCH information)) through (or by decoding) the first NPDSCH. Through the SC-MCCH, the UE may acquire configuration information about a carrier (i.e. PRB) allocated with respect to a group identifier (for example, G-RNTI) and the SC-MTCH.

Afterwards, at the S1415 step, the UE monitors a first search space configured with respect to a second NPDCCH (i.e. second N-PDCCH) (for SC-MTCH (i.e. MTCH)) by using the group identifier. Here, the second NPDCCH includes second control information (for example, DCI corresponding to the DCI format N1) for scheduling of a second NPDSCH (i.e. second N-PDSCH) carrying the SC-MTCH.

Afterwards, at the S1420 step, the UE receives (or decodes) the second NPDSCH based on the second control information. Accordingly, the UE may acquire the SC-MTCH (i.e. information carried by the SC-MTCH (i.e. multicast or broadcast information)) through (or by decoding) the second NPDSCH.

At this time, the second NPDCCH and the second NPDSCH are transmitted through a single carrier. Here, the single carrier may be configured according to the group identifier (i.e. a group identifier carried through an SC-MCCH). At this time, as mentioned above, carrier configuration information representing the single carrier may be carried through the SC-MCCH. Also, the carrier configuration information may be carried through higher layer signaling configured according to the group identifier (i.e. group-specific higher layer signaling).

Also, the first search space may be monitored by using a single cell identifier (for example, SC-RNTI), and the second search space may be monitored by using a group identifier.

Also, the UE may receive a system information block (for example SIB 20 for NB-IoT use) including carrier configuration information (for example, the system information representing a representative PRB for an SC-MCCH described above) representing a carrier through which the first NPDCCH and the first NPDSCH are carried. Through the system information block, the UE may acquire an SC-MCCH (i.e. SC-MCCH information) through a carrier identified (or determined) through the corresponding carrier configuration.

Also, the first control information may further include information related to a change notification for the SC-MCCH (for example, information indicating the MCCH change notification described above). Here, the information related to the change notification for the SC-MCCH may be composed of 1 bit (for example, a flag).

Also, the UE may receive system information including configuration information about at least one repetition number of the first PDCCH, first PDSCH, second PDCCH, or second PDSCH. Here, the repetition number may be configured in a cell-specific manner. Or, the UE may receive system information including configuration information about at least one repetition number of the second PDCCH or second PDSCH. In this case, the repetition number may be configured according to a group identifier (i.e. a group identifier carried through an SC-MCCH).

Also, the first PDCCH, first PDSCH, second PDCCH, and second PDSCH may be transmitted from a carrier (for example, an anchor PRB) to which a synchronization signal and a Physical Broadcast Channel (PBCH) are transmitted and other carrier (for example, a representative PRB or multicast PRB (M-PRB)). Also, the first control information may be downlink control information corresponding to the DCI format N2, and the second control information may be downlink control information corresponding to the DCI format N1.

Also, what have been described in the various embodiments of the present invention above are assumed as being related to the NB-IoT system. However, it should be clearly understood that the corresponding descriptions may also be applied to a narrow band system similar to the NB-IoT system. For example, in the case of an MTC system, a PRB (i.e. a carrier) may be replaced with a narrow band (i.e. 6 RBs) of the MTC system; DCI format N1 with the DCI format 6-1A or DCI format 6-1B; and DCI format N2 with the DCI format 6-2 in the various embodiments of the present invention described above. Also, an N-PDCCH and N-PDSCH may be replaced with an M-PDCCH and M-PDSCH; Type1-NPDCCH CSS with Type1-MPDCCH CSS; and Type2-NPDCH CSS with Type2-MPDCCH CSS.

The methods of the aforementioned embodiments are described by assuming that the NB-LTE system (i.e., the LTE system using narrow band (NB)) supports a single UE category. However, even in the aforementioned NB-LTE system, multiple UE categories may be defined. Here, the NB-LTE system may mean a system supporting the NB-IoT, a system supporting the MTC, etc.

Here, a UE category may mean a UE capability. Specifically, the UE category may mean a capability depending on a size of a bandwidth which the UE is capable of receiving, a transport block size (TBS) index combination which the UE may read (i.e., use), a TBS table, etc. Here, the size of the bandwidth which the UE is capable of receiving may mean a size of a bandwidth which the UE may use (i.e., support) for receiving a specific signal and a specific channel. Further, the TBS index combination may mean a combination of ITss and IsF, a combination of ITss and NPRB, etc., for selecting the TBS.

For example, in the case of the system supporting the NB-IoT, the UE category may be divided into a UE having a capability of reading only a legacy TB index combination and a UE having a capability of additionally reading even a larger TBS index combination in addition to the legacy TBX index combination. Here, the larger TBS index combination may mean an index combination indicating a TBS in which a maximum TBS value is configured to be larger than that of the legacy index combination. In this case, a table corresponding to the legacy TBS index combination may be referred to as a legacy TBS table and a table corresponding to the larger TBS index combination may be referred to as a larger TBS table.

As another example, in the case of the system supporting the MTC, the UE category may be divided into a UE capable of receiving data using a single narrowband (single NB) and a UE capable of receiving data using use multiple NBs. Here, the single narrow band may mean six resource blocks (i.e., 6 PRBs or 6 RBs) and the multiple narrow bands may mean 24 resource blocks (i.e., 24 PRBs or 24 RBs) or 25 resource blocks (i.e., 25 PRBs or 25 RBs). In other words, in the system supporting the MTC, the terminal category may divided (or defined) according to the frequency bandwidth which the UE may use for receiving the signal and/or channel.

Further, even in the case of the system supporting the MTC, the UE category may be divided according to the available TBX index combination. That is, the UE category may be divided into a UE using the legacy TBS table and a UE (i.e., a UE capable of using even the larger TBS table) using the larger TBS table.

Alternatively, the UE category may be divided into a UE using the single NB and the legacy TBS table, a UE using even the single NB, and the larger TBS table, a UE using the multiple NBs and the legacy TBS table, and a UE using even the multiple NBs and the larger TBS table by combining the aforementioned variables. In this case, the UE category may be divided into only some of the four UEs.

When the multiple UE categories are applied, a configuration (or indication) procedure for a resource, a container, etc., used for the signal and/or channel differently configured according to the UE category may be separate required. For example, the eNB delivers to the UE indication information for a UE category configured for information (e.g., SC-MCCH and/or SC-MTCH) which the corresponding UE desires to receive to prevent the UE from performing an unnecessary procedure which does not correspond to the UE category of the UE. As another example, as the eNB delivers to the UE the indication information for a UE category configured for the information (e.g., SC-MCCH and/or SC-MTCH) which the corresponding UE desires to receive, the UE that receives the indication information may clearly determine configuration information (e.g., TBS table, resource assignment information, etc.) which the UE is to use for transmission and reception of the signal (or channel). That is, when multiple UE categories are supported, the eNB needs to deliver to the UE indication information for a UE category configured for specific information.

In this case, before an indication procedure for the UE category by the eNB, the eNB requests the UE for UE category information (i.e., UE capability information) for each UE and in response to the request, a procedure may need to be performed, in which each UE reports the UE category information thereof to the eNB.

Hereinafter, in this specification, methods required for multicast transmission supporting multiple UE categories in the NB-LTE system will be described. In this case, even when the multiple UE categories are supported, the aforementioned methods (e.g., first to fifth embodiments) may be basically applied, of course.

Sixth Embodiment—Multicast Transmission Method Supporting Multiple UE Categories in System Supporting NB-IoT First, a multicast transmission method considering the multiple UE categories in the system supporting the NB-IoT will be described. Specifically, when the SC-PtM scheme is considered and the multiple UE categories are supported, (1) a method for delivering the UE category information in association with the SC-MCCH and (2) a method for delivering the UE category information in association with the SC-MTCH will be described. In this case, the two methods may be combined and used or only any one of the two methods may be used.

In the embodiment, a case where N (here, N is a positive integer larger than 1) are supported in the system supporting the NB-IoT are supported is assumed.

Specifically, for example, two UE categories (i.e., N=2) divided into the UE supporting even the larger TBS table and the UE supporting only the legacy TBS table may be supported based on Table 14. Here, Table 14 means the TBS table for the NPDSCH, the larger TBS table means the entire TBS table shown in Table 14, and the legacy TBS table means a TBS table excluding a shaded portion among the TBS values in Table 14. That is, in Table 14, the shaded portion may correspond to an index combination(s) configured for a UE capable of supporting a relatively larger TBS value.

TABLE 14

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | |
| 10 | 144 | 328 | 504 | 680 | 872 | 1032 | 1352 | |
| 11 | 176 | 376 | 584 | 776 | 1000 | 1192 | | |
| 12 | 208 | 440 | 680 | 904 | 1128 | 1352 | | |

Hereinafter, for convenience of description, the UE supporting even the larger TBS table is referred to as CAT_H and the UE supporting only the legacy TBS table is referred to as CAT_L. In other words, the maximum TBS value supported by the UE corresponding CAT_H is set to be larger than the maximum TBS value supported by the UE corresponding to CAT_L. Hereinafter, the methods are described with UE category division depending on the TBS value supported by the UE as an example, but this is for convenience of description and the present invention is not limited thereto.

(1) Method for Delivering UE Category Information in Association with SC-MCCH

First, when the multiple UE categories are supported, a method for delivering the UE category information (i.e., UE category information configured for the SC-MCCH (or SC-MCCH NPDSCH)) in association with the SC-MCCH is described. In particular, a method for delivering scheduling information of the NPDCCH for the SC-MCCH is described in detail by considering the multiple UE categories.

Considering the aforementioned UE categories, a method for delivering the scheduling information (SC-MCCH NPDCCH scheduling information) of the NPDCCH for the SC-MCCH through a system information block (SIB) may be classified into two methods. A first method is a method (i.e., a method for delivering N SC-MCCH NPDCCH scheduling information) for delivering all scheduling information for each UE category through the SIB and a second method is a method (i.e., a method for delivering one SC-MCCH NPDCCH scheduling information) for delivering only one scheduling information. Hereinafter, the two methods will be described in detail.

Method 1: Method for Delivering Scheduling Information for Each UE Category

First, a method in which the eNB delivers all scheduling information for each UE category to the UE will be described. For example, applying the CAT_H and CAT_L examples described above, the eNB may transmit both SC-MCCH NPDCCH scheduling information for CAT_H and SC-MCCH NPDCCH scheduling information for CAT_L to the UE over the SIB. In this case, two following cases may exist according to the RNTI configuration for scrambling each DCI.

First, the RNTI value may be configured differently for each UE category. As an example, when the SC-RNTI is used in order to monitor the search space of the NPDCCH for the SC-MCCH, SC-RNTI-H for CAT_H and SC-RNTI-L for CAT_L may be configured differently. In this case, the UE may acquire scheduling information of the NPDSCH (SC-MCCH NPDCCH scheduling information) for the SC-MCCH by monitoring the NPDCCH search space suitable for the category thereof. In other words, the UE compares the UE category thereof and the UE category (UE category configured for the SC-MCCH) indicated by the eNB with each other to acquire the scheduling information suitable for the category thereof. In this case, the UE may acquire the SC-MCCH NPDSCH scheduling information using the RNTI value corresponding to the category thereof. Thereafter, the UE may decode the SC-MCCH NPDSCH using the corresponding scheduling information.

Next, one RNTI value (i.e., common RNTI) may be configured regardless of the UE category. As an example, when the SC-RNTI is used in order to monitor the search space of the NPDCCH for the SC-MCCH, a common SC-RNTI may be configured regardless of CAT_H and CAT_L. In this case, the UE may acquire the SC-MCCH NPDSCH scheduling information by monitoring the SC-MCCH NPDCCH search space suitable for the category thereof. In other words, the UE compares the UE category thereof and the UE category (UE category configured for the SC-MCCH) indicated by the eNB with each other to acquire the scheduling information suitable for the category thereof. In this case, the UE may acquire the SC-MCCH NPDSCH scheduling information using the common RNTI value. Thereafter, the UE may decode the SC-MCCH NPDSCH using the corresponding scheduling information. However, in this case, a case where the eNB may allocate the RNTI value so that the search spaces do not continuously overlap with each other for each UE category is assumed.

Method 2: Method for Delivering One Scheduling Information

Next, a method in which the eNB delivers only one scheduling information to the UE will be described. For example, applying the CAT_H and CAT_L examples described above, the eNB may transmit one SC-MCCH NPDCCH scheduling information regardless of the UE category (i.e., irrespective of CAT_H and CAT_L) over the SIB. In this case, two following cases may exist according to the RNTI configuration for scrambling the DCI.

First, the RNTI value may be configured differently for each UE category. As an example, when the SC-RNTI is used in order to monitor the search space (i.e., SC-MCCH NPDCCH search space) of the NPDCCH for the SC-MCCH, SC-RNTI-H for CAT_H and SC-RNTI-L for CAT_L may be configured differently. In this case, the UE may determine whether the DCI suitable therefor is transmitted by monitoring the SC-MCCH NPDCCH search space configured in the SIB. In this case, the UE may use the RNTI corresponding to the category thereof. In other words, the UEs may determine whether a DCI corresponding to the category of each UE is transmitted by using different RNTI values. That is, the UE may check whether an SC-MCCH NPDCCH search area corresponding to the RNTI corresponding to the category thereof exists.

When the DCI corresponding to the category of the UE is transmitted, the UE may decode the SC-MCCH NPDSCH using the scheduling information transmitted to the DCI. That is, when the DCI scrambled to the RNTI corresponding to the category of the UE is transmitted, the UE may decode the SC-MCCH NPDSCH using the SC-MCCH NPDSCH scheduling information transmitted to the corresponding DCI. Unlike this, when a DCI that does not be suitable for the category of the UE is transmitted, the UE may be configured to monitor a next SC-MCCH NPDCCH search space without opening (i.e., decoding) the corresponding DCI. In other words, when information that is not suitable for the UE is transmitted, the UE may treat the information as an error and not receive (or decode) the information. For example, when a DCI for the UE supporting the larger TBS table is transmitted to the UE supporting the legacy TBS table, the corresponding UE may treat the DCI as the error and ignore the DCI.

Next, one RNTI value (i.e., common RNTI) may be configured regardless of the UE category. As an example, when the SC-RNTI is used in order to monitor the search space of the NPDCCH for the SC-MCCH, a common SC-RNTI may be configured regardless of CAT_H and CAT_L. In this case, the UE may acquire the SC-MCCH NPDSCH scheduling information by monitoring the SC-MCCH NPDCCH search space configured in the SIB. In this case, the UE may use the common RNTI value in order to decode the DCI. Thereafter, the UE verifies DCI contents (i.e., information included in the DCI) to determine whether the SC-MCCH NPDSCH scheduling information delivered through the corresponding DCI is for CAT_H or CAT_L.

In this case, as a method for determining for which the SC-MCCH NPDSCH scheduling information is, a method for dividing the UE category by adding an additional field (e.g., a UE category field) to the DCI contents may be considered. In the aforementioned example (i.e., N=2, CAT_H and CAT_L), CAT_H and CAT_L may be configured to be distinguished by configuring a 1-bit additional field.

Alternatively, a method for dividing the UE category through the TBS index value without adding the additional field to the DCI contents may also be considered. That is, such a method is a method in which the UE determines the UE category by verifying the TBS index value (i.e., an index combination of the TBS table) included in the DCI contents. As an example, when the DCI contents include a combination of indexes used in the legacy TBS table, the UE may recognize the DCI for CAT_L. Unlike this, when the DCI contents include a combination of indexes not used in the legacy TBS table, but used in the larger TBS table, the UE may recognize the DCI for CAT_H. Such a scheme may be applied because the index combination used in the legacy TBS table is a subset of the index combination used in the larger TBS table.

According to the determination result, when the DCI suitable for the category of the UE is transmitted, the UE may decode the SC-MCCH NPDSCH using the scheduling information transmitted to the DCI. That is, when the DCI supportable by the UE is transmitted, the UE may decode the SC-MCCH NPDSCH using the SC-MCCH NPDSCH scheduling information transmitted to the corresponding DCI. Unlike this, when a DCI that does not be suitable for the category of the UE is transmitted, the UE may be configured to monitor a next SC-MCCH NPDCCH search space without opening (i.e., decoding) the corresponding DCI.

(2) Method for Delivering UE Category Information in Association with SC-MTCH

Next, when the multiple UE categories are supported, a method for delivering the UE category information (i.e., UE category information configured for the SC-MTCH (or SC-MTCH NPDSCH)) in association with the SC-MTCH is described. In this case, the UE category information may be configured for each TMGI. Here, the TMGI may mean an identifier for a multicast or broadcast service (e.g., a multicast-download service, a multicast-streaming service, a broadcast-download service, a broadcast-streaming service, etc.). That is, the setting of the terminal category information for each TMGI may mean that the terminal category (s) is set for each multicast or broadcast service. Configuring the UE category information for each TMGI may mean configuring the UE category(categories) for each multicast or broadcast service.

By considering the aforementioned multiple UE categories (e.g., CAT_H and CAT_L based on Table 14), the method for delivering the UE category information (or UE category support information) may be classified into two methods. A first method is a method for additionally delivering the UE category information through the SC-MCCH NPDSCH (i.e., a payload of the SC-MCCH) and a second method is a method for delivering the information on the UE category through the DCI delivered through the SC-MTCH NPDCCH. Hereinafter, the two methods will be described in detail.

Method 1: Method for Delivering UE Category Information Through SC-MCCH NPDSCH

First, a method is described in which the ENB additionally transmits UE category information (i.e., UE category information configured for each TMGI) (e.g., UE category information configured for the SC-MTCH) for each TMGI to the UE through the SC-MCCH NPDSCH. In other words, in the method for transmitting each TMGI-specific SC-MTCH NPDCCH scheduling information and RNTI value (e.g., G-RNTI, newly defined RNTI, etc.) through the SC-MCCH NPDSCH (i.e., SC-MCCH payload), a method for transmitting the UE category information for each TMGI may be additionally considered. Here, the UE category information may be delivered in the form of an additional field (or indicator). For convenience of description, assuming that CAT_H and CAT_L described above are taken into consideration (i.e., N=2), the additional indicator may be configured as 1 bit (i.e., a bitmap form of 1 bit, '0' or '1').

Further, the RNTI value (e.g., G-RNTI) for monitoring the SC-MTCH NPDCCH search space may be configured differently for each TMGI and each UE may determine whether a service which the UE desires to receive may be received using the UE category thereof.

That is, each UE may determine whether the service which the UE desires to receive may be used by the UE capability thereof. In this case, the UE may determine whether the service may be received using the UE category information for the SC-MTCH delivered from the eNB. Specifically, the UE category information delivered from the eNB may also be configured for each TMGI and the UE compares the UE category information with the UE category thereof to determine whether the service may be used (or supported). Here, whether the service may be received may mean whether to monitor the DCI delivering the SC-MTCH NPDSCH scheduling information (i.e., whether to monitor the SC-MTCH NPDCCH search space).

When the UE determines that the service which the UE desires to receive may be received by the category of the corresponding UE, the UE may acquire the scheduling information (SC-MTCH NPDCCH scheduling information) of the NPDSCH for the SC-MTCH by monitoring the SC-MTCH NPDCCH search space. In this case, the UE may use the RNTI value corresponding to the corresponding service. Thereafter, the UE may decode the SC-MCCH NPDSCH using the acquired scheduling information. Unlike this, when the UE determines that the service which the UE desires to receive may not be received by the category of the corresponding UE, the UE may be configured to monitor the SC-MTCH NPDCCH search space. In other words, the corresponding UE determines a DCI which may not be used thereby as the error and does not decode the corresponding DCI.

In the aforementioned method, a free space in which the additional field (or indicator) is to be included in the payload size of the SC-MCCH is required. When the aforementioned method is used, the UE may not perform a monitoring operation for an unnecessary search space (i.e., which does not correspond to the UE category thereof). As a result, there is an effect that power consumption of the UE may be reduced.

Method 2: Method for Delivering UE Category Information Through DCI Delivered Through SC-MTCH NPDCCH Next, a method will be described in which the ENB delivers UE category information (i.e., UE category information configured for the SC-MTCH) through the DCI (e.g., DCI format N1) delivered through the SC-MTCH NPDCCH. For convenience of description, when the corresponding method is applied by assuming that CAT_H and CAT_L described above are considered (i.e., N=2), the UE may determine whether the corresponding DCI is for CAT_H or CAT_L through the DCI transmitted through the SC-MTCH NPDCCH.

In this case, based on the scheduling information configured in the SC-MCCH NPDSCH, the UE may decode the DCI by monitoring the SC-MTCH NPDCCH search space corresponding to the service which the corresponding UE desires to receive (i.e., corresponding to the configured TMGI). In this case, the UE may decode the corresponding DCI by using the RNTI value corresponding to the service. Thereafter, the UE verifies the DCI contents to determine whether the SC-MTCH NPDSCH scheduling information delivered through the corresponding DCI is for CAT_H or CAT_L.

In this case, as a method for determining for which the SC-MTCH NPDSCH scheduling information is, a method for dividing the UE category by adding an additional field (e.g., a UE category field) to the DCI contents may be considered. In the aforementioned example (i.e., N=2, CAT_H and CAT_L), CAT_H and CAT_L may be configured to be distinguished by configuring a 1-bit additional field.

Alternatively, a method for dividing the UE category through the TBS index value without adding the additional field to the DCI contents may also be considered. That is, such a method is a method in which the UE determines the UE category by verifying the TBS index value (i.e., an index combination (e.g., $I_{TBS}$ and $I_{SF}$) of the TBS table) included in the DCI contents. As an example, when the DCI contents include a combination of indexes used in the legacy TBS table, the UE may recognize the DCI for CAT_L. Unlike this, when the DCI contents include a combination of indexes not used in the legacy TBS table, but used in the larger TBS table, the UE may recognize the DCI for CAT_H. Such a scheme may be applied because the index combination used in the legacy TBS table is a subset of the index combination used in the larger TBS table by referring to Table 14.

According to the determination result, when the DCI suitable for the category of the UE is transmitted, the UE may decode the SC-MCCH NPDSCH using the scheduling information (i.e., SC-MCCH NPDSCH scheduling information) transmitted to the DCI. Unlike this, when a DCI that does not be suitable for the category of the UE is transmitted, the UE may be configured to monitor a next SC-MCCH NPDCCH search space without opening (i.e., decoding) the corresponding DCI.

Even in the aforementioned method, when a DCI not required for the UE (i.e., which does not correspond to the UE category thereof) is transmitted, a subsequent additional operation is not performed, and as a result, there is an effect that the power consumption of the UE may be reduced. However, when method 1 and method 2 are compared, since the UE does not perform monitoring itself for the SC-MTCH NPDCCH search space in the case of method 1, method 1 may be more efficient in terms of reduction of the power consumption.

Seventh Embodiment—Multicast Transmission Method Supporting Multiple UE Categories in System Supporting MTC Next, a multicast transmission method considering the multiple UE categories in the system supporting the MTC will be described. Specifically, when the SC-PtM scheme is considered and the multiple UE categories are supported, the method for delivering the UE category information in association with the SC-MCCH and the method for delivering the UE category information in association with the SC-MTCH will be described similarly to the case of the NB-IoT described above. In this case, the two methods may be combined and used or only any one of the two methods may be used.

In this case, the two methods may be generally similar to those in the embodiment (i.e., sixth embodiment) of the system supporting the NB-IoT. In other words, in order to apply the contents of the sixth embodiment described above to the MTC, the NPDCCH may be replaced with the MPDCCH and the NPDSCH may be replaced with the MPDSCH (i.e., the PDSCH used in the MTC).

However, in the case of the system supporting the MTC, a larger bandwidth (i.e., a large frequency bandwidth) is considered, unlike the system supporting the NB-IoT. For example, the UE supporting the MTC may use multiple narrow bands (e.g., 24 PRBs or 25 PRBs) as well as a single narrow band (e.g., 6 PRBs) corresponding to the NB-IoT. That is, in the case of the system supporting the MTC, there may be a UE using the single narrow band and a UE using the multiple narrow bands. In other words, in the case of the system supporting the MTC, the UE category may be distinguished according to the frequency bandwidth which the UE may use (i.e., support) for transmitting and receiving the signal.

In this case, in the UE using the single narrow band (e.g., 6 PRBs) and the UE using the multiple narrow bands (e.g., a maximum of 24 PRBs or 25 PRBs), the maximum TBS may be configured differently (e.g., in the case of 6 PRBs, 1000 bits and in the case of 24 PRBs, 4009 bits). As a result, apart from the TBS table for the UE using the single narrow band, the TBS table for the UE using the multiple narrow bands needs to be additionally configured. Here, the TBS table for the UE using the single narrow band may be referred to as the legacy TBS table and the TBS table for the UE using the multiple narrow bands may be referred to as the larger TBS table. Even in this case, the legacy TBS table may be configured as a subset of the larger TBS table. As an example, a part of the separately added larger TBS table (e.g., a TBS table configured for the UE supporting a maximum of 24 PRBs) may be configured as shown in Table 15.

TABLE 15

| $I_{TBS}$ | $N_{PRB}$ | | | | | | | | | |
|---|---|---|---|---|---|---|---|---|---|---|
| | 15 | 16 | 17 | 18 | 19 | 20 | 21 | 22 | 23 | 24 |
| 0 | 392 | 424 | 456 | 488 | 504 | 536 | 568 | 600 | 616 | 648 |
| 1 | 520 | 568 | 600 | 632 | 680 | 712 | 744 | 776 | 808 | 872 |
| 2 | 648 | 696 | 744 | 776 | 840 | 872 | 936 | 968 | 1000 | 1064 |
| 3 | 872 | 904 | 968 | 1032 | 1096 | 1160 | 1224 | 1256 | 1320 | 1384 |
| 4 | 1064 | 1128 | 1192 | 1288 | 1352 | 1416 | 1480 | 1544 | 1608 | 1736 |
| 5 | 1320 | 1384 | 1480 | 1544 | 1672 | 1736 | 1864 | 1928 | 2024 | 2088 |
| 6 | 1544 | 1672 | 1736 | 1864 | 1992 | 2088 | 2216 | 2280 | 2408 | 2472 |
| 7 | 1800 | 1928 | 2088 | 2216 | 2344 | 2472 | 2536 | 2664 | 2792 | 2984 |
| 8 | 2088 | 2216 | 2344 | 2536 | 2664 | 2792 | 2984 | 3112 | 3240 | 3368 |
| 9 | 2344 | 2536 | 2664 | 2856 | 2984 | 3112 | 3368 | 3496 | 3624 | 3752 |
| 10 | 2664 | 2792 | 2984 | 3112 | 3368 | 3496 | 3752 | 3880 | 4008 | 4008 |
| 11 | 2984 | 3240 | 3496 | 3624 | 3880 | 4008 | 4008 | 4008 | | |
| 12 | 3368 | 3624 | 3880 | 4008 | 4008 | | | | | |
| 13 | 3880 | 4008 | 4008 | | | | | | | |
| 14 | 4008 | | | | | | | | | |

In the above example, a maximum of four UE categories (i.e., N=4) may be considered (or defined) in the system supporting the MTC. Four UE categories may be divided into a UE using the single NB and the legacy TBS table, a UE using even the single NB and the larger TBS table, a UE using the multiple NBs and the legacy TBS table, and a UE using even the multiple NBs and the larger TBS table. In this case, a method for distinguishing the UE category using an additional field (or indicator) of 1 bit in the SIB or the SC-MCCH payload described in the aforementioned sixth embodiment may be replaced with a method using an additional field (or indicator) of 2 bits. That is, the aforementioned methods may be similarly applied as the value of N is replaced with 4 from 2.

However, as mentioned above, the UE category in the system supporting the MTC may be divided into only some of the four terminal categories. As an example, the UE using the single narrow band may preferably use the legacy TBS table and the UE using the multiple narrow bands may preferably use the larger TBS table. In this case, the UE category may be divided into the UE using the single narrow band the legacy TBS table and the UE using even the multiple narrow bands and the larger TBS table.

That is, in the system supporting the MTC, two UE categories may be defined according to the frequency band which the UE may use for transmitting and receiving the signal (and/or channel). Further, similar to the above description, the UE using the single narrow band the legacy TBS table may be referred to as CAT_L and the UE using the multiple narrow bands and the larger TBS table may be referred to as CAT_H. For convenience of description, in (1) the method for delivering the UE category information in association with the SC-MCCH and (2) the method for delivering the UE category information in association with the SC-MTCH described below, it is assumed that the UE category (or UE category associated with the frequency bandwidth) is divided into the UE (CAT_H) using the single narrow band and the legacy TBS table and the UE (CAT_L) using the multiple narrow bands and the large TBS table.

(1) Method for Delivering UE Category Information in Association with SC-MCCH

First, when the multiple UE categories are supported, a method for delivering the UE category information (i.e., UE category information configured for the SC-MCCH (or SC-MCCH (M)PDSCH)) in association with the SC-MCCH is described. In particular, a method for delivering scheduling information of the NPDCCH for the SC-MCCH is described by considering the multiple UE categories.

As mentioned above, the corresponding method may mean a method in which the NPDCCH is replaced with the MPDCCH and the NPDSCH is replaced with the MPDSCH (i.e., PDSCH used in the MTC) in (1) the method for delivering the UE category in association with the SC-MCCH of the aforementioned embodiment (e.g., sixth embodiment). That is, even in the system supporting the MTC, the eNB may deliver (or transmit) the scheduling information for each UE category or deliver one scheduling information regardless of the UE category.

As an example, in the system supporting the MTC, a method in which the eNB delivers only one scheduling information may be as follows.

By applying the CAT_H and CAT_L examples described above, the eNB may transmit one SC-MCCH MPDCCH scheduling information regardless of the UE category (i.e., irrespective of CAT_H and CAT_L) over the SIB. In this case, two following cases may exist according to the RNTI configuration for scrambling the DCI (e.g., DCI format 6-2).

First, the RNTI value may be configured differently for each UE category. As an example, when the SC-RNTI is used in order to monitor the search space (i.e., SC-MCCH MPDCCH search space) of the MPDCCH for the SC-MCCH, SC-RNTI-H for CAT_H and SC-RNTI-L for CAT_L may be configured differently. In this case, the UE may determine whether the DCI suitable therefor is transmitted by monitoring the SC-MCCH MPDCCH search space configured in the SIB. In this case, the UE may use the RNTI corresponding to the category thereof. In other words, the UEs may determine whether a DCI corresponding to the category of each UE is transmitted by using different RNTI values. That is, the UE may check whether an SC-MCCH MPDCCH search area corresponding to the RNTI corresponding to the category thereof exists.

When the DCI corresponding to the category of the UE is transmitted, the UE may decode the SC-MCCH MPDSCH using the scheduling information transmitted to the DCI. That is, when the DCI scrambled to the RNTI corresponding to the category of the UE is transmitted, the UE may decode the SC-MCCH MPDSCH using the SC-MCCH MPDSCH scheduling information transmitted to the corresponding DCI. Unlike this, when a DCI that does not be suitable for the category of the UE is transmitted, the UE may be configured to monitor a next SC-MCCH MPDCCH search space without opening (i.e., decoding) the corresponding DCI. In other words, when information that is not suitable for the UE is transmitted, the UE may treat the information as the error and not receive (or decode) the information. For example, when a DCI for the UE supporting the larger TBS table is transmitted to the UE supporting the legacy TBS table, the corresponding UE may treat the DCI as the error and ignore the DCI.

Next, one RNTI value (i.e., common RNTI) may be configured regardless of the UE category. As an example, when the SC-RNTI is used in order to monitor the search space of the MPDCCH for the SC-MCCH, a common SC-RNTI may be configured regardless of CAT_H and CAT_L. In this case, the UE may acquire the SC-MCCH MPDSCH scheduling information by monitoring the SC-MCCH MPDCCH search space configured in the SIB. In this case, the UE may use the common RNTI value in order to decode the DCI (e.g., DCI format 6-2). Thereafter, the UE verifies DCI contents (i.e., information included in the DCI) to determine whether the SC-MCCH MPDSCH scheduling information delivered through the corresponding DCI is for CAT_H or CAT_L.

In this case, as a method for determining for which the SC-MCCH MPDSCH scheduling information is, a method for dividing the UE category by adding an additional field (e.g., a UE category field) to the DCI contents may be considered. In the aforementioned example (i.e., N=2, CAT_H and CAT_L), CAT_H and CAT_L may be configured to be distinguished by configuring a 1-bit additional field.

Alternatively, a method for dividing the UE category through the TBS index value without adding the additional field to the DCI contents may also be considered. That is, such a method is a method in which the UE determines the UE category by verifying the TBS index value (i.e., an index combination of the TBS table) included in the DCI contents. As an example, when the DCI contents include a combination of indexes used in the legacy TBS table, the UE may recognize the DCI for CAT_L. Unlike this, when the DCI contents include a combination of indexes not used in the legacy TBS table, but used in the larger TBS table, the UE may recognize the DCI for CAT_H. Such a scheme may be applied because the index combination used in the legacy TBS table is a subset of the index combination used in the larger TBS table.

According to the determination result, when the DCI suitable for the category of the UE is transmitted, the UE may decode the SC-MCCH MPDSCH using the scheduling information (i.e., SC-MCCH MPDSCH scheduling information) transmitted to the DCI. That is, when the DCI supportable by the UE is transmitted, the UE may decode the SC-MCCH MPDSCH using the SC-MCCH MPDSCH scheduling information transmitted to the corresponding DCI. Unlike this, when a DCI that does not be suitable for the category of the UE is transmitted, the UE may be configured to monitor a next SC-MCCH MPDCCH search space without opening (i.e., decoding) the corresponding DCI.

(2) Method for Delivering UE Category Information in Association with SC-MTCH

First, when the multiple UE categories are supported, a method for delivering the UE category information (i.e., UE category information configured for the SC-MTCH (or SC-MTCH (M)PDSCH)) in association with the SC-MTCH is described. Even in this case, the UE category information may be configured for each TMGI as mentioned above. That is, the UE category may be configured for each multicast or broadcast service.

Further, as mentioned above, the corresponding method may mean a method in which the NPDCCH is replaced with the MPDCCH and the NPDSCH is replaced with the MPDSCH (i.e., PDSCH used in the MTC) in (2) the method for delivering the UE category in association with the SC-MTCH of the aforementioned embodiment (e.g., sixth embodiment). That is, even the system supporting the MTC, the eNB may deliver the UE category information using DCI (e.g., DCI format 6-1A or 6-1B) delivered through SC-MCCH MPDSCH (i.e., SC-MCCH payload) or SC-MTCH MPDCCH.

As an example, in the system supporting the MTC, a method in which the eNB delivers the UE category information through the SC-MCCH MPDSCH (i.e., SC MCCH payload or SC-MCCH) may be as follows.

Specifically, the ENB may additionally transmit the category information (i.e., UE category information configured for each TMGI) for each TMGI to the UE through the SC-MCCH MPDSCH. In other words, in the method for transmitting each TMGI-specific SC-MTCH MPDCCH scheduling information and RNTI value (e.g., G-RNTI, newly defined RNTI, etc.) through the SC-MCCH MPDSCH (i.e., SC-MCCH payload), a method for transmitting the UE category information for each TMGI may be additionally considered. Here, the UE category information may be delivered in the form of an additional field (or indicator).

For convenience of description, assuming that CAT_H and CAT_L described above are taken into consideration (i.e., N=2), the UE category information may be configured as 1 bit (i.e., a bitmap form of 1 bit, '0' or '1'). In other words, the UE category information may indicate a maximum frequency bandwidth (e.g., MaxBandwidth for the SC-MCCH MPDSCH) for receiving the signal (e.g., multicast information or broadcast information). As an example, the maximum frequency bandwidth may mean 6 PRBs corresponding to CAT_L or 24 PRBs corresponding to CATH. That is, the UE category information may mean configuration information indicating a frequency bandwidth which the UE may use (or support) for receiving the signal.

Further, the RNTI value (e.g., G-RNTI) for monitoring the SC-MTCH MPDCCH search space may be configured differently for each TMGI and each UE may determine whether a service which the UE desires to receive may be received using the UE category thereof.

That is, each UE may determine whether to monitor the SC-MTCH MPDCCH search space configured for the TMGI corresponding to the service which the UE desires to receive based on the UE category thereof. In this case, the UE may determine whether the service may be received using the UE category information delivered from the eNB. Specifically, the UE category information delivered from the eNB may also be configured for each TMGI and the UE compares the UE category information with the UE category thereof to determine whether the service may be used.

For example, the UE may verify the UE category information delivered through the SC-MCCH MPDSCH (or the SC-MCCH payload or SC-MCCH) from the eNB and determine whether a DCI for scheduling the SC-MTCH (i.e., SC-MTCH payload, SC-MTCH MPDSCH, or SC-MTCH PDSCH) which the corresponding UE intends to receive needs to be monitored.

As an example, when the UE supports the frequency bandwidth of 24 PRBs (i.e., in the case of CAT_H), the UE needs to monitor the DCI for scheduling the SC-MTCH which the corresponding UE intends to receive. In this case, the UE may use the UE category information (i.e., information indicating the frequency bandwidth available for receiving the corresponding SC-MTCH, e.g., 6 PRBs or 24 PRBs) received from the eNB through the SC-MCCH. In this case, the UE may interpret the DCI contents (i.e., DCI field) according to the received UE category information differently.

Unlike this, when the UE supports the frequency bandwidth of 6 PRBs (i.e., in the case of CAT_L), whether to monitor the DCI for scheduling the corresponding SC-MTCH may be determined according to the UE category configured for the SC-MTCH which the UE intends to receive. Specifically, when the SC-MTCH (or SC-MTCH (M)PDSCH) which the corresponding UE intends to receive is transmitted as 24 PRBs, the UE supporting 6 PRBs need not monitor the DCI for scheduling the corresponding SC-MTCH. This may mean that the corresponding UE determines that the corresponding UE may not receive the corresponding SC-MTCH by the UE category thereof. On the contrary, when the SC-MTCH which the corresponding UE intends to receive is transmitted as 6 PRBs, the UE supporting 6 PRBs need not monitor the DCI for scheduling the corresponding SC-MTCH. This may mean that the corresponding UE determines that the corresponding UE may receive the corresponding SC-MTCH by the UE category thereof.

When the UE determines that the service which the UE desires to receive may be received by the category of the corresponding UE, the UE may acquire the scheduling information of the NPDSCH for the SC-MTCH by monitoring the SC-MTCH MPDCCH search space. That is, when the UE may support the UE category configured for the service which the UE desires to receive, the corresponding UE may monitor the SC-MTCH MPDCCH search space. In this case, the UE may use the RNTI value corresponding to the corresponding service. Thereafter, the UE may decode the SC-MCCH MPDSCH using the acquired scheduling information.

Unlike this, when the UE determines that the service which the UE desires to receive may not be received by the category of the corresponding UE, the UE may be configured to monitor the SC-MTCH MPDCCH search space. That is, when the UE may not support the UE category configured for the service which the UE desires to receive, the corresponding UE need not monitor the SC-MTCH MPDCCH search space. In other words, the corresponding UE determines a DCI which may not be used thereby as the error and does not decode the corresponding DCI.

In the aforementioned method, a free space in which the additional field (or indicator) is to be included in the payload size of the SC-MCCH is required. When the aforementioned method is used, the UE may not perform a monitoring operation for an unnecessary search space (i.e., which does not correspond to the UE category thereof). As a result, there is an effect that power consumption of the UE may be reduced.

The signaling procedure between the UE and the eNB for the aforementioned method may be expressed as shown in FIG. 15.

FIG. 15 illustrates a signaling procedure between an eNB and a UE that transmit and receive UE category information in a wireless communication system to which a method proposed by this specification may be applied. FIG. 15 is just for convenience of the description and does not limit the scope of the present invention.

Referring to FIG. 15, it is assumed that the synchronization and the initial access procedure between the eNB and the UE are completed. Further, it is assumed that a wireless communication system that belongs to the eNB and the UE supports multiple UE categories (i.e., multiple UE capabilities) and the multiple UE categories are applied to the SC-MTCH.

In step S1505, the eNB may request capability information of the corresponding UE to the UE. Here, the capability information of the corresponding UE may mean UE category information supportable by the corresponding UE.

In step S1510, the UE may report the UE capability information thereof to the eNB.

Thereafter, in step S1515, the UE may receive the SC-MCCH MPDCCH from the eNB. Here, the SC-MCCH MPDCCH may include DCI (e.g., DCI format 6-2) for the SC-MCCH PDSCH. That is, the SC-MCCH MPDCCH may deliver the scheduling information for the SC-MCCH PDSCH. In this case, the UE may monitor the SC-MCCH MPDCCH search space according to the aforementioned method in order to receive the DCI.

In step S1520, the UE may receive the SC-MCCH (M)PDCCH from the eNB using the information received in step S1515. Here, the SC-MCCH PDSCH (i.e., the SC-MCCH payload or SC-MCCH) may deliver UE category information (e.g., information indicating (or representing) a frequency bandwidth which the UE may use for receiving the SC-MTCH (i.e., configured for the SC-MTCH) for the SC-MTCH according to the aforementioned method. In addition, the SC-MCCH PDSCH may deliver scheduling information (e.g., frequency resource information related to the SC-MTCH, RNTI associated with the SC-MTCH, or G-RNTI) related to the SC-MTCH. Therefore, the corresponding UE may be instructed the information on the UE category configured for the SC-MTCH from the eNB.

In step S1525, the UE may determine whether to monitor the SC-MTCH MPDCCH (i.e., the DCI including the scheduling information for the SC-MTCH PDSCH) using the UE category information for the delivered SC-MTCH. That is, the UE may confirm whether the UE category of the UE is suitable for receiving the DCI according to the aforementioned method, and an index (e.g., TBS table) that may be used when interpreting the DCI, etc.

When the UE determines to monitor the corresponding SC-MTCH MPDCCH in step S1525, the UE may receive the SC-MTCH MPDCCH from the eNB in step S1530. Here, the SC-MTCH MPDCCH may include DCI (e.g., DCI format 6-1A or DIC format 6-2B) for the SC-MTCH PDSCH. That is, the SC-MTCH MPDCCH may deliver the scheduling information for the SC-MTCH PDSCH. In this case, the UE may monitor the SC-MTCH MPDCCH search space according to the aforementioned method in order to receive the DCI. In FIG. 15, for convenience of description, steps S1525 and S1530 are expressed as separate procedures, but the steps may be performed as one procedure. In other words, the UE may determine whether to support the DCI according to the UE category thereof using the received UE category information and receive a DCI determined to be supported according to the UE category thereof through the determination.

In step S1535, the UE may receive the SC-MCCH (M)PDCCH (or SC-MTCH payload, or SC-MTCH) from the eNB using the information received in step S1530. According to the aforementioned procedures, the UE may receive the multicast information or broadcast information from the eNB.

FIG. 16 illustrates a flowchart of an operation of a UE transmitting and receiving data in a wireless communication system supporting Machine-Type Communication (MTC) to which the method proposed by the present specification may be applied. FIG. 16 is just for convenience of the description and does not limit the scope of the present invention.

Referring to FIG. 16, it is assumed that the eNB performs the multicast transmission or broadcast transmission according to the SC-PtM scheme.

In step S1605, the UE monitors a first search space configured for a first MPDCCH. Here, the first MPDCCH means an MPDCCH configured for transmitting the SC-MCCH. In other words, the UE may receive the first MPDCCH for the SC-MCCH from the eNB. In this case, the first MPDCCH includes first control information (e.g., DCI format 6-2) for scheduling a first (M)PDSCH for transferring the SC-MCCH. In this case, the corresponding UE may monitor the first search space through the aforementioned method(s).

Further, the first search space may be monitored by using a single cell identifier (e.g., SC-RNTI).

In step S1610, the UE receives a first (M) PDSCH from the eNB. In this case, the corresponding UE may use first control information received in step S1605.

In step S1615, the UE monitors a second search space configured for a second MPDCCH. Here, the second MPDCCH means an MPDCCH configured for transmitting the SC-MTCH. In other words, the UE may receive the second MPDCCH for the SC-MTCH from the eNB. The corresponding UE uses a group identifier (e.g., G-RNTI) acquired through the SC-MCCH in order to monitor the second search space.

Here, the second MPDCCH includes first control information (e.g., DCI format 6-1A or DCI format 6-1B) for scheduling a second (M)PDSCH for scheduling a second (M)PDSCH. In this case, the corresponding UE may monitor the second search space through the aforementioned method(s).

In step S1620, the UE receives the second (M)PDSCH from the eNB. In this case, the corresponding UE may use second control information received in step S1615.

In this case, configuration information indicating (or representing) a frequency bandwidth which the UE is capable of using in order to receive the second PDSCH is delivered through the SC-MCCH. Here, the configuration information may mean the UE category information mentioned in the aforementioned method(s).

Specifically, the configuration information may indicate (or represent) any one of a first frequency bandwidth and a second frequency bandwidth and the first frequency bandwidth (e.g., 5 MHz corresponding to 24 PRBs) may be configured to be larger than the second frequency bandwidth (1.4 MHz corresponding to 6 PRBs). In this case, a first TBS table may be configured to be used with respect to the first frequency bandwidth and a second TBS table may be configured to be used with respect to the second frequency bandwidth. Here, TBS values represented by the second TBS table may be included in the first TBS. Further, the first TBS table may be configured by considering a maximum TBS value larger than a maximum TBS value of the second TBS table. For example, the TBS table for the first frequency bandwidth may be configured based on 4008 bits which is the maximum TBS value and the TBS table for the second frequency bandwidth may be configured based on 1000 bits which is the maximum TBS value.

As an example, the configuration information may indicate one of a first frequency bandwidth corresponding to 6 resource blocks and a second frequency bandwidth corresponding to 24 resource blocks. In this case, the configuration information may be a 1 bit indicator indicating any one of the first frequency bandwidth and the second frequency bandwidth.

Further, the group identifier and the configuration information may be configured for each TMGI. That is, the group identifier and the configuration information may be configured for each multicast or broadcast service. As a result, the corresponding UE may monitor only the second search space configured for the second MPDCCH corresponding to the service which the UE desires to receive.

Further, the UE may transmit capability information of the UE from the eNB. This may be performed by a request by the eNB or performed voluntarily. The corresponding procedure may be preferably performed before step S1605. In this case, the configuration information may be generated based on the capability information of the UE by the eNB.

Further, the configuration information may be delivered through the SC-MCCH when the UE supports the SC-PtM scheme (e.g., 3GPP release 14 UE).

Through the aforementioned procedures, the corresponding UE may receive multicast information or broadcast information while reducing unnecessary power consumption.

Further, as mentioned above, the RNTI value may be allocated for each UE category, but contrary to this, a method for allocating the UE category for each RNTI value may also be considered. Further, the number of RNTI value or scheduling related configuration information need not to be continuously equal to the number of UE categories. That is, by considering a case where the information is delivered by independently configuring the RNTI value or scheduling related configuration information among the same UE categories, the number of RNTI value or scheduling related configuration information may be larger than the number of UE categories. Alternatively, by considering a case where the information is delivered by equally configuring the RNTI value or scheduling related configuration information among different UE categories, the number of RNTI value or scheduling related configuration information may be smaller than the number of UE categories.

Eighth Embodiment—Method for Transmitting Resource Allocation Information for SC-MTCH in System Supporting MTC Further, when both a narrowband and a wideband are considered in the system supporting the MTC, a method for delivering the resource allocation information for the multicast information or broadcast information needs to be newly defined.

Specifically, in a situation of considering wideband extension, the wideband extension in the SC-MTCH may take priority over the wideband extension in the SC-MCCH. The reason is that the SC-MCCH delivers control information for the multicast information or broadcast information, whereas the SC-MTCH actually delivers the multicast information or broadcast information. As a result, a method needs to be considered, which may distinguish and announce differences between a case of perform resource allocation by a narrowband and a case of performing resource allocation by a wideband in the SC-MTCH and the corresponding cases. In this case, as the method for distinguishing and announcing the corresponding cases, a method for announcing the cases through the SC-MCCH payload (i.e., SC-MCCH, SC-MCCH PDSCH) or a method for announcing the cases through higher layer signaling (e.g., RRC signaling) may be considered.

First, a method is described in which the eNB delivers (or announces) to the UE information indicating whether resource allocation to be used for transmitting the SC-MTCH is based on the wideband (i.e., operates by the wideband) or based on the narrowband (i.e., operates by the narrowband) through the SC-MCCH payload. The corresponding method may be divided into two methods according to a relationship between TMGI (i.e., multicast or broadcast service) and resource allocation.

As a first method, a method for applying wideband resource allocation to all TMGIs to be transmitted to the SC-MTCH may be considered. When the corresponding method is used, it is advantageous in that only a resource allocation field (or resource block assignment field) of the DCI is just checked without a need for determining whether the SC-MTCH operates based on the wideband or the narrowband by the UE. However, DCI corresponding to a wideband based resource allocation field size is required even for TMGI configured based on the narrowband. Further, a new DCI format may be required in which an additional resource allocation field is introduced other than the resource allocation field of the DCI format used in the existing MTC (e.g., eMTC).

As a second method, a method may also be considered, in which the ENB applies different resource allocations for each TMGI or TMGI group (i.e., service or service group) to be transmitted to the SC-MTCH and announces the resource allocations. When the corresponding method is used, since a resource allocating operation mode (i.e., wideband based mode or narrowband based mode) may be supported differently for each TMGI or TMGI group, it is advantageous in that the resource may be efficiently used. In this case, some bits for sending information indicating the resource allocating operation mode for each TMGI or TMGI group to be transmitted to the SC-MTCH need to be added to the SC-MCCH payload.

Further, in the case of the corresponding method, the resource allocation field of the DCI format used in the existing MTC may be used with respect to the TMGI or TMGI group configured by the narrowband resource allocation. Unlike this, the new DCI format in which the additional resource allocation field is introduced may be used with respect to the TMGI or TMGI group configured by the wideband based resource allocation.

In the case of the second method, unlike the first method, the UE needs to determine whether TMGI (i.e., service which the UE desires to use) to be received thereby follows the wideband based resource allocation or the narrowband resource allocation through the SC-MCCH payload received from the eNB. According to the determination, the UE may configure the size of the DCI format required for monitoring the search space (i.e., SC-MTCH MPDCCH search space) to which the DCI for scheduling the SC-MTCH is to be transmitted differently according to each case. The reason is that the number of bits requires for resource allocation increases in the case of the wideband based resource allocation, and as a result, the sizes of the DCI formats of a wideband based configuration and a narrowband based configuration are configured to be different from each other.

A specific example of a difference between the wideband based resource allocation and the narrowband based resource allocation in terms of the number of bits required for the resource allocation is described below.

When the number of RBs available in the system bandwidth is $N_{RB}^{DL}$ (the case of the downlink is assumed), the number of available narrowbands becomes $$\left\lfloor \frac{N_{RB}^{DL}}{6} \right\rfloor.$$

In this case, when each narrowband is selected through a bitmap scheme, at least one narrowband needs to be selected. As a result, the number of cases required for selecting the wideband becomes $$2^{\left\lfloor \frac{N_{RB}^{DL}}{6} \right\rfloor} - 1 \text{ and } 2^{\left\lfloor \frac{N_{RB}^{DL}}{6} \right\rfloor} \text{ bits}$$

are additionally required for expressing all cases of selecting the wideband. Accordingly, in the case of the wideband based resource allocation scheme, the narrowband is selected in the existing narrowband based resource allocating scheme and bits for selecting the wideband are additionally required in addition to $$5 + \left\lceil \log_2 \left\lfloor \frac{N_{RB}^{DL}}{6} \right\rfloor \right\rceil \text{ bits}$$

required for selecting the RB in the selected band. Consequently, the number of bits required for the wideband resource allocation becomes $$5 + \left\lceil \log_2 \left\lfloor \frac{N_{RB}^{DL}}{6} \right\rfloor \right\rceil + 2^{\left\lfloor \frac{N_{RB}^{DL}}{6} \right\rfloor}.$$

Next, as mentioned above, a method may also be considered in which the eNB delivers to the UE information indicating whether the resource allocation to be used for transmitting the SC-MTCH is configured based on the wideband or the narrowband through the higher layer signaling (e.g., RRC signaling) other than the SC-MCCH payload. In this case, the methods described in the method for transmitting the information through the SC-MCCH payload described above may be similarly applied to the corresponding method.

The method for indicating the information through the RRC signaling has an advantage in that additional information may not be transmitted to the SC-MCCH payload.

Overview of Devices to Which Present Invention is Applicable

FIG. 17 illustrates a block diagram of a wireless communication device to which methods proposed by this specification may be applied.

Referring to FIG. 17, a wireless communication system includes an eNB 1710 and multiple UEs 1710 positioned within an area of the eNB 1720.

The eNB 1710 includes a processor 1711, a memory 1712, and a radio frequency (RF) unit 1713. The processor 1711 implements a function, a process, and/or a method which are proposed in FIGS. 1 to 16 above. The layers of the wireless interface protocol may be implemented by the processor 1711. The memory 1712 is connected with the processor 1711 to store various pieces of information for driving the processor 1711. The RF unit 1713 is connected with the processor 1711 to transmit and/or receive a radio signal.

The UE 1720 includes a processor 1721, a memory 1722, and an RF unit 1723.

The processor 1721 implements a function, a process, and/or a method which are proposed in FIGS. 1 to 16 above. The layers of the wireless interface protocol may be implemented by the processor 1721. The memory 1722 is connected with the processor 1721 to store various pieces of information for driving the processor 1721. The RF unit 1723 is connected with the processor 1721 to transmit and/or receive a radio signal.

The memories 1717 and 1722 may be positioned inside or outside the processors 1711 and 1721 and connected with the processors 1711 and 1721 by various well-known means. Further, the eNB 1710 and/or the UE 1720 may have a single antenna or multiple antennas.

FIG. 18 illustrates a block diagram of a communication device according to an embodiment of the present invention.

In particular, FIG. 18 is a diagram more specifically illustrating the UE of FIG. 17 above.

Referring to FIG. 18, the UE may be configured to include a processor (or a digital signal processor (DSP) 1810, an RF module (or RF unit) 1835, a power management module 1805, an antenna 1840, a battery 1855, a display 1815, a keypad 1820, a memory 1830, a subscriber identification module (SIM) card 1825 (this component is optional), a speaker 1845, and a microphone 1850. The UE may also include a single antenna or multiple antennas.

The processor 1810 implements a function, a process, and/or a method which are proposed in FIGS. 1 to 16 above. Layers of a wireless interface protocol may be implemented by the processor 1810.

The memory 1830 is connected with the processor 1810 to store information related to an operation of the processor 1810. The memory 1830 may be positioned inside or outside the processor 1810 and connected with the processor 1810 by various well-known means.

A user inputs command information such as a telephone number or the like by, for example, pressing (or touching) a button on the keypad 1820 or by voice activation using the microphone 1850. The processor 1810 receives such command information and processes to perform appropriate functions including dialing a telephone number. Operational data may be extracted from the SIM card 1825 or the memory 1830. In addition, the processor 1810 may display command information or drive information on the display 1815 for the user to recognize and for convenience.

The RF module 1835 is connected with the processor 1810 to transmit and/or receive an RF signal. The processor 1810 transfers the command information to the RF module 1835 to initiate communication, for example, to transmit wireless signals constituting voice communication data. The RF module 1835 is constituted by a receiver and a transmitter for receiving and transmitting the wireless signals. The antenna 1840 functions to transmit and receive the wireless signals. Upon receiving the wireless signals, the RF module 1835 may transfer the signal for processing by the processor 1810 and convert the signal to a baseband. The processed signal may be converted into to audible or readable information output via the speaker 1845.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

An example in which in the wireless communication system of the present invention, the method for transmitting and receiving data in the wireless communication system of the present invention is applied to the 3GPP LTE/LTE-A system is described primarily, but it is possible to the method for transmitting and receiving data in the wireless communication system to various wireless communication systems in addition to the 3GPP LTE/LTE-A system.

The invention claimed is:

1. A method for transmitting and receiving, by a user equipment (UE), data in a wireless communication system supporting Machine-Type Communication (MTC), the method comprising:
monitoring a first search space configured for a first MTC Physical Downlink Control Channel (MPDCCH), where the first MPDCCH includes first control information for scheduling of a first Physical Downlink shared Channel (PDSCH) for transferring a Single Cell-Multicast Control Channel (SC-MCCH);
receiving the first PDSCH based on the first control information;
monitoring a second search space configured for a second MPDCCH using a group identifier acquired through the SC-MCCH, wherein the second MPDCCH includes second control information for scheduling of a second PDSCH for transferring a Single Cell-Multicast Traffic Channel (SC-MTCH); and receiving the second PDSCH based on the second control information, wherein configuration information for a size of a frequency bandwidth used for the second PDSCH is transferred through the SC-MCCH.

2. The method of claim 1, wherein the configuration information relates to any one of two different sizes of frequency bandwidths including a first frequency bandwidth and a second frequency bandwidth, and wherein the first frequency bandwidth is configured to be larger than the second frequency bandwidth.

3. The method of claim 2, wherein a first transport block size (TB S) table is configured to be used with respect to the first frequency bandwidth, a second TBS table is configured to be used with respect to the second frequency bandwidth, and TBS values represented by the second TBS table are included in the first TBS table.

4. The method of claim 1, wherein the configuration information relates to any one of a first frequency bandwidth for 6 resource blocks and a second frequency bandwidth for 24 resource blocks.

5. The method of claim 4, wherein the configuration information is a 1 bit indicator for any one of the first frequency bandwidth and the second frequency bandwidth.

6. The method of claim 1, wherein the group identifier and the configuration information are configured for each Temporary Mobile Group Identity (TMGI).

7. The method of claim 1, wherein the first search space is monitored by using a single cell identifier.

8. The method of claim 1, further comprising:

transmitting capability information of the UE to a base station, wherein the configuration information is generated, by the base station, based on the capability information of the UE.

9. The method of claim 1, wherein the first control information is Downlink Control Information (DCI) format 6-2, and wherein the second control information is any one of DCI format 6-1A or DCI format 6-1B.

10. The method of claim 1, wherein the configuration information is transferred through the SC-MCCH when the UE supports an SC-PtM scheme.

11. A UE transmitting and receiving data in a wireless communication system supporting Machine-Type Communication (MTC), the UE comprising:

a Radio Frequency (RF) unit for transmitting and receiving a radio signal; and a processor functionally connected to the RF unit, wherein the processor is configured to monitor a first search space configured for a first MTC Physical Downlink Control Channel (MPDCCH), where the first MPDCCH includes first control information for scheduling of a first Physical Downlink shared Channel (PDSCH) for transferring a Single Cell-Multicast Control Channel (SC-MCCH), receive the first PDSCH based on the first control information, monitor a second search space configured for a second MPDCCH using a group identifier acquired through the SC-MCCH, wherein the second MPDCCH includes second control information for scheduling of a second PDSCH for transferring a Single Cell-Multicast Traffic Channel (SC-MTCH), and receive the second PDSCH based on the second control information, and wherein configuration information for a size of a frequency bandwidth used for the second PDSCH is transferred through the SC-MCCH.

12. The UE of claim 11, wherein the configuration information relates to any one of two different sizes of frequency bandwidths including a first frequency bandwidth and a second frequency bandwidth, and wherein the first frequency bandwidth is configured to be larger than the second frequency bandwidth.

13. The UE of claim 11, wherein the configuration information relates to any one of a first frequency bandwidth for 6 resource blocks and a second frequency bandwidth for 24 resource blocks.

14. The UE of claim 12, wherein a first transport block size (TBS) table is configured to be used with respect to the first frequency bandwidth, a second TBS table is configured to be used with respect to the second frequency bandwidth, and TBS values represented by the second TBS table are included in the first TBS table.

15. The UE of claim 11, wherein the first control information is Downlink Control Information (DCI) format 6-2, and wherein the second control information is any one of DCI format 6-1A or DCI format 6-1B.

* * * * *